Nov. 26, 1968  J. V. FREDD ET AL  3,412,806
MULTIPLE SAFETY VALVE INSTALLATION FOR WELLS
Filed July 14, 1965  12 Sheets-Sheet 1

INVENTORS
JOHN V. FREDD
TURNER G. GARWOOD
PHILLIP S. SIZER

BY
ATTORNEYS

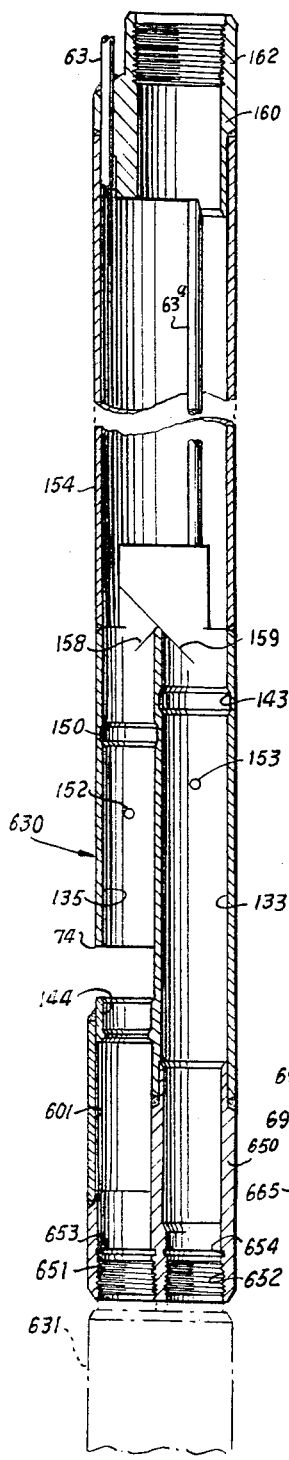
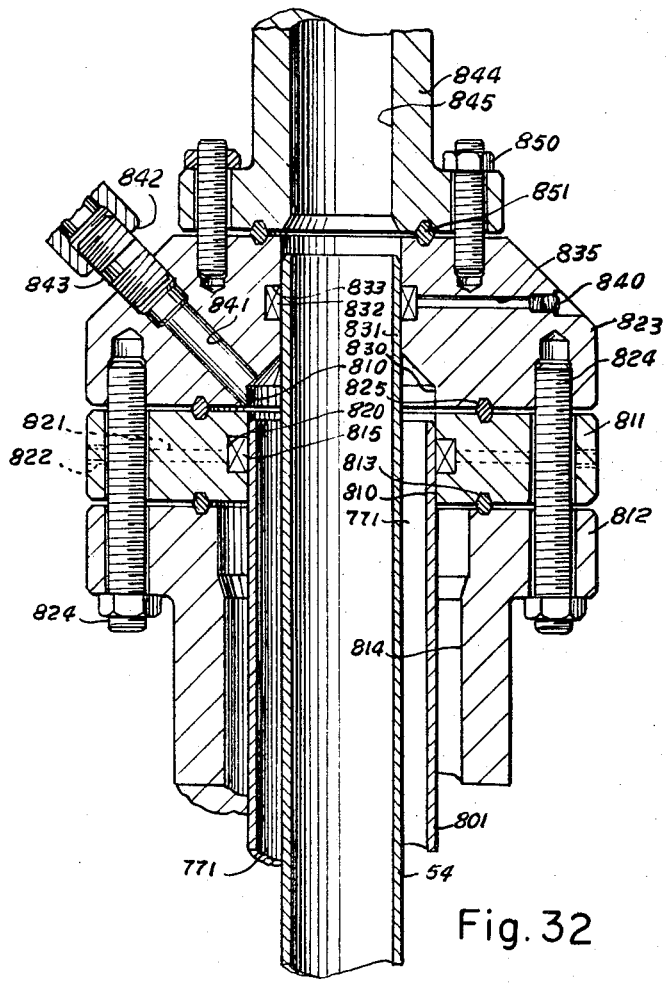
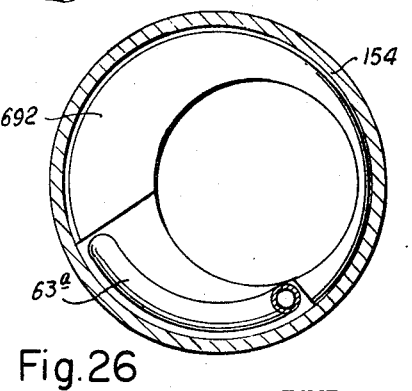

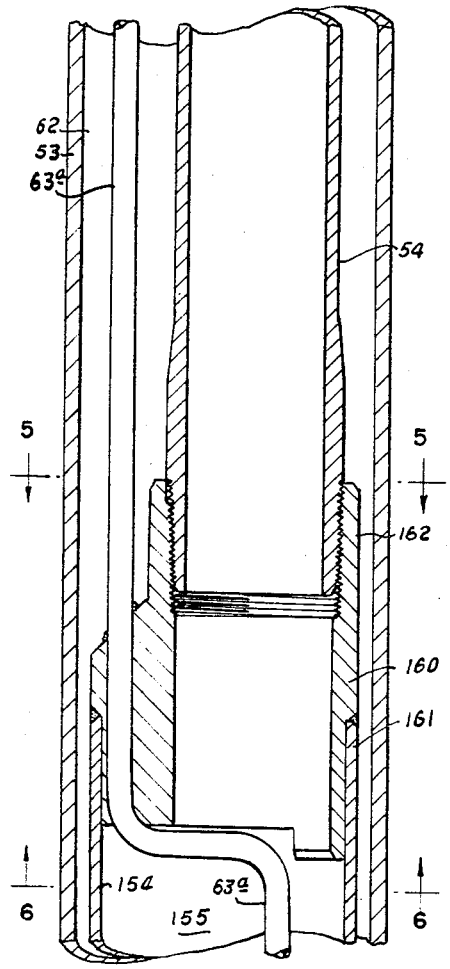
Fig. 4-A
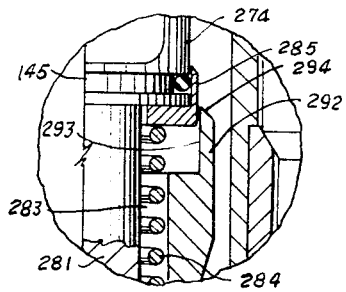
Fig. 4-BB
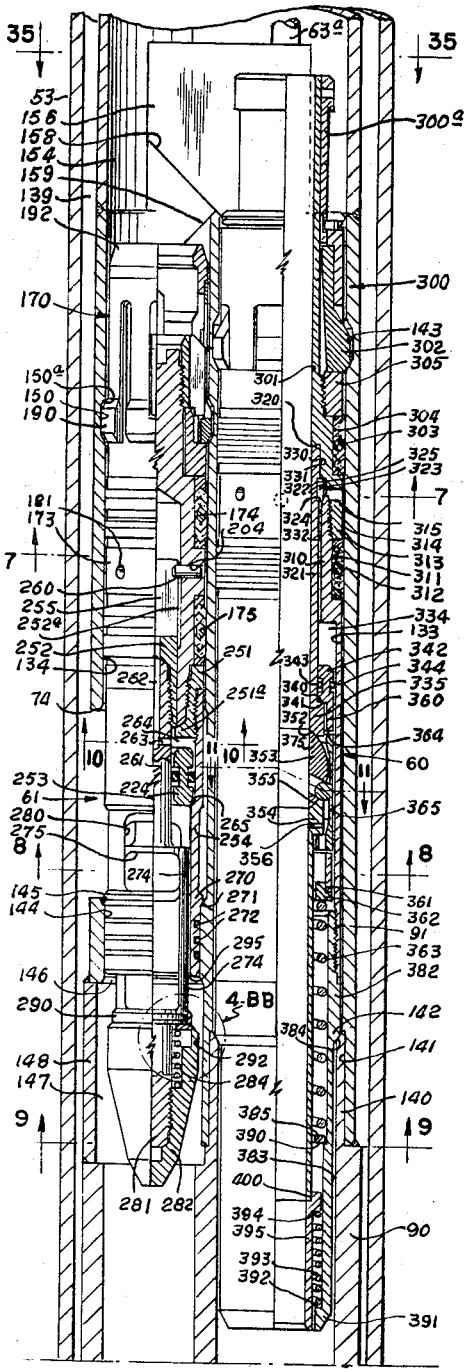
Fig. 4-B
INVENTORS
JOHN V. FREDD
TURNER G. GARWOOD
PHILLIP S. SIZER
BY
ATTORNEYS

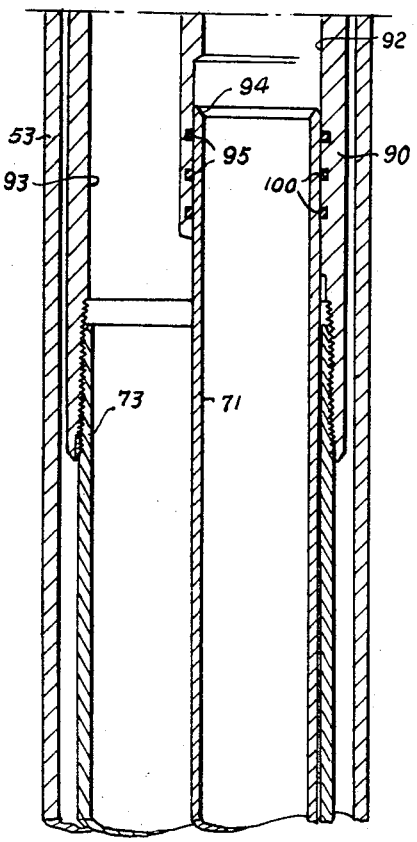
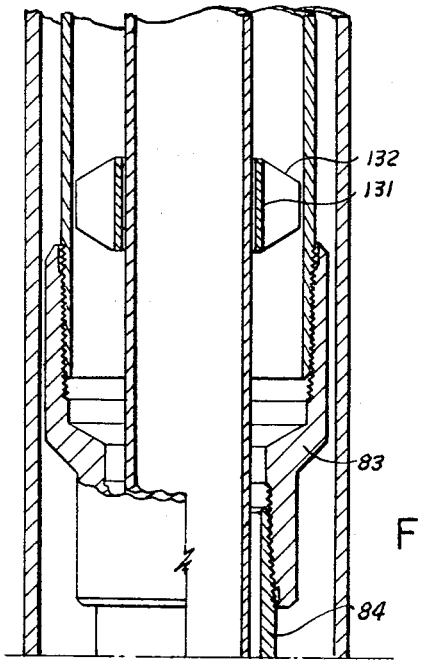
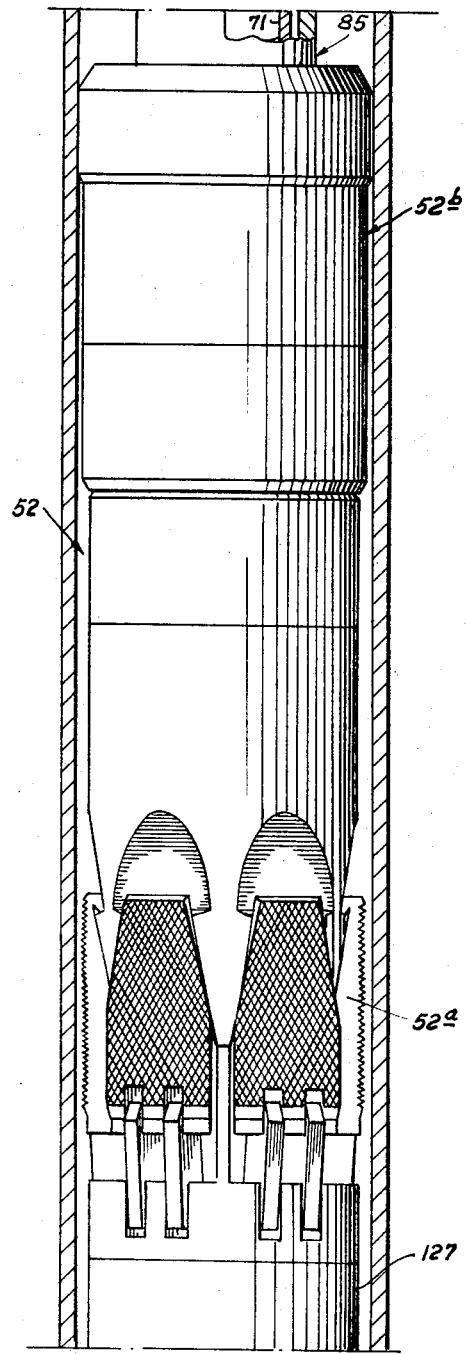
Fig. 4-c
Fig. 4-D
INVENTORS
JOHN V. FREDD
TURNER G. GARWOOD
PHILLIP S. SIZER

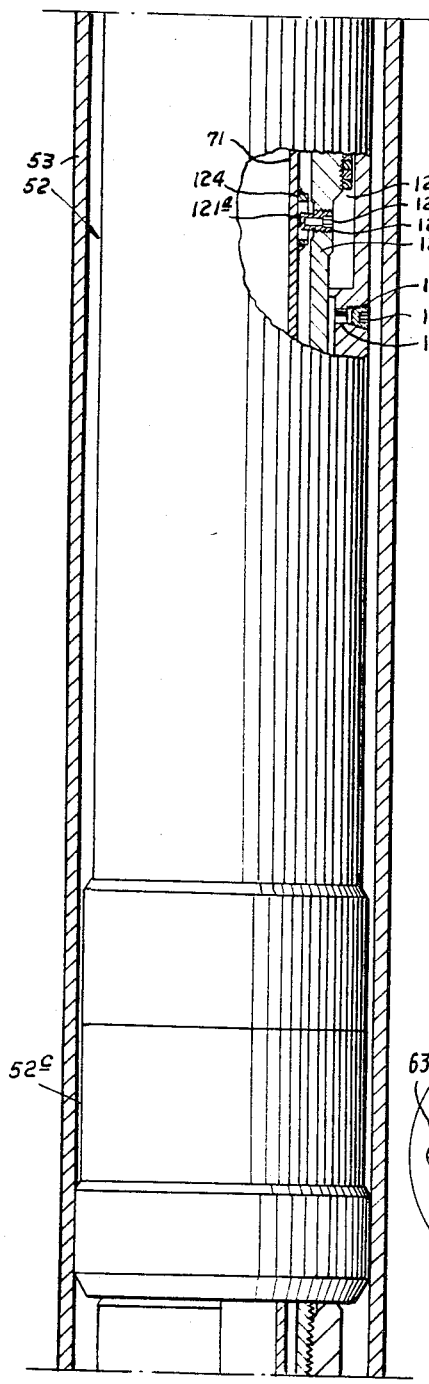
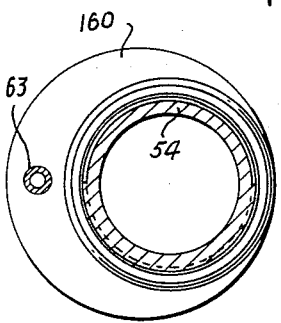
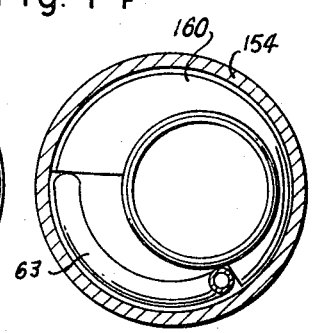

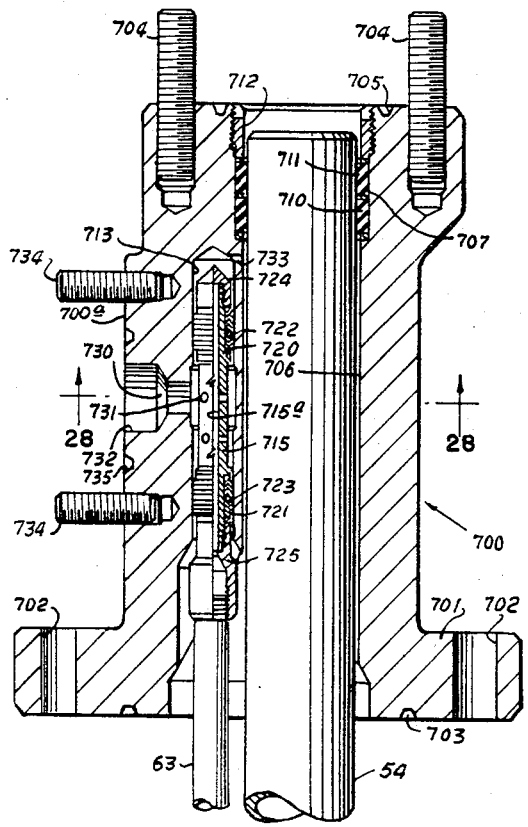
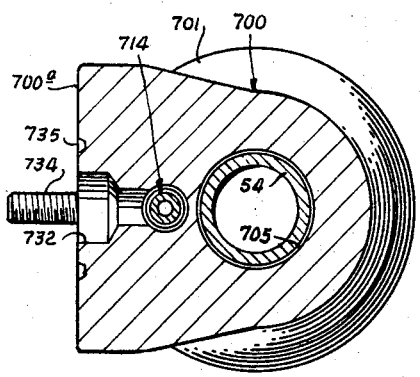
Fig. 28
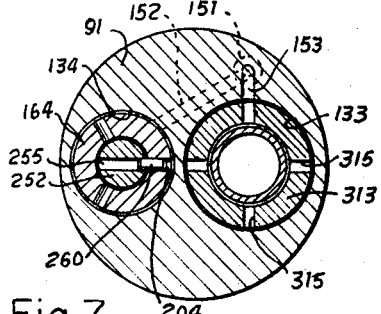
Fig. 7
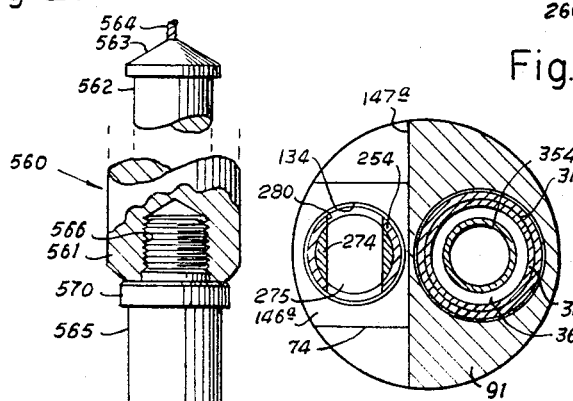
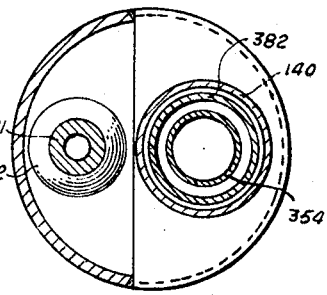

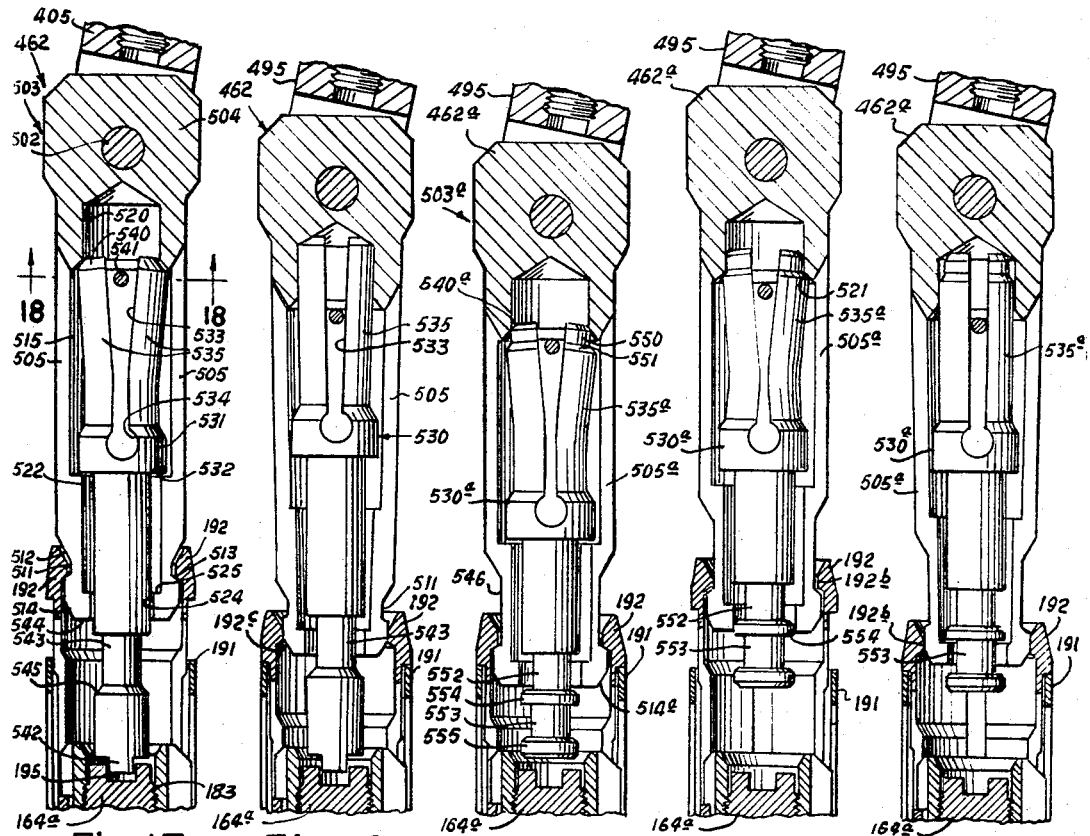

Fig. 12-A

INVENTORS
JOHN V. FREDD
TURNER G. GARWOOD
PHILLIP S. SIZER

BY

ATTORNEYS

Nov. 26, 1968   J. V. FREDD ET AL   3,412,806
MULTIPLE SAFETY VALVE INSTALLATION FOR WELLS
Filed July 14, 1965   12 Sheets-Sheet 9

INVENTORS
JOHN V. FREDD
TURNER G. GARWOOD
PHILLIP S. SIZER
BY
ATTORNEYS

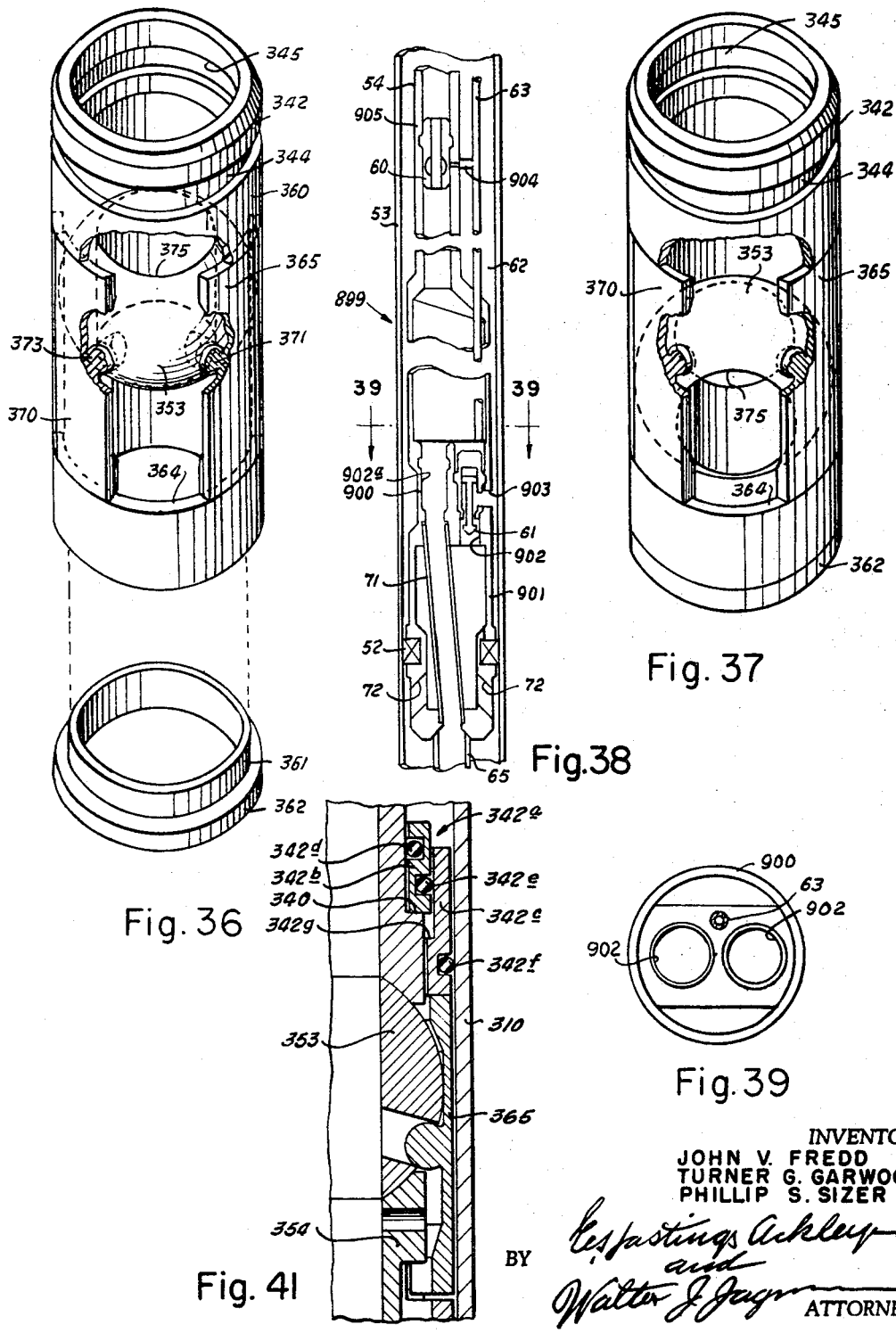

United States Patent Office 3,412,806
Patented Nov. 26, 1968

3,412,806
MULTIPLE SAFETY VALVE INSTALLATION
FOR WELLS
John V. Fredd, Turner G. Garwood, and Phillip S. Sizer,
Dallas, Tex., assignors to Otis Engineering Corporation,
Dallas, Tex., a corporation of Delaware
Filed July 14, 1965, Ser. No. 471,995
61 Claims. (Cl. 166—72)

ABSTRACT OF THE DISCLOSURE

A subsurface flow control system for multiple zone wells, and the valves used in such system for controlling flow through a plurality of flow conduits in such multiple zone wells.

This invention relates to subsurface flow control systems and well tools and more particularly to systems and tools for the subsurface control of fluid flow in a well bore into either or both a tubing string and an annular flow channel between the tubing string and the casing of the well bore.

It is a object of this invention to provide a new and improved system for subsurface control of fluids flowing through a well bore.

It is another object of the invention to provide a system for the subsurface control of fluid flowing through a well bore from a single producing zone into both a tubing string and an annular flow channel between the tubing string and the casing of the well.

It is another object of the invention to provide a system for the subsurface control of fluid flow in a well bore from upper and lower producing zones into both a tubing string and an annular flow channel between the tubing and the casing of the well bore.

It is a further object of the invention to provide a system for the subsurface control of the flow of fluids through a well bore wherein the flow control means employed is actuatable by fluid pressure controllable from the surface of the well.

It is a still further object of the invention to provide a system for the sub-surface control of fluids flowing in a well bore employing flow control means actuatable by either the velocity of the fluids flowing through such means or the pressure drop in the fluids across such flow control means.

It is still another object of the invention to provide a system for the subsurface control of fluid flow in a well bore wherein a flow control valve is provided for a flow channel extending through the well tubing and another flow control valve is provided for a flow channel extending through the annulus around the well tubing within the casing of the well.

It is another object of the invention to provide a system for the subsurface control of fluid flow in a well bore wherein fluid flow control valves are positioned in side by side relationship to control the fluid flow in a flow channel extending through the well tubing and in a flow channel through the annular space between the well tubing and the well casing.

It is another object of the invention to provide a system for the subsurface control of fluid flow through a well bore in which flow control valves positioned in side by side relationships within a well bore are each insertable and removable with wire line tools.

It is another object of the invention to provide a system for the subsurface control of fluid flow in a well bore including flow control valves for controlling the fluid flow into a tubing string and through an annular flow channel between the tubing string and the well casing, the tubing string valve being positioned in axial alignment with the tubing string and the annulus control valve being positioned on a longitudinal axis laterally spaced apart from the axis of the tubing string.

It is another object of the invention to provide a tool for installing and removing a subsurface well tool in a bore laterally misaligned from the axis of the bore through which the tool and the subsurface well tool are inserted into and removed from the well.

It is yet another object of the invention to provide a system for the subsurface control of fluid flow in a well bore wherein maximum fluid flow rate from a producing formation is obtained through the well bore while retaining the inherent advantages of having a tubing string positioned within the casing to permit emergency injection of drilling fluid in the event of a blowout.

It is another object of the invention to provide a fluid flow system for a well wherein bottom hole pressure measurements may be made by a pressure measuring device or bomb without involving the conventional steps of pulling a plug or a choke or similar apparatus.

It is another object of the invention to provide a fluid flow control system which includes a single vertical run "Christmas tree" at the wellhead.

It is another object of the invention to provide a fluid flow control system for a well including a fluid control line which may be removed from and installed in the well without "killing the well."

It is an additional object of the invention to provide a subsurface fluid flow control system for a well having tubing and annulus flow control valves positioned in side by side relationship and insertable into and removable from a landing nipple through a single tubing string.

It is another object of the invention to provide a fluid flow control system for a well including both annulus completion and production valves.

It is another object of the invention to provide a new and improved poppet type fluid controlled completion valve.

It is another object of the invention to provide a new and improved poppet type fluid controlled production valve.

It is another object of the invention to provide a new and improved ball type fluid controlled production valve.

It is another object of the invention to provide a new and improved double ball plug and check valve.

It is another object of the invention to provide a new and improved system for detachably connecting a fluid control line through a wellhead and into a subsurface flow control assembly whereby the control line may be removed and installed without pulling the well tubing.

It is another object of the invention to provide an annular flow system for directing control fluid through a wellhead, down a well bore, and into a subsurface flow control system.

It is another object of the invention to provide a subsurface fluid flow control system wherein an annulus flow control valve is positioned in one bore within a landing nipple for controlling fluid flow through an annular flow passage extending to the surface and a tubing flow control valve is positioned in alignment with another bore through the landing nipple and longitudinally spaced apart above the first valve.

Additional objects and advantages of the invention will be readily apparent from the reading of the following description of a device constructed in accordance with the invention, and reference to the accompanying drawings thereof, wherein:

FIGURE 3A is a longitudinal view in section of the landing nipple and connected members in the system illustrated in FIGURE 3;

Figure 2:
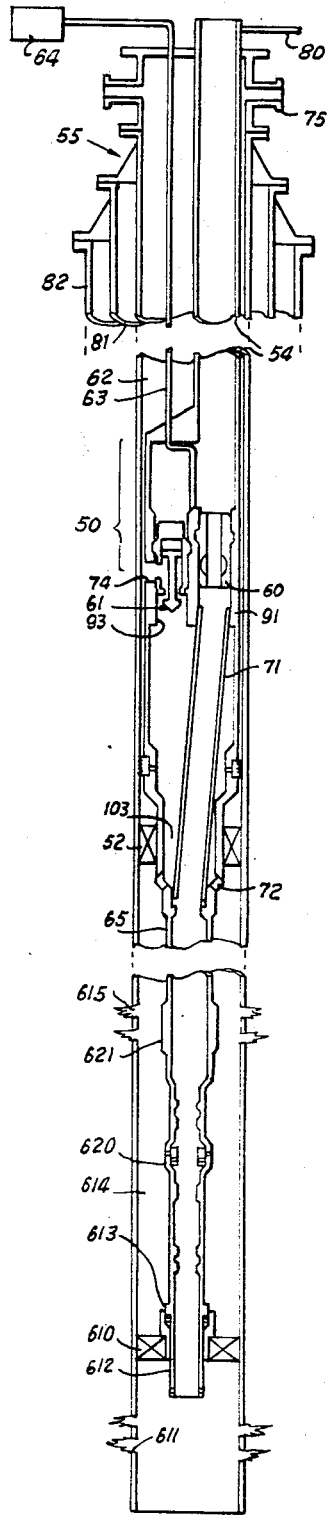
FIGURE 2 is a schematic view in section of the flow control system of FIGURE 1 arranged to produce the fluids from an upper formation into an annulus flow passage and from a lower formation into a tubing string flow passage.
Figure 1:
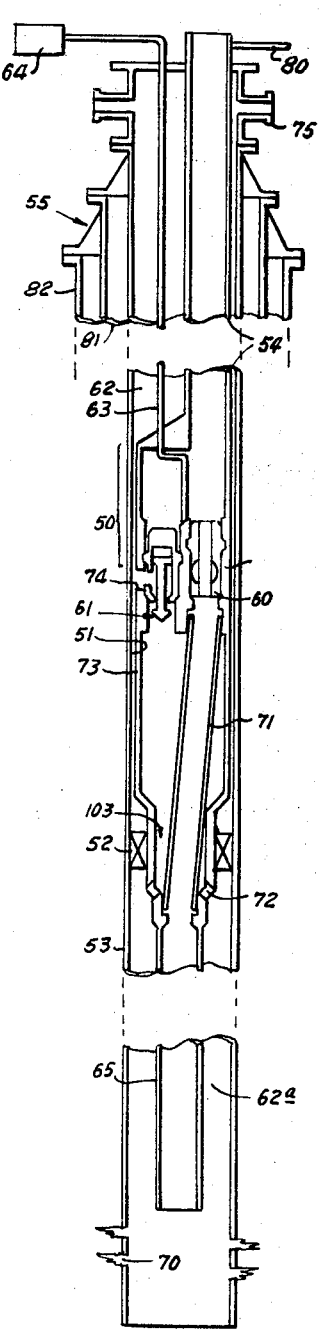
FIGURE 1 is a schematic view in section of one embodiment of the flow control system of the invention arranged in a well to produce fluids from a single formation into both the tubing string and the annulus.
Figure 12:
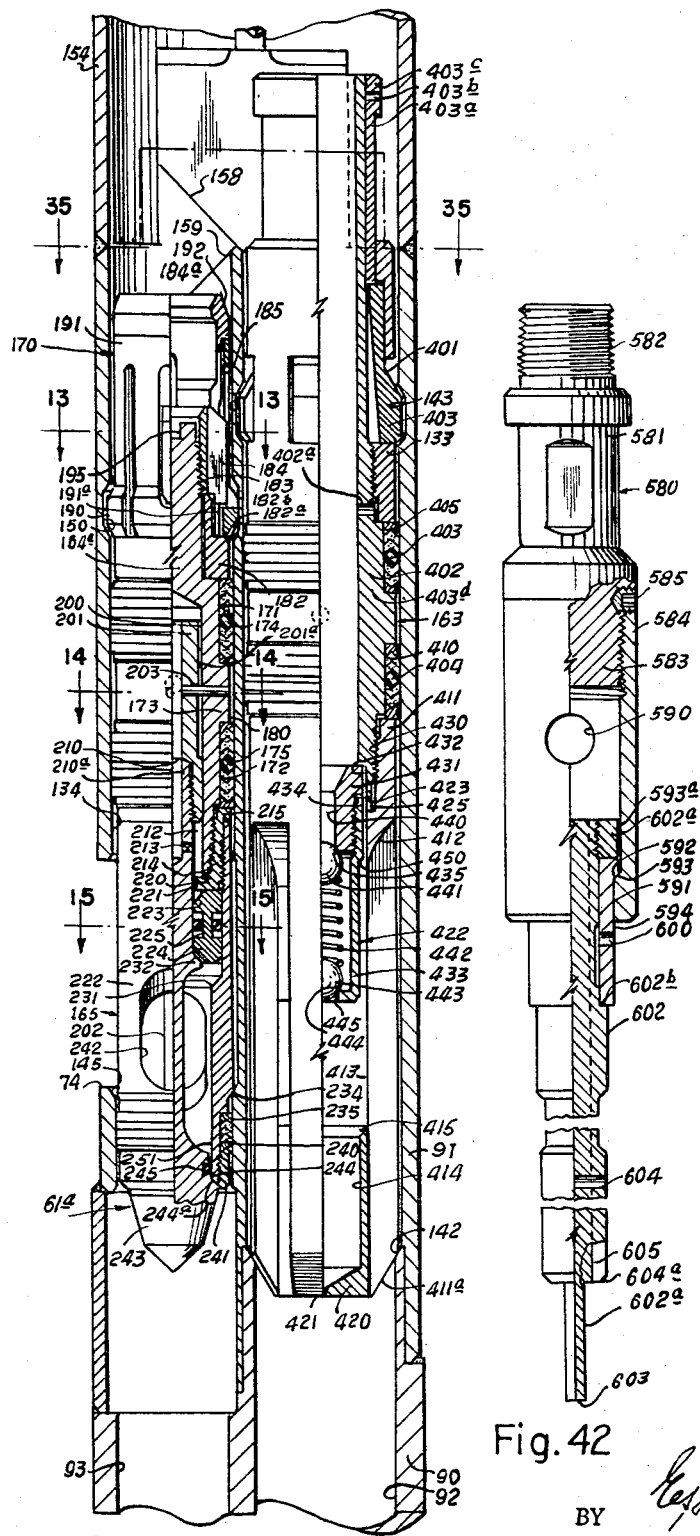
Figure 29:
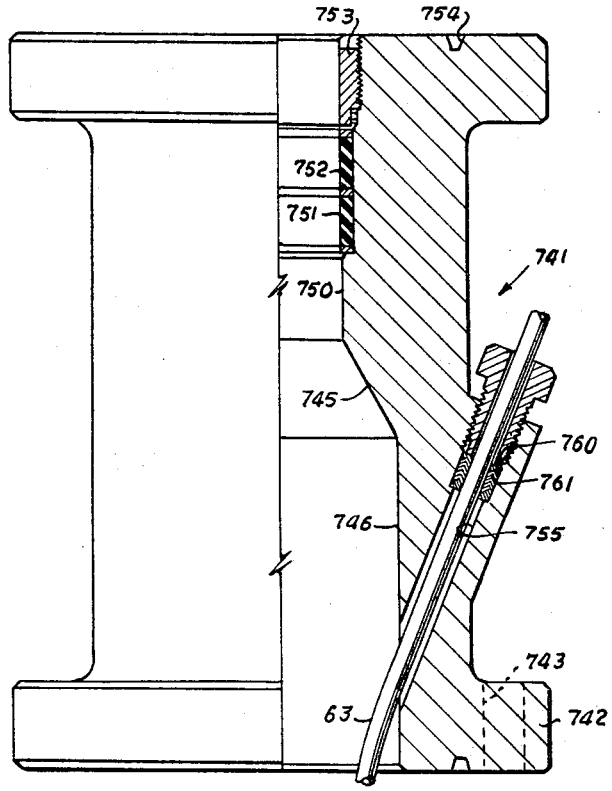
Figure 16:
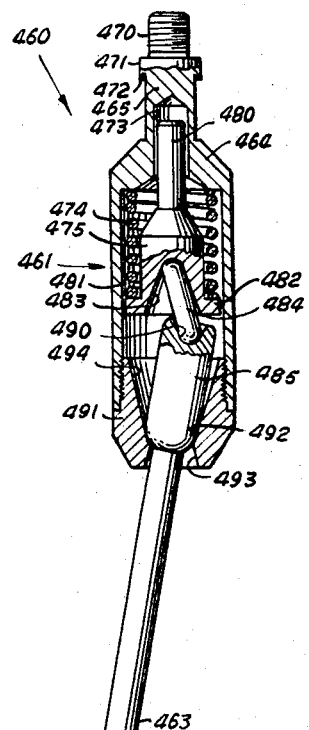
Figure 30:
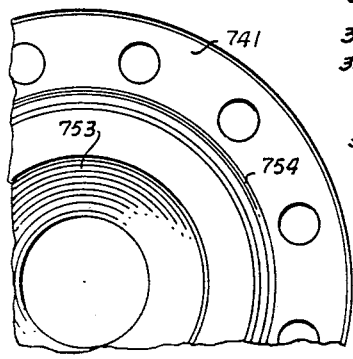
Figure 24:
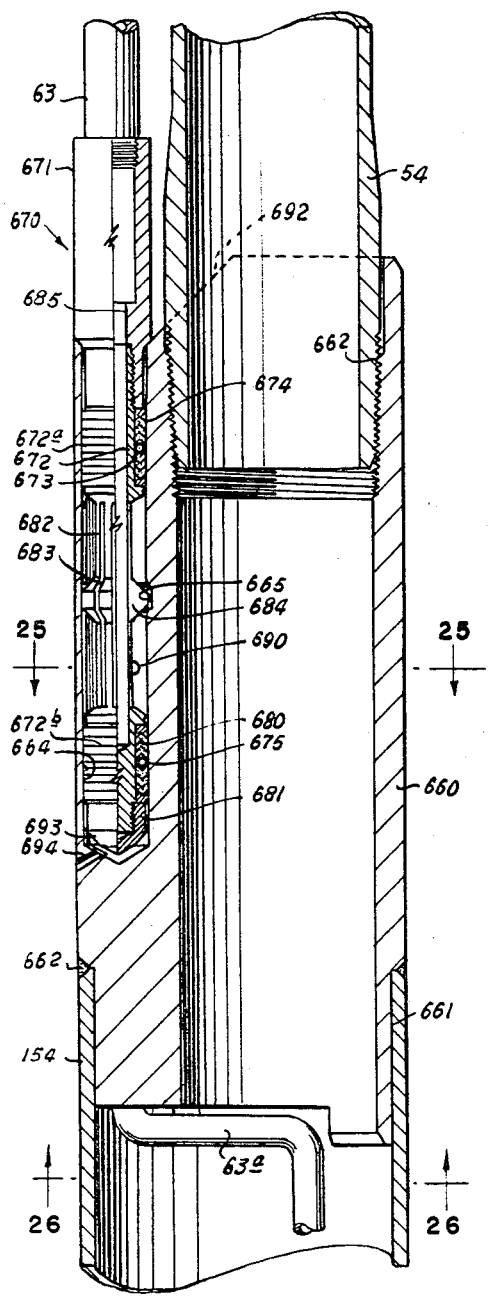
Figure 31:
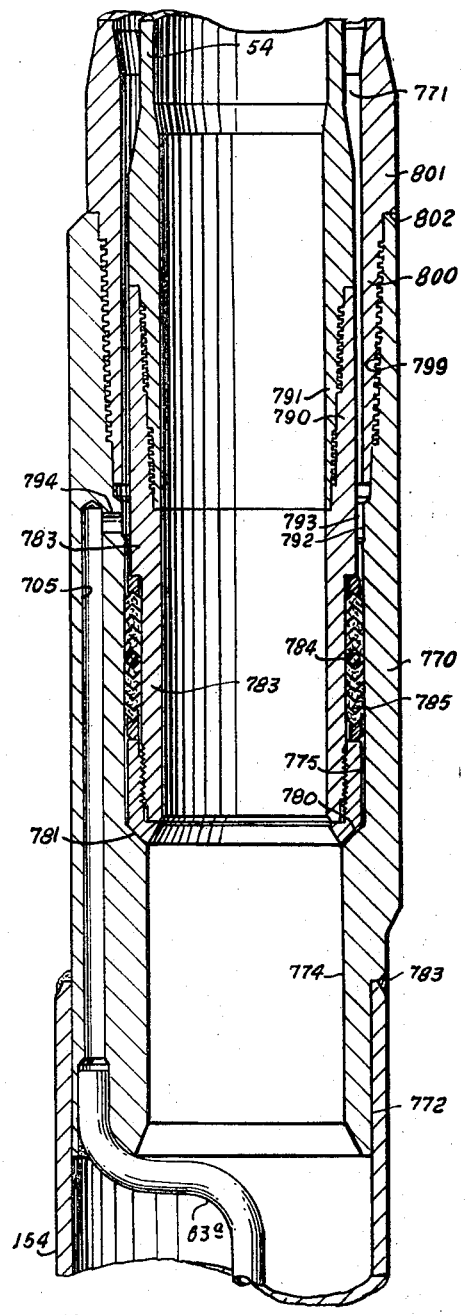

FIGURES 4A through 4F taken together constitute a longitudinal view partly in elevation and partly in section showing the flow control system of FIGURE 1 with the tubing and annulus production valves in position in the landing nipple and the packer in the retracted position for running the system into the well bore;

FIGURE 4BB is a fragmentary enlarged sectional view of the operation enclosed in the area 4BB of FIGURE 4B;

FIGURE 5 is a sectional view taken along the line 5—5 of FIGURE 4A;

FIGURE 6 is a view in section along the line 6—6 of FIGURE 4A;

FIGURE 7 is a view in section along the line 7—7 of FIGURE 4B showing a section through the annulus valve at one elevation and a section through the tubing valve at a slightly higher elevation;

FIGURE 8 is a sectional view along the line 8—8 of FIGURE 4B;

FIGURE 9 is a view in section along the line 9—9 of FIGURE 4B;

FIGURE 10 is a view in section along the line 10—10 of FIGURE 4B showing a section through only the annulus valve;

FIGURE 11 is a view in section along the line 11—11 of FIGURE 4B showing a section through only the tubing valve;

FIGURE 12 is a fragmentary longitudinal view in section and elevation illustrating the landing nipple supporting both a tubing string plug valve used under certain conditions during installation of the system and an annulus completion valve positioned in the nipple during initial installation of the system in a well;

FIGURE 12A is an exploded view in perspective of the latch assembly collet, lock fingers, and retainer ring used on the annulus valve shown in FIGURE 12 and 2B;

FIGURE 13 is a view in section through the annulus completion valve of FIGURE 12 along the line 13—13;

FIGURE 14 is a fragmentary view in section through a portion of the landing nipple and the annulus valve of FIGURE 12 along the line 14—14;

FIGURE 15 is a view in cross-section of the annulus valve of FIGURE 12 along the line 15—15;

FIGURE 16 is a longitudinal view in section and elevation of a running tool to be used for the installation and removal of the annulus valve;

FIGURE 17 is a fragmentary longitudinal view partly in section and partly in elevation showing the running tool connected with the annulus valve for lowering the valve to the tubing string;

FIGURE 18 is a view in cross-section taken along the line 18—18 of FIGURE 17;

FIGURE 19 is a view similar to FIGURE 17 illustrating the running tool being disengaged from the upper end of the annulus valve;

FIGURE 20 is a view similar to FIGURE 17 illustrating the tool of FIGURE 16 modified as a pulling tool just as it engages the upper end of the annulus valve prior to locking the tool to the valve;

FIGURE 21 is a view similar to FIGURE 20 illustrating the pulling tool lifting the annulus valve from the landing nipple;

FIGURE 22 is a view similar to FIGURE 20 showing the pulling tool during the step of being disengaged from the annulus valve;

FIGURE 23 is a broken longitudinal view partially in section and partially in elevation of a wire line tool employed in the procedure of setting the packer illustrated in FIGURE 1 and the upper packer shown in FIGURE 2;

FIGURE 24 is a view in section of an alternative embodiment of the head member on the subsurface flow control assembly adapted for the use of a removable control line;

FIGURE 25 is a view in section along the line 25—25 of FIGURE 24;

FIGURE 26 is a view in section along the line 26—26 of FIGURE 25;

FIGURE 27 is a longitudinal view in section of an exit spool assembly adapted for the use of the removable control line illustrated in FIGURES 24–26;

FIGURE 28 is a view in section along the line 28—28 of FIGURE 27;

FIGURE 29 is a view partly in section and partly in elevation illustrating an alternative form of exit spool assembly;

FIGURE 30 is a fragmentary bottom view of the apparatus illustrated in FIGURE 29;

FIGURE 31 is a fragmentary longitudinal view in section of the head member of the subsurface flow control assembly adapted to the use of a concentric tubing string arrangement providing an annular flow passage extending downwardly for conducting the control fluid to the subsurface flow control system in place of the tubular control fluid line;

FIGURE 32 is a fragmentary longitudinal view in section of a wellhead adapted to the use of the annular control fluid flow passage illustrated in FIGURE 31.

Figure 42:
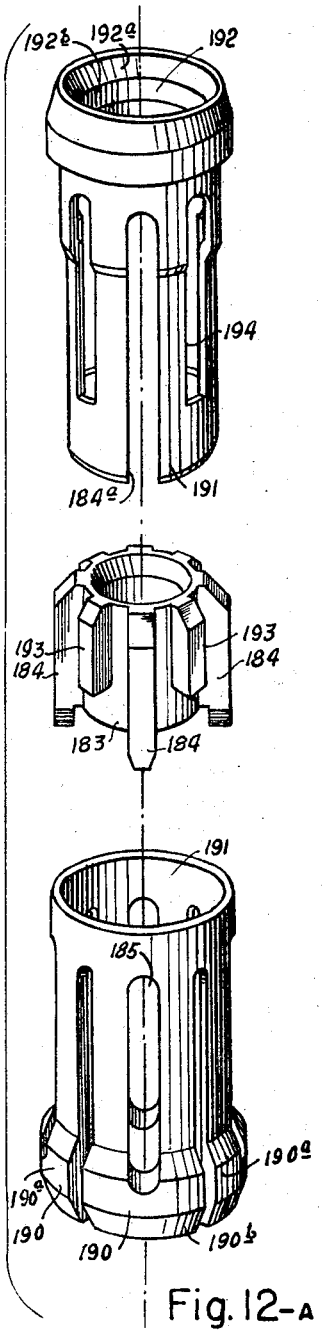
Figure 40:
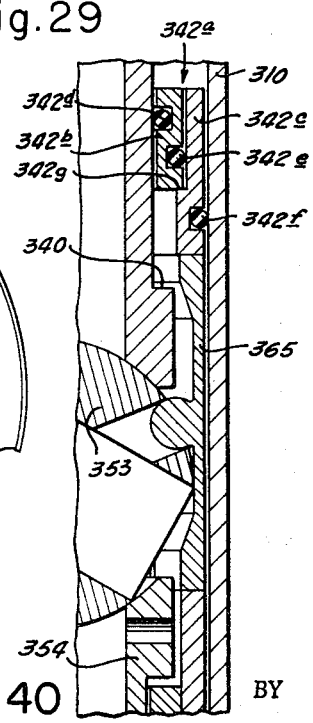
Figure 33:
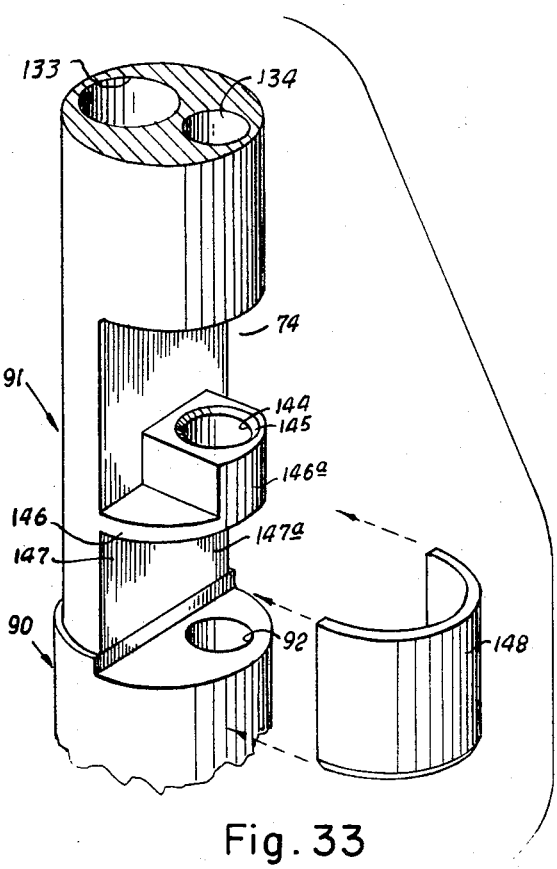
Figure 34:
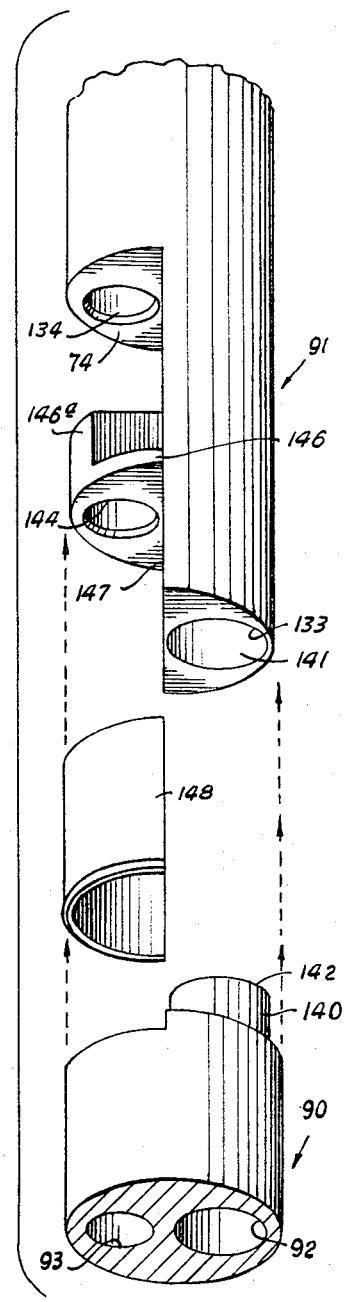
Figure 35:
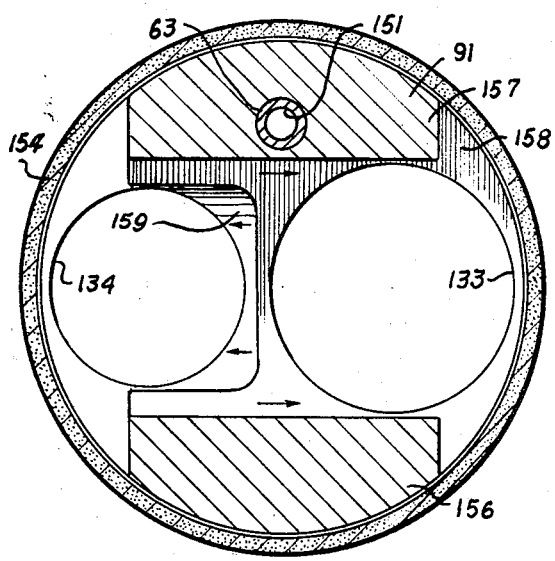

FIGURE 33 is an exploded fragmentary view in perspective of the landing nipple which supports the tubing and annulus valves in the system of the invention;

FIGURE 34 is a fragmentary exploded view in perspective of the landing nipple shown in FIGURE 33 and the upper end section of the tubular housing to which the landing nipple is secured;

FIGURE 35 is a view in section and elevation along the line 35—35 of FIGURE 12 showing the top of the landing nipple including the guide ramps which guide the flow control valves into their respective bores;

FIGURE 36 is an exploded view in perspective illustrating the ball valve element and its associated actuating members as used in the tubing control valve with the ball valve in open position;

FIGURE 37 is a view in perspective of the apparatus of FIGURE 36 illustrating the ball valve element rotated to a closed position;

FIGURE 38 is a fragmentary view in schematic form of a further form of the invention wherein the annulus and tubing valves are disposed at different levels of the flow control assembly;

FIGURE 39 is an enlarged schematic view in section along the line 39—39 of FIGURE 38;

FIGURE 40 is an enlarged fragmentary view in section of an alternative form of the valve actuating piston assembly of the tubing production valve of FIGURE 4B, showing the ball valve in a substantially closed position;

FIGURE 41 is a view similar to FIGURE 40 showing the ball valve in the fully open position; and, FIGURE 42 is a longitudinal view partially in elevation and partially in section of a running tool for installing the double plug and tubing flow valves of the system of the invention.

Referring now to FIGURE 1 of the drawings, the subsurface flow control assembly 50 is supported within the well bore 51 by the packer 52 which is secured to the inner wall of the casing 53 of the well. An upper tubing string 54 extends from the flow control assembly to the wellhead 55 at the surface. Included in the flow control assembly 50 are the tubing flow control valve 60 which controls fluid flow into the tubing string 54 and the annulus control valve 61 which controls fluid flow into the upper annulus 62 extending to the surface above the flow control assembly around the tubing string 54 within the casing 53. The fluid control line 63 extends between the flow control assembly and the surface fluid pressure control unit 64 to provide fluid pressure for control of the valves 60 and 61 from the surface. The lower tubing string 65 is supported from the packer 52 to direct one portion of the well fluids flowing through the perforations 70 of the casing into the well into the tubular member 71 which provides a flow passage through the packer to the tubing valve 60. The remaining portion of the fluids enters the ports 72 flowing around the tubular member 71 through the packer and the housing member 73 to the annulus valve 61. Thus, one portion of the fluid flowing from the formation through the perforations 70 enters the lower tubing 65 to flow through the tubular member 71 and the valve 60 to the surface through the upper tubing string 54 while the other portion of the fluids from the formation flows around the tubing 65 within the casing into the ports 72 and around the tubular member 71 within the housing 73 to the valve 61 from which the fluids flow outwardly through a lateral port or side window 74 and to the surface through the upper annular flow passage 62. The fluids from the annular flow passage and the tubing string flow from the wellhead through the lines 75 and 80, respectively.

The wellhead is connected with the surface casing 81 and the short string of surface pipe 82 which are positioned around and concentric with the casing 53.

Both the tubing valve 60 and the annulus valve 61 are simultaneously controllable from the surface by the controller 64 to shut off fluid flow through both the upper tubing string 54 and the annulus 62. Both of the valves are insertable into and removable from the assembly through the upper tubing string. The valves are both normally held in open position by fluid pressure applied through the control line. Various desired operating conditions are monitored, with the controller 64 operating in response to such conditions to cause a predetermined state in one of such conditions to deactivate the controller allowing the pressure applied through the line 63 to decrease to permit the valves to close thus shutting off all flow through both the tubing string and the annular flow passages. When desired the valves may be reopened to permit fluid flow to resume by increasing the pressure applied through the control line .

FIGURES 4A through 4F illustrate in detail the subsurface flow control assembly 50 supported on the packer 52 which is engageable with the inside wall of the casing 53 to form an annular fluid seal within the casing and also to support the lower tubing string 65 extending downwardly from the packer. The packer 52 is a standard type J Otis Hydraulic Packer illustrated at p. 3712 of the Composite Catalogue of Oil Field Equipment and Services, 1964–1965 edition, published by World Oil, Houston, Texas. As illustrated, the packer is in the retracted position in which it is run into the well to the desired elevation at which the slips 52a are set and the cup type upper and lower sealing elements 52b and 52c are expanded into more intimate contact with the inside wall of the casing. Referring to FIGURE 4C, an adapter 83 is threaded on the upper end section 84 of the packer mandrel 85. The tubular housing 73 is threaded into the adapter at its lower end and supports on its upper end a tubular body 90 which is threaded on the upper end of the housing. A dual bore landing nipple 91 is secured on the upper end of the tubular body by any satisfactory means, such as by welding. A pair of longitudinal bores 92 and 93 extend through the body 90 in side by side relationship. The bore 92 provides a fluid flow passage into the tubing valve 60 while the bore 93 functions as a fluid flow passage to direct well fluids to the annulus valve 61. The upper end portion of the flow tube 71 extends slidably into the lower end section 94 of the bore 92. A plurality of O-ring seals 95 are positioned within the internal annular grooves 100 in the body member 90 around the bore 92 to seal between the body and the outside surface of the flow tube. The flow tube extends downwardly through the tubular housing 83, through and in concentric and spaced apart relationship within the packer 52 to a position below the lower end of the packer where a lower end section 71a of the tube fits in sliding relationship within an adapter 101 threaded on the lower end section 102 of the packer mandrel 85. The flow tube 71 provides a tubular flow channel through the packer while the spaced apart relationship of the flow tube within the internal bore of the packer provides the annular flow channel 103 through the packer. The elongated ports 72 are formed in the adapter to permit fluids to flow into the annular flow passage 103 extending through the packer. A plurality of O-ring seals 105 are fitted in the internal annular grooves 110 formed in the adapter around the bore 111 to seal between the outside surface of the flow tube and inside wall of the adapter forming the bore 111. The internal annular upwardly facing shoulder 112 formed in the adapter around the bore limits downward movement of the flow tube by engagement with the lower end of the tube. A shearable set screw 113 is threaded through the bore 114 into engagement with the outer surface of the flow tube to releasably hold the tube at the upper position shown while the packer is being lowered to the elevation at which it is to be engaged with the inside wall of the casing. A plug 120 closes the outer enlarged section of the bore 114. The upper end of the lower tubing string 65 is threaded into the lower end of the adapter 101.

As illustrated in FIGURE 4E a shear plug 121 is threaded into the lateral bore 122 through the section 123 of the mandrel of the packer with its inner closed end portion 121a extending into the annulus 103 and the ring 124 which is welded to the flow tube 71. As will be explained in more detail hereinafter, when the flow tube moves downwardly relative to the packer, the ring 124 shears the inner end portion 121a of the shear plug to permit grease to escape from the annular chamber 125 of the packer into the annulus 103 releasing the packer to be set. The grease is injected into the chamber through the bore 126 in the packer sleeve 127 after which the bore is closed with the plug 128. The packer and flow tube are illustrated in the relative positions at which they are run into the well before the setting of the packer.

An annular centralizer 130 comprising a tubular member 131 and a plurality of vanes 132 is loosely fitted around the flow tube 71 within the tubular member 73 to maintain the central position of the section of the flow tube positioned through the lower portion of the tubular housing extending into the upper end of the packer. It will be observed both in FIGURES 1 and 4C that the flow tube slopes from a substantially central position at the upper end of the packer to an eccentric position where the upper end section of the flow tube enters the lower end section 94 of the bore 92 through the tubular body 90.

The landing nipple 91 is provided with the longitudinally extending bore 133 for the tubing valve 60 and the longitudinally extending bore 134 for the annulus valve 61. A lateral window 74 is formed in the landing nipple opening into the bore 134 to permit fluids in the bore to flow from the nipple into the annular space 139 around the landing nipple. A reduced upper end section 140 of the tubular housing 90 fits within an enlarged lower end section 141 of the bore 133 and provides a downwardly and inwardly sloping shoulder 142 which limits the downward movement in the bore of flow control tools, such as the tubing valve 60. An internal annular locking recess 143 is formed within the landing nipple around and near the upper end of the bore 133 to receive locking dogs on the well tools which are supported within the bore of the landing nipple. A reduced lower end section 144 of the bore 134 provides a downwardly and inwardly sloping internal annular shoulder 145 around the bore to limit downward movement in the bore of certain well tools such as the annulus flow control valve 61. The wall of the bore 144 forms a seal surface engaged by seals on the control valves positioned in the bore.

As illustrated in FIGURES 33 and 34, the landing nipple provides a semi-circular flange 146 connected to the portion 146a of the nipple body through which the bore 144 extends and serves as a wall between the inlet chamber 147 and the outlet window 74. The inlet chamber is closed by the semi-circular plate 148 which is welded to the body of the nipple along its opposite ends and vertical edges. The substantial space provided by the chamber 147 allows fluid from the bore 93 to freely flow into the intake of the annulus valve which is extended into the chamber. Similarly the window 74 permits less restricted flow around the outlet section of the annulus valve. An internal annular locking recess 150 is formed within the landing nipple in the bore 134 to receive locking dogs on well tools positioned within the bore, such as the annulus flow control valve 61 which is illustrated within the bore in FIGURE 4B.

The section 63a of the control line 63 is connected to the upper end of the landing nipple and extends into bore 151 of the landing nipple (FIGURE 35) which extends downwardly into the landing nipple substantially parallel to the bores 133 and 134. The bore 151 terminates in the landing nipple at an elevation in the vicinity of the section line 7—7 of FIGURE 4B. The bore 151 is connected with the bore 134 by a smaller bore 152 and with the bore 133 by a smaller bore 153 as shown in FIGURE 7. The bores 152 and 153 permit control fluid for operation of the valves within the bores of the landing nipple to be conducted from the bore 151 through the flow passages 152 and 153 into the bores 134 and 133 respectively. Since the control fluid enters each of the valves in the landing nipple at different elevations the flow passage 153 extends substantially horizontally while the flow passage 152 extends downwardly and somewhat laterally from the bore 151.

As illustrated in FIGURE 35 the upper end portion of the landing nipple is contoured to facilitate introduction of well tools into each of the bores of the nipple. Formed on and extending upwardly from the upper end of the nipple are the semi-cylindrical segments 156 and 157 which provide material surrounding the bores 133 and 134 for forming the downwardly sloping ramps 158 and 159 and to improve the connection of the landing nipple with the tubular member 154 which is secured on the upper end of the nipple. The outer curved surfaces of the segments 156 and 157 are undercut sufficiently so that they fit within and in engagement with the inside wall of the tubular member to increase the stability of the connection between the landing nipple and the tubular member. The ramps 158 and 159 aid in guiding well tools into their respective bores. The ramp 158 slopes to and around the bore 133 so that a well tool of relatively large diameter being lowered downwardly over the ramp tends to be guided by the ramp into the bore 133. Similarly, the ramp 159 guides a well tool of relatively small diameter toward the bore 134, after a well tool has been positioned in the bore 133.

The tubular member 154 is secured by any satisfactory means such as by welding to the upper end of the landing nipple providing a tubular chamber 155 above the landing nipple to function both as a flow channel for fluids from the tubing valve 60 and to provide working space for the introduction of well tools into the two bores of the nipple. A head member 160 is secured by suitable means such as by welding to the upper end of the tubular member 154. The lower reduced end section 161 of the head member fits within the upper end section of the tubular member as shown in FIGURE 4A. The upper end section 162 of the head member is an upwardly extending internally threaded flange eccentrically positioned to receive the lower end of the upper tubing string 54. The control line 63a connects through the head member 160 to the line 63 exterior of the flange 162 in the annular flow channel 62 between the tubing 54 and the casing 53. The control line extends to the surface independent of the tubing string so that the control line may be withdrawn from and introduced into the well without disturbing the tubing string.

FIGURE 4B illustrates the producing valves 60 and 61 locked in the flow passages 133 and 134, respectively, of the landing nipple. The FIGURE 12 shows a plug valve 163 and a completion valve 61a in the bores 133 and 134, respectively, of the landing nipple 91. The particular valves and combinations of valves employed in the landing nipple at particular stages in the operation of the system will be explained in detail hereinafter in the discussion of the installation and operation of the system.

In FIGURE 12 the completion valve 61a is illustrated in the locked position in which it remains up through the packer setting step in the installation of the system. The completion valve comprises a central packing section 164, a valve section 165, and an upper locking assembly 170. The upper and lower external annular packing recesses 171 and 172 of the mandrel 173 receive the packing assemblies 174 and 175, respectively. The upper and lower recesses are open at their upper and lower ends, respectively, to allow the packing assemblies to be placed onto the mandrel. The packing assemblies form upper and lower seals around the mandrel with the wall of the bore 134. Between the packing assemblies, the outside diameter of the mandrel is smaller than the diameter of the bore to provide an annular space 180 within the bore around the mandrel to serve as a flow passage for control fluid flowing to the valve through the passage 152. As best illustrated in FIGURE 14 the control fluid may pass from the annulus 180 through one or more laterally extending flow passages 181 of the mandrel.

The locking assembly 170, shown partially in enlarged form in FIGURE 12A, is secured on the upper reduced section 164a of the mandrel. The upper packing assembly 174 is held on the mandrel by a retainer 182 threaded on the upper reduced section of the mandrel and held in place by a finned nut 183 threaded on the upper end section of the mandrel and having longitudinally extending circumferentially spaced fins 184 and 193. Each of the fins 184 projects into a recess 185 in the downwardly extending collet fingers 190 formed on a collet ring 191. The collet fingers at the lower ends of the slots 185 are engaged by the lower ends of the fins 184 to hold the collet fingers against upward movement while the lower ends of the collet fingers engage the upwardly facing shoulder 182a of the retainer which holds the collet fingers against downward movement and therefore limiting the collet fingers to lateral expansion and contraction only. The collet fingers are separated from each other by the downwardly opening recesses 190b.

In the position shown in FIGURE 12 the outer bosses 190a on the collet fingers are held in the locking recess 150 to lock the valve within the landing nipple. The collet fingers are held in the expanded position by the locking fingers 191a which are formed on and extend downwardly from the annular ring 192. The locking fingers are spaced around the ring 192 separated by the downwardly opening slots 184a and fit within the collet fingers between the fins 184 so that they may be raised and lowered to lock the collet fingers in the expanded position and to permit the collet fingers to be retracted inwardly around the upper reduced section of the retainer 182. As shown in FIGURE 12 the locking fingers are in the downward position between the heads of the collet fingers and the reduced upper section 182b of the retainer 182. Each of the locking fingers extends circumferentially a sufficient distance that half of each finger is positioned behind half of one of the collet fingers while the other half of the locking finger is positioned behind half of an adjacent collet finger. Thus each of the locking fingers fits behind portions of two of the collet fingers and therefore adjacent locking fingers cooperate to expand each of the collet fingers. The locking fingers are held around the nut 183 by the radial fins 193 on the nut and received in the longitudinally extending slots 194 formed in each of the locking fingers. As can be seen in FIGURE 13 each of the fins 193 is evenly spaced between the fins 184. The fins 193 are somewhat shorter in longitudinal length than the fins 184 and their length is so related to the length of the slots 194 that the locking fingers cannot be pulled off the nut 183 but may be lifted sufficiently to withdraw the fingers 191 from within the heads of the collet fingers 190 to allow the collet fingers to be cammed inwardly around the reduced section 182b of the retainer 182 so that the valve 61a may be released and removed from the bore of the nipple. Thus the lower ends of the fins 184 limit the upward movement of the collet fingers while the lower ends of the fins 193 limit the upward movement of the locking fingers. The retainer 182 also serves to limit upward movement of the packing assembly 174 of the mandrel.

The upper end section of the mandrel 173 is provided with a laterally extending slot 195 which functions with a valve running tool in a manner to be explained hereinafter to maintain the proper orientation of the valve while installing it in the landing nipple.

The mandrel 173 has a downwardly opening bore 200 in which the valve element neck 201 is slidably fitted. The neck is slightly reduced in outside diameter along the upper end section 201a to provide a small annular space for control fluid to flow upwardly to the upper end of the neck. A valve element 202 is threaded into the lower end of the neck so that the neck and valve element move longitudinally as a unit relative to the mandrel. The neck 201 is initially rigidly secured to the mandrel by the shear pin 203 which extends through a lateral bore 204 in the mandrel into a recess 205 formed in the neck. A longitudinal bore 210 extends through the neck and the upper end section 210a of the valve element. A longitudinally extending and upwardly and outwardly opening external recess 211, see FIGURE 14, is formed in the neck 201 to facilitate control fluid flow from the flow passage 181 through the mandrel upwardly along the neck portion to the upper end of the neck within the bore 200. The upper end section 210a of the valve element 202 has an outside diameter smaller than the diameter of the neck 201 to provide an annular space 212 between the wall of the bore 200 of the lower end section of the mandrel and the outer surface of the upper end section of the valve element. A fluid port 213 extends through the upper end section of the valve element connects the bore 210 with the annular space 212. Control fluid may flow from the annulus 180 around the mandrel through the flow passage 181 upwardly through the slot 211 to the upper end of the neck 201 and then downwardly through the bore 210 and outwardly into the annulus 212 through the port 213.

An annular adapter 214 is threaded on the lower end section of the mandrel 164. An outwardly extending annular flange 215 at the upper end of the adapter holds the packing assembly 175 against downward movement on the mandrel. An inwardly extending annular flange 220 on lower end of the adpter is located around the upper end section of the valve element to engage the lower end of the neck 201 to limit the downward movement of the valve element and the neck relative to the mandrel. The bore 221 through the flange 220 of the adapter around the upper end section of the valve element is slightly larger than the valve element to allow fluid to flow freely around the valve element from the annulus 212.

A valve sleeve 222 is threaded at its upper end on the adapter 214 and extends downwardly therefrom and around the valve element 202. The outer surface of the upper portion of the valve element and the inner surface of the sleeve below the lower end of the adapter 214 are spaced apart to provide an annular space or cylinder 223 in which an annular piston 224 is slidably disposed. O-rings 225 are disposed in internal and external recesses of the piston to seal between the piston and the valve element and the sleeve, respectively. The lower end portion of the sleeve is reduced in internal diameter providing an upwardly facing annular shoulder 231 which limits the downward movement of the annular piston in the sleeve so that the piston is movable between the lower end of the adapter 214 and the shoulder 231.

An external annular flange 232 of the valve element 202 is engageable by the internal annular chamfered lower end of the annular piston. The sleeve 222 is reduced externally to form the downwardly and inwardly sloping external annular shoulder 234 which seats against the shoulder 145 within the bore 134 of the landing nipple to hold the annulus valve against downward movement within the nipple. The sleeve is further reduced along a lower end section to provide the downwardly and outwardly opening external annular recess 235 to receive the packing assembly 240 which is held on the sleeve by the retainer ring 241 threaded on the lower end section of the sleeve. The sleeve 222 is provided with laterally opening slots 242 to permit fluid flow between the lower end of the valve and the window 74. The valve element 202 has a lower enlarged section 243 which provides an annular shoulder 224 engageable with the annular shoulder 244a of the sleeve 222 to limit the upward movement of the valve element in the sleeve. A seal ring 245 is positioned in an external annular recess of the lower end portion of the valve element to seal between the valve element and the inner surface of the sleeve when the valve element is in its upper closed position in the sleeve. As will be explained hereinafter, fluid pressure applied through the control line is employed to force the valve element and its neck downwardly to shear the pin 203 and open the valve after which the valve is held open by the control fluid pressure acting above the annular piston 224 and the neck reduced end section of the valve element.

The primary function of the annular piston 224 is to reduce the control fluid pressure required to open the completion valve. With the valve in its closed position as illustrated in FIGURE 12 the well fluid pressure within the bore 93 is acting to hold the valve closed over an effective area defined by the line of sealing engagement of the O-ring 245 with the wall of the bore 251. When the control fluid pressure is raised to open the valve it acts downwardly over an effective area of the valve defined by the line of sealing engagement of the outer ring seal 225 on the annular piston with the inside wall of the upper section of the sleeve 222 which is a somewhat larger area than that acted upon by the well fluids holding the valve closed. The provision of the annular piston therefore minimizes the control fluid pressure required to open the valve. The conrtol fluid pressure acting on the upper end of the piston forces the piston downwardly also moving the valve element downwardly due to the engagement of the lower end of the piston with the external annular shoulder 232 on the valve element. When the annular piston reaches its lower limit of travel by engaging the internal annular shoulder 231 within the sleeve 222, the valve is partially open with the ring seal 245 having been moved downwardly from the wall of the bore 251 a short distance. With the valve partially open the fluid pressure from the bore 93 now acts upwardly against an effective area of the valve element defined by the line of sealing of the inner ring seal 225 with the outside of the valve element above the flange 232. The annular piston cannot move farther downwardly and thus the control fluid pressure acts downwardly on the same effective area of the valve element within the inner ring seal 225 moving the valve element to the full open position with the valve element being held against farther downward movement by the engagement of the lower end of the neck 201 with the internal annular flange 220. Thus, the annular piston aids in the opening of the valve by providing a large area for the control fluid pressure to act on to initiate the valve opening.

When the control fluid pressure is reduced or the well fluid pressure increases until the upwardly acting pressure on the valve element over the effective area defined by the inner ring seal 225 exceeds the downwardly acting control fluid pressure over an equivalent effective area, the valve element moves upwardly toward the closed position. When the flange 232 engages the lower end of the piston the valve will be partially open and the valve element starts lifting the piston back to the position illustrated in FIGURE 12. About the time that the valve element engages the piston the enlarged lower end section 243 of the valve element enters the bore of the sleeve to severely restrict the flow through the valve and develop a pressure differential across the lower end section of the valve element over an area substantially as defined by the ring seal 245 to cause the valve to move on to its fully closed position. The dampening effect of the control fluid acting on the upper surfaces of the annular piston over an area defined by the line of sealing of the outer ring seal 225 with the inside of the sleeve prevents the valve from sudden closure of "snap action".

The completion valve 61a is employed during installation of the system in a well bore. Prior to initiation of regular production the valve 61a is preferably replaced by the annulus flow control valve 61 which is illustrated in FIGURE 4-B. The valve 61a after it is removed from the nipple may be converted into the valve 61 by removing the adapter, the sleeve 222, the valve element 202, and the neck 201 and the fragments of the severed shear pin 203 and then assembling the adapter 251, the upper neck 252, the valve element 253, and the sleeve 254, to the mandrel. The upper neck 252 is bifurcated along substantially the upper half of its length to form the longitudinally extending slot 255 which receives the guide pin 260 so that the neck and valve element will be properly oriented and will not rotate within the sleeve and mandrel. The guide pin is fitted in the lateral bore 204 through the mandrel as had been the shear pin 203. The slot 255 is of sufficient length to permit the necessary longitudinal movement required for the valve element to move between open and closed positions. The reduced upper portion 261 of the valve element is threaded into the lower end section of the neck and both the neck and the valve element are provided with a longitudinal bore 262 which communicates with the lateral port 263 to allow fluid to flow downwardly through the neck and the upper end portion of the valve element and laterally outwardly from the valve element into the annular space 264 between the sleeve 254 and the reduced portion of the valve element in which the previously descirbed annular piston 224 is disposed for longitudinal movement. The sleeve 254 is threaded on the adapter 251 which in turn is threaded on the lower end of the mandrel 164. The sleeve is reduced internally to provide the upwardly facing internal annular shoulder 265 which limits downward movement of the annular piston 224 within the sleeve. Upward movement of the annular piston is limited by the lower end of the adapter 251. The lower end of the neck member 252 engages the inwardly extending internal annular flange 251a on the adapter to limit the downward movement of the neck member and valve element. The sleeve 254 is reduced along a central section to provide annular space around the sleeve within the bore 234 to facilitate movement of fluids from the sleeve within the bore toward the lateral window 135 from the bore. An external annular flange 270 provides a downwardly facing annular shoulder 271 which seats on the internal annular shoulder 145 around the bore 134 of the landing nipple to limit the downward movement of the valve 61 within the bore of the nipple. The annular ring seals 272 are positioned around the lower end section of the sleeve to seal between the sleeve and the wall section 144 of the bore 134. The enlarged central section 274 of the valve element is provided with a transverse longitudinally extending substantially rectangular slot 275 which is sufficiently long that fluids may flow into the valve from below the flange 146 of the nipple when the valve is in open position into the slot upwardly through the slot within the sleeve to the upper end section of the slot where the slot opens into lateral ports 280 in the sleeve 254 through which the fluids flow into the bore 134 around the sleeve and outwardly from the landing nipple thorught the window 135. The lower end section of the valve element includes a reduced section 281 and a cap member 282 which is threaded on the lower portion of the section 281. An upwardly and inwardly opening recess 283 is formed within the cap to receive the spring 284 which is confined within the cap between the lower end of the recess and the lower face of a sleeve 285 which fits in sliding relationship over the lower end of the central section 274 of the valve element. The sleeve 285 is biased by the spring 284 upwardly over the ring seal 290 fitted in an external anular recess formed around the central section 274 of the valve element near the lower end thereof. The upwardly extending annular flange 292 formed on the upper end of the cap member 282 forms an upwardly opening recess into which the sleeve 285 is movable against the force of the spring 284. The upper downwardly sloping end 294 on the cap member is engageable with the downwardly and inwardly facing seat surface 295 on the lower end of the sleeve 254 to close the valve against fluid flow when the valve element is in an upper position. When the valve element moves upwardly until the surface 294 engages the seat 295 the upper end of the sleeve 285 is depressed downwardly by the seat surface with the sleeve 285 being received within the recess 283 and thus uncovering the ring seal 290 so that it may seal between the bore of the sleeve and the outer surface of the central portion of the valve element to prevent fluid flow through the valve. The sleeve 285 is biased upwardly over the ring seal by the spring 284 when the valve is in open position to maintain the size and shape and to protect the ring seal against fluid erosion. The sleeve also minimizes throttling around the ring seal when moving the ring seal downwardly away from the valve sleeve into the sleeve 285. The upper end of the sleeve 285 continues to seal to some extent with the lower end of the valve sleeve as the ring seal is moved downwardly with the valve element. This action reduces the load on the ring seal which tends to extrude it between the valve element and valve sleeve. Thus, the sleeve 285 makes easier movement of the ring seal out of sealing engagement with the valve sleeve.

Referring now to FIGURE 4B, the tubing valve 60 used to control fluid flow into the upper tubing string 54 is illustrated locked in the position in the bore 133 of the landing nipple with the ball valve element of the valve in open position to permit fluid flow through the valve into the tubing string. A locking assembly 300 mounted on the carrier mandrel 301 of the valve includes locking dogs 302 receivable in the locking recess 143 for holding the valve against upward movement in the bore of the landing nipple. The locking assembly may be of the type described and illustrated in FIGURES 1, 2, 4 and 5 of the United States Patent No. 2,920,704 issued to John V. Fredd on Jan. 12, 1960. A packing 303 is positioned in the upwardly and outwardly opening recess 304 of the mandrel 301 and held against upward movement by the lower end of the dog holder 305.

A housing 310 is threaded into the lower end of the mandrel 301 and provided with an upwardly and outwardly opening recess 311 to receive the packing 312 which is held against upward movement by the lower end of the mandrel and against downward movement by the bottom surface of the recess. The lower end section 313 of the mandrel 301 is slightly reduced in outside diameter providing an annular space 314 around the mandrel between the packings 303 and 312. A plurality of radial ports 315 extend through the mandrel so that control fluid may flow from the vertically extending passage 151 through the passage 153 and the annular space 314 and then into the mandrel through the ports 315.

A downwardly and inwardly opening internal recess 320 is formed within the mandrel 301 to receive the upper end of the tubular upper ball valve seat 321. A downwardly and inwardly opening recess 322 is formed in the mandrel 301 below the recess 320 to receive the split ring 323 which is held against upward movement by the surface of the mandrel defining the top of the recess 322 and against downward movement by the upper end of the housing 310 which has an upwardly and inwardly opening recess 423 to receive the lower end of an outward circumferential portion of the split ring. The inner circumferential portion of the split ring is received in the external annular recess 325 of the upper end section of the upper valve seat so that the split ring holds the upper valve seat against longitudinal movement relative to the housing and mandrel. The recess 322 is slightly larger in diameter than the split ring 323 to provide space for control fluid to flow through the ports 315 and freely distribute around the valve seat within the lower end section of the mandrel. An internal annular recess 330 of the mandrel 301 has an O-ring 331 which seals between the upper end section of the upper valve seat and the mandrel.

The upper end section of the housing 310 is slightly larger in inside diameter than the outside diameter of the upper valve seat to provide the annular space or passage 332 through which control fluid may flow to the internal annular downwardly opening recess 333 forming the annular cylinder 334 within the housing around the upper valve seat. The lower end section of the upper valve seat has an external annular flange 335 whose upwardly facing external annular shoulder 340 is engageable by the downwardly facing internal annular shoulder 341 on the lower end of an annular piston 342 slidably disposed within the annular cylinder 334. Internal and external annular ring seals 343 and 344 are positioned within the internal and external annular recesses of the annular piston and seal between the piston and the upper valve seat and the housing. The annular piston 342 is reciprocatable within the annular cylinder.

The lower end of the upper valve seat 321 has an inwardly and downwardly facing spherical valve seat surface 352 which engages a ball valve 353 rotatably positioned and confined between the upper valve seat and a lower valve seat 354. The lower valve seat has an upwardly facing spherical seat surface 355 to engage the ball valve and a plurality of lateral ports 356.

An annular tubular depending sleeve 360 of the annular piston extends downwardly therefrom around the lower end section of the upper valve seat, the ball valve, and the upper end section of the lower valve seat. The lower end of the sleeve is received in an upwardly and outwardly opening annular recess 361 formed in the annular ring 362 fitting in sliding relationship around the lower valve seat and biased upwardly by the spring 363. An elongated window or slot 364 is formed in the sleeve 360, as seen in FIGURES 36 and 37, to accommodate the two operator members 365 and 370 which are moved longitudinally by the sleeve and oscillate circumferentially toward and away from each other while rotating the ball balve between open and closed positions responsive to upward and downward movement of the sleeve. The operator member 365 has an operator knob 371 received in the operator hole 372 of the ball valve. A similar operator knob 373 is formed on the inner face of the operator member 370 extending into the operator hole 374 of the ball valve. An axial flow passage 375 extends through the ball valve allowing fluid to flow through the ball valve when it is positioned as illustrated in FIGURES 4B, 11 and 36. Longitudinal movement of the operator members, which is effected by movement of the sleeve 360, causes the operator members to be raised and lowered to rotate the ball valve through an angle of approximately 90 degrees between open and closed positions. The ball valve rotates about an axis 380 which extends perpendicular to the hypothetical line 381 dividing the angle between the operator holes in the ball valve. As the ball valve rotates about the axis 380 the operator holes move through a circular path about the axis and thus move both longitudinally and circumferentially relative to the sleeve around the ball valve. Since the operator knobs are received in the operator holes, the knobs must also move both circumferentially and longitudinally causing the operator members to move toward and away from each other within the window as the sleeve is reciprocated to rotate the ball valve between its open and closed positions. Each of the operator members moves circumferentially within the window through an arc of approximately 10 degrees while rotating the ball valve between its open and closed positions. Each of the operator holes however move through an arc of approximately 15 degrees as the ball valve is rotated with the shorter arc movement of each of the operator knobs due to the fact that the knobs move a short distance into and out of the operator holes as the ball valve rotates. When the ball valve is in either its fully open or fully closed position the operator knobs are in outer positions as shown in FIGURE 4B and as the ball rotates through a middle position between the fully open and fully closed position the operator knobs move farther inwardly into the operator holes and are at their farthest inward position at the middle position of the ball valve. Thus, the operator members' combined movement toward and away from each other totals 20 degrees during the rotation of the ball valve. The ball valve, of course, does not move longitudinally during its rotation since the valve is confined between the fixed upper valve seat and the spring loaded lower valve seat which urges the ball valve upwardly against the upper valve seat.

A lower tubular housing member 382 is threaded into the lower end of the housing 310 and has a reduced lower section 383 which provides a downwardly and outwardly facing annular shoulder 384 which seats on the shoulder 142 within the landing nipple to limit the downward movement of the tubing valve 60 within the nipple. An upwardly facing internal annular shoulder 385 within the lower housing member supports a retainer ring 390 which engages the lower end of the spring 363 confining the spring between the retainer ring and the lower face of the ring 362 biasing the sleeve 360 and annular piston 342 upwardly and thus the ball valve toward its closed position. The ball valve is held in an open position by control fluid pressure within the annular cylinder 334 above the annular piston 342. An inwardly extending annular flange 391 is formed within the lower housing member and provides an upwardly facing shoulder 392 to support the lower end of the spring 393, the upper end of which engages a downwardly facing external annular shoulder 394 of a lower tubular member 395. The lower end of the lower valve seat 354 is received in the upwardly and inwardly opening internal recess 400 at the upper end of the tubular member 395. The force of the spring 393 biases the lower valve seat upwardly causing the seat surface 355 to be pressed against the ball valve 353 to hold the ball valve between the upper and lower valve seats.

The tubing valve 60 is insertable into and removable from the bore 133 of the landing nipple by employment of wire line apparatus and procedures as will be explained hereinafter.

Referring to FIGURE 12, the tubing plug valve 163, as will be explained in more detail hereinafter, provides means for closing the tubing to fluid flow after the packer has been set in order to hold the well pressure while certain surface procedures, such as the removal of the blowout preventers, are being carried out. A locking assembly 401 is secured on the mandrel 402 of the plug valve. The locking assembly, which includes locking dogs 403 receivable in the locking recess 143 of the landing nipple, is identical to the locking assembly on the tubing valve 60 and is illustrated and described in U.S. Patent No. 2,920,704. The upper and lower packing assemblies 403 and 404 are received in the upwardly and downwardly opening recesses 405 and 410, respectively, of the mandrel 402. The packing assemblies seal between the mandrel and the wall forming the bore 133 of the landing nipple. A tubular cage 411 is threaded on the lower end section of the mandrel 402 and is provided with downwardly and outwardly opening elongated slots 412 which open through the lower end of the cage. The bore 413 of the cage is reduced along a lower section 414 thereof which provides an upwardly facing annular internal shoulder 415. The lower end of the bore 413 is substantially closed by the end portion 420 which is provided with the small port 421.

A ball valve assembly 422 is releasably held within the cage at the lower end of the mandrel by a shear washer 423 confined between the lower end of the mandrel and the ring 425 positioned within the upwardly and inwardly opening internal annular recess 430 formed within the upper end section of the cage 411. An upper valve seat member 431 of the ball valve assembly is received in the downwardly and inwardly opening recess 432 formed within the lower end section of the mandrel 402 to hold the valve assembly against upward movement. The ball and spring cage 433 is threaded on the lower portion of the upper valve seat member with the inner circumferential portion of the shear washer 423 being confined between the upper end of the cage and the downwardly facing external annular shoulder 434 formed on the upper valve seat member. Thus, the inner circumferential section of the shear washer is secured to the ball valve assembly while the outer circumferential section of the shear washer is secured to the lower end of the mandrel to releasably hold the ball valve assembly against downward movement within the lower end of the mandrel.

An annular valve seat surface 435 is formed at the lower end of the upper valve seat member around the bore 440 through the seat member. The upper ball valve 441 is biased against the valve seat surface 435 by the spring 442 which at its lower end engages the lower ball valve 443 which seats on the valve seat surface 444 formed around the circular port 445 through the lower end of the cage 433. The spring 442 thus biases the upper ball valve against the upper seat surface 435 on the upper valve seat member and biases the lower ball valve against the seat surface 442 formed around the port 445 of the cage.

The double ball valve arrangement prevents both upward and downward fluid flow through the plug valve. Downward fluid flow through the plug valve which would depress the upper ball valve 441 is prevented from moving through the lower end of the plug valve assembly by the lower ball 443. Upward fluid flow which would raise the lower ball valve 443 is prevented from movement through the bore 440 of the upper valve seat by the seating of the upper valve 441 against the seat surface 435. A downward pressure differential, however, across the ball valve assembly may be withstood only to the extent that the force resulting from the pressure differential is resisted by the shear washer 423. Fluid pressure or the mechanical force of a prong applied through the mandrel 402 against the ball valve assembly will rupture the shear washer when the pressure exceeds a predetermined value to allow the entire ball valve assembly 422 to drop downwardly into the lower end section of the bore 413 within the cage with the assembly held against further downward movement by engagement of the external annular downwardly facing shoulder 450 on the cage 433 with the upwardly facing internal annular shoulder 415 within the cage 411. With the ball valve assembly in this downward position, fluid may flow through the plug valve as the slots 412 are open into the bore 402a through the mandrel 402. The plug valve may be introduced into and removed from the landing nipple by the conventional wire line apparatus and procedures. The plug valve will withstand substantial upward pressures to plug the well below the landing nipple and is openable by application of fluid or mechanical pressure from above the valve so that the pressure conditions within the casing may be stabilized prior to removal of the valve by wire line apparatus. When the plug valve is lowered through the well bore into the landing nipple, a prong carried by the running tool depresses the upper ball 441 slightly below the seat surface 435 so that in a liquid filled hole the plug valve may be lowered through the liquid with the ball 443 being lifted off the seat surface to permit the liquid to flow upwardly through the plug valve during the lowering operation. When removing the plug valve from the landing nipple the prong on the pulling tool engages the upper ball 441 depressing the ball to allow any fluid within the bore 413 of the valve to lift the lower ball 443 so that the double ball assembly may be pushed downwardly by the prong to rupture the shear washer 423 so that the double ball assembly may drop downwardly into the lower end of the cage 422 completely opening the valve. The piston effect of the liquid below the ball assembly is avoided by allowing the lower ball to move upwardly to allow the fluid to flow through the ball assembly.

The eccentric or offset positioning of the bore 134 in the landing nipple necessitates the use of a special running and setting tool 460 for installing the valve 61 and 61a therein. The running and setting tool 460 shown in FIGURE 16, includes a head assembly 461, a latching assembly 462, and a shank 463 which connects the latching assembly and the head assembly. The head assembly includes a housing 464 having a neck 465 which has an upper threaded end section 470 above an external annular flange 471 which provides a downwardly facing annular shoulder 472. An upper bore 473 extends from the large bore 474 within the housing into and terminates in the neck. A socket 475 has an upper neck 480 slidable within the bore 473 and a spring 481 disposed about the socket is confined between the outwardly extending lower annular flange 482 of the socket and the shoulder 482a defining the upper end of the enlarged bore 474 to bias the socket downwardly. A downwardly opening and outwardly flaring recess 483 in the socket member receives the short rod 484 the ends of which are spherical in shape. The flared shape of the recess permits the upper end of the rod to pivot within the recess allowing the major portion of the rod to move a substantial distance laterally within the recess providing substantially the same effect as a ball and socket joint. The upper enlarged end section 485 of the shank has an upwardly opening and outwardly flaring recess 490 which receives the lower end of the rod 484 to provide similar pivotal movement therebetween whereby the upper end section of the shank and the lower end of the rod may remain engaged while the ends of the rod and shank move laterally within the housing. A retainer 491 is threaded into the lower end of the housing to retain the upper end section of the shank within the housing. The bore 492 of the retainer has a short downwardly opening outwardly flaring lower end section 493 and a longer upwardly opening and outwardly flaring upper section 494 for receiving the major portion of the upper end section 485 of the shank while permitting such section to swing laterally within the retainer member about an axis, not shown, slightly above the junction between the upper and lower bore sections 493 and 494 of the retainer.

The bore 492 has a minimum diameter at the junction between the sections 493 and 494 which is less than the diameter of the upper end section 485 of the shank but larger than the shank below the upper end section so that the upper end section is held within the housing against downward movement by the retainer member in a ball and socket fashion allowing the shank to swing laterally to allow substantial lateral movement by the latching assembly. The downward force of the spring 481 is transmitted through the flange 482 to the socket member causing force to be applied to the upper end of the rod 484 tending to force the rod downwardly. The spring is effective to hold the link 463 in vertical alignment with the head assembly when the link is initially moved thereto since the axis of pivotal movement of the opposite ends of the rod 484 and of the upper end section are then in vertical alignment. Any vertical jarring imparted to the running tool which tends to move the housing relative to the socket member and also misaligns these axes will cause the spring to move the rod 484 and the upper end section of the shank to the off center positions illustrated in FIGURE 16, causing the lower end of the shank to move a substantial distance laterally since the major portion of the length of the shank is below the shank pivot point within the retainer 491.

The lower end section 494 of the shank is threaded into the upper end of a link 495 which is locked on the shank by the nut 500 threaded on the lower end section of the shank above the member 495. The lower bifurcated end section 501 of the link 495 is positioned over and pivotally connected by a pin 502 to the collet 503 of the latching assembly, the pin extending through the end section 501 and the head section 504 of the collet. A plurality of collet fingers 505 extend downwardly from the head section and are separated by the longitudinally extending downwardly opening slots 510. The collet fingers have external recesses 511 near their lower ends which provide spaced downwardly and inwardly extending shoulders 512 and downwardly and outwardly extending shoulder 513. The lower ends of the collet fingers have downwardly and outwardly sloping soulders 514. The bore 515 of the collet is reduced in diameter along the upper end section 520 providing a downwardly and outwardly sloping shoulder 521 at the junction between the lower section of the bore and its reduced upper end section. The collet fingers have upper internal upwardly facing shoulders 523 and internal bosses 124 at their lower ends which provide lower internal upwardly facing shoulders 525.

A prong member 530 extends into the collet and has an enlarged central section 531 providing a downwardly facing annular shoulder 532 which is engageable with the upwardly facing upper shoulders 523 of the collet fingers to limit downward movement of the prong member relative to the collet. The prong member has a longitudinally extending slot 533 which opens at its lower end into a transverse bore 534 extending through the enlarged section 531 to separate the prong into a pair of upwardly extending resilient fingers 535 whose upper ends have external upwardly and inwardly sloping shoulders 540. The fingers 535 are sprung apart with their normal permanent position of the fingers being illustrated in FIGURE 17, the shoulders 540 being engageable with the shoulder 521 of the collet to hold the prong releasably against upward movement within the collet. A transversely extending pin 541 connected to a pair of opposed collet fingers adjacent their upper ends extends through the slot 533 to hold the prong against rotation relative to the collet for purposes which will be explained hereinafter. The prong is reduced in diameter below the enlarged section 531 and has a rectangular shaped lug or key 542 on its lower end. The lower section of the prong is provided with the external annular recess 543 to provide the downwardly facing annular shoulder 544 and the upwardly facing sloping annular shoulder 545. The prong is insertable into the collet by springing the collet fingers apart and introducing the prong upwardly into the collet until the lower end 532 of the enlarged section 531 of the prong is above the shoulder 523 within the collet fingers with the transverse pin 541 being positioned within the slot 533 of the prong.

The running and setting tool is readily convertible to a pulling tool for removal of well tools from the offset bore of the landing nipple by substitution of the latching assembly 462a for the latching assembly 462. The substitution is made by removal of the latching assembly 462 from the shank by pulling the pin 502 and securing the latching assembly 462a on the shank with the pin 502. The prong 530a of the latching asembly 462a differs from the prong 530 only in the figuration of the upper and lower end sections of the prong and thus only these variations will be described since the major portion of the prong has been previously described. The upper end section 550 of the prong below the cam surfaces 540 is reduced to provide an upwardly and outwardly sloping cam surface or shoulder 551 on each of the prong fingers to allow the prong fingers to be cammed inwardly and moved to an upper intermediate position where the surfaces 551 engage the surfaces 521 within the collet fingers. The lower end section of the prong 530a is provided with the upper and lower external annular recesses 552 and 553 separated by the external annular flange 554. At the lower end of the lower recess 553 the external annular flange 555 is formed on the prong. It will be noted that the lower end of the prong is not provided with the key 541 as orientation of the well tools is not necessary during removal from the landing nipple. The prong 530a and the collet 503a are readily substituted for the prong 530 and collet 503 to convert the setting tool to a pulling tool. The collet 503a differs from the collet 503 only with respect to the external annular recess 546 which corresponds to and is several times the length of the recess 511.

FIGURE 23 illustrates portions of the wireline tool string 560 utilized to shift the flow tube 71 downwardly during the setting of the packer 52. The tool string includes a knuckle joint 561, jars and a stem, not shown, and a wireline socket 562 on which is secured the cap 563 through which the lower end of the wireline 564 is connected. The upper pin 566 of the body member 565 is threaded into the knuckle joint with the fishing neck 570 seating against the lower end of the knuckle joint to provide additional upper end area on the main body section and minimize the load on the threads to reduce thread damage during the jarring action to which the tool is subjected while driving the tube 71 downwardly. The body member 565 is enlarged along a central section 571 and reduced along the lower end section 572 to provide a downwardly and inwardly sloping external annular shoulder 572 which is engageable with the upper internal annular end surface 94 of the tube 71. The lower end section of the body member slopes downwardly and inwardly forming the surface 574 to guide the tool into the upper end of the flow tube. A similar wireline tool string, excluding the body 565, is illustrated at page 3742 of the Composite Catalogue of Oil Field Equipment and Services, supra.

A running tool 580 for installing the double plug valve 163 and the tubing flow valve 60 is illustrated in FIGURE 42. The running tool includes a top sub 581 having an upper reduced threaded end section 582 for connection to the lower end of a tubing string or wireline tool string for running the tool through a well bore. The lower end section 583 of the top sub is reduced in diameter and externally threaded to permit the engagement of the sleeve 584 which is held against rotation on the top sub by the set screw 585 which is threaded through the sleeve into engagement with the lower end section of the top sub above the threads. The sleeve is provided with a plurality of centrally located ports 590. The bore 584a of the body is reduced along the lower end section 591 to provide an upwardly facing internal annular shoulder 592 which seats against the external downwardly facing annular shoulder 593 formed on the upper enlarged end section 593a of the mandrel 594 which is telescopically positioned within the body and extends downwardly therefrom through the lower end of the body. The mandrel is provided with a lateral shear screw hole 600 adapted to receive a shear screw utilized in connecting the running tool with the latch assemblies on the ball plug valve and the tubing flow control valve. The ports 590 and the bore through the mandrel 594 permit fluid to freely bypass the tool as it is moved through a well bore which may be fluid filled. The prong 602 used in installing the double ball plug valve is shown engaged with the running tool. The upper end section of the prong is held in the mandrel 594 of the running tool by the retainer ring 602a threaded on the upper end of the prong. The lower end of the retainer ring engages the upper end of the mandrel while the lower end of the mandrel engages the upwardly facing external annular shoulder 602b on the prong. The reduced lower end section 602c of the prong has a lower end 603 which is engageable with the upper ball 441 of the plug valve to depress the ball downwardly when the prong is assembled in the valve. A hole 604 is provided in the prong to receive a shear pin used to connect the prong to the mandrel of the plug valve to prevent movement between the prong and the mandrel of the valve during installation of the valve. The prong must hold the upper ball down from its seat but must not break the shear washer holding the double ball assembly and therefore the prong cannot move downwardly within the plug valve. At the upper end of the reduced section 602c the prong is provided with a downwardly facing seat surface 604a which is engageable with the member 431 of the double ball plug valve. At least one slot 605 extends longitudinally along the length of the prong to allow fluid to bypass the prong into the running tool and flow outwardly through the ports 590. To secure the running tool to the plug valve the mandrel of the running tool is inserted into the fishing neck of the valve and secured by a shear pin, not shown, inserted through the holes 403b and 600. The prong is secured to the mandrel of the valve by a shear pin, not shown, extending through the hole 604 of the prong and the hole 403d of the mandrel 402 of the valve. With the prong so positioned the lower end 603 of the prong depresses the upper ball 441 of the vlave so that fluid in a well bore may lift the lower ball 443 to allow flow upwardly around the upper ball and the prong and from the running tool through the holes 590.

The subsurface fluid flow system illustrated in FIGURES 1 and 2 is installed in a well bore in accordance with the following procedure. The lower tubing string 65 is run into the well bore with the uppermost section of the tubing string being secured to the lower end of the bottom mandrel section 102 of the packer 52 by means of the adapter 100 so that the lower tubing string is supported from the packer. The length of tubing string 65 is dependent upon the distance between the depth in which the packer 52 is to be set in the well bore and the depth of the producing formation from which the fluids produced will flow. Generally, the formation will be sufficient distance below the elevation to which the packer is to be set to require that the tubing string 65 be made up of a number of pipe secions which are connected together as the string is lowered into the well bore by conventional oil field procedures. The lower tubing string is connected with the packer 52 by the adapter 101 which is threaded on the lower end section 102 of the packer mandrel and the upper end of the tubing string. The section of the tube 71 extends through the packer mandrel and into the adapter at the lower end of the packer as illustrated in FIGURE 4F. The sliding sleeve 127 of the packer is manually moved upwardly until the lateral threaded port 126 in the sleeve is aligned with the lateral bore 122. The flow tube 71 is manipulated until the ring 124 is positioned around the bore 122 at which time the shear plug 121 is inserted through the bore 126 and threaded into the bore 122 until the inward end 121a of the plug is within the ring 124 substantially against the outer surface of the flow tube. A suitable grease fitting, not shown, is then threaded into the bore 126 and a grease, such as cup or water pump grease, is forced through the bore into the annular chamber 125 displacing the sleeve downwardly and expanding the chamber until the sleeve reaches its lower limit of travel. The downward movement of the sliding sleeve pulls the upper slips 52a downwardly causing them to be retracted inwardly so that the packer may be introduced through the casing to the desired depth. The grease is injected into the chamber until sufficient pressure is built up to hold the lower sealing element 52c of the packer against upward movement when the packer engages the wall of the casing. Of course, as the grease is injected into the annular chamber, the downward displacement of the sliding sleeve moves the lateral bore 126 out of alignment with the bore 122 which is now permissible since the alignment of the two bores was necessary only for the insertion of the shear plug into the bore 122. When sufficient grease has been injected into the chamber 125 the grease fitting is removed and replaced with a threaded plug 128 to hold the grease in the chamber. As shown in FIGURE 4F, the shear screw 113 is threaded through the bore 114 against the outer surface of the flow tube 71 to hold the flow tube against longitudinal movement while the packer is being lowered through the well bore to the depth at which it is to be set. The outer end of the bore 114 is then closed by the plug 120. With the flow tube locked in place against longitudinal movement and the packer slips being held in retracted position by the grease within the annular chamber 125, the upper adapter 83 is threaded on the upper end section 84 of the packer mandrel 85. The centralizer 131 is placed over the flow tube 71, the tubular housing 73 is positioned over the flow tube and centralizer and threaded into the upper end of the adapter. The body member 90 with the attached landing nipple 91 together with the tubular member 154 and the head member 160 are secured as a unit on the upper end of the housing 73. In securing the body 90 on the tubular housing the flow tube 71 is first inserted into the bore 92 and the body 90 is threaded on the upper end of the housing 73. While the end of flow tube extending into the bore 92 is displaced laterally somewhat from the longitudinal axis of the housing and the tubular member the length of the flow tube between its upper end and the packer provides sufficient flexibility in the tube to permit rotation of the body 90 with the upper end of the tube in place while connecting the body to the upper end of the housing. When all of the above described elements including the head member 160 are secured on the packer, the bottom section of the upper tubing string 54 is connected into the head member to lower the packer into the well bore to the desired depth at which the packer is to be set. The bottom section of the control line 63 is also conneced into the head 160 and the control line is run into the well with the upper tubing string.

Before the packer 52 can be hydraulically set within the well bore by fluid pressure introduced through the tubing string to create a pressure differential across the lower sealing element, it is necessary that the bore 134 through the landing nipple communicating with the side window 135 be closed since any pressure applied into the tubing casing annulus 62a below the lower sealing element would pass back up through the packer through the ports 104, along the annular space 103 within the packer, and through the housing 73 around the flow tube 71 into the lower end of the bore 134 and through the bore 93 of the tubular member on which the landing nipple is mounted. Thus, unless the bore 134 is closed, pressure cannot be increased in the annulus 62a below the packer. The closure of the bore 134 is accomplished by landing and locking the completion valve 61a within the bore with the valve held releasably in the closed position by the shear pin 203 as illustrated in FIGURE 12. The completion valve may be installed in the landing nipple at the surface before lowering the nipple along with the packer and related apparatus down through the well bore or the valve may be landed and locked in the nipple after the packer is positioned on the tubing string at the desired depth within the casing.

The completion valve may be installed in the landing nipple with the running and setting tool 460 illustrated in FIGURE 16 to connect the tool 560 to the completion valve, the prong 530 of its latching assembly 462a is pushed upwardly as far as it will go within the collet causing the surfaces 540 on the upper ends of the prong fingers 535 to engage the collet shoulder 521 and this engagement cams the fingers toward each other so that the upper end sections of the fingers move into the bore 520 of the head member 504 of the collet aligning the recess 543 on the prong with the internal bosses 524 of the collet fingers 505 so that the lower ends of the collet fingers may be moved resiliently inwardly around the prong. As the collet finger bosses are inserted into the upper end of the locking finger ring 192 on the completion valve locking assembly their surfaces 514 engage the upper and outwardly sloping surface 192a of the ring 192 and the lower ends of the collet fingers are cammed inwardly and their bosses 524 enter into the annular recess 543 of the prong and then snap outwardly when the internal annular flange 192b within the locking finger ring 192 is aligned with the external recesses 511 of the collet fingers. The collet fingers then spring outwardly out of the recess 543 so that the collet may be lifted relative to the prong while the collet fingers are now secured to the ring 192, their inward movement now being prevented by the engagement of their internal bosses with the prong above the recess 543. In inserting the collet fingers within the ring 192 of the valve, the collet and the prong are rotated until it is determined that the key or lug 542 is aligned within and will slip downwardly into the recess 195 at the upper end of the mandrel 173 of the valve so that the valve will be properly aligned with the nipple side window upon insertion into the landing nipple. The ports 242 are aligned as shown in FIGURE 12 to discharge fluid in direction perpendicular to the view shown so that they will flow into a zone of maximum volume in the nipple and will diffuse to a maximum degree before striking the casing. Turbulence is reduced by such flow pattern. When the flange 192b of the locking finger ring is in alignment with the collet finger recesses 511, the collet fingers snap outwardly and the flange is received within the recesses 511 on the collet fingers. The collet is then lifted, raising the locking fingers 191 from within the collet finger heads 190 on the completion valve so that the valve collet fingers may be cammed inwardly to allow the valve to be lowered into the bore 134. As the collet of the running and setting tool is raised relative to the prong, the prong fingers 535 snap outwardly so that the surfaces 540 on the upper end of the prong fingers are in engagement with the internal shoulder 521 within the collet. The position of the locking finger ring 192, the prong, and the running tool collet are shown in FIGURE 17 with the completion valve fully engaged on the running tool and ready to be introduced through the upper tubing string and the head 160 into the tubular member 154 and then the landing nipple. The running tool with the completion valve attached is connected to a wireline tool string for lowering the valve and running tool through the upper tubing string.

The completion valve is lowered by the running tool through the head member 160 into the tubular member 154 above the landing nipple 91. The running tool is basically so unstable that the slightest disturbance misaligns it. Generally the tool is misaligned when it and the valve are lowered through the tubing and they rub the tubing wall. As the tool and valve enter the member 154 the spring 481 acting through the socket member 475 forces the shank laterally as far out of vertical alignment as space will permit the valve and shank to move. The spring causes the socket member to press downwardly upon the upper end of the rod such force being applied through the rod into the upper end of the section 485 of the shank forcing the shank to pivot about its axis within the retainer 491 to the maximum degree permitted by either the tapered bore 494 or the distance the shank and valve can move within the tubular member 154 surrounding the valve and the shank. The valve and latch assembly are thus moved laterally until they engage the inside wall of the tubular member over the bore 134 as this is the maximum distance out of alignment with the axis of entry through the head member to which the "kick-over tool" can move the valve and latch assembly. The misaligning feature of the running tool will maintain the valve and latch assembly misaligned to this maximum degree possible, the running tool being capable of rotation since it is lowered on a flexible line, as the running tool is lowered and thus the valve and latching assembly will essentially slide along the wall of the tubular member 154 at the position above the bore 134 of the landing nipple since this represents the maximum distance that these members can move within the tubular member away from the axis on which they entered the tubular member. The shank 463 and the collet 503 are connected together by the pin 502 which extends perpendicular to the longitudinal axis of both the shank and collet. As misalignment occurs, the pin must, therefore, remain perpendicular to both the shank and collet. When the shank and collet are misaligned they must pivot about the pin 502. Thus, when the collet is displaced to the farthest surface in the member 154, the pin must be parallel to a line drawn tangent to the circular wall and the ports 242 of the valve are properly aligned relative to the landing nipple since the valve is keyed by the slot 195 to a fixed position relative to the pin 502. The valve is lowered with the ramp surface 159 at the upper end of the landing nipple guiding the lower end of the valve into the bore 134. The valve moves downwardly in the bore until the external annular shoulder 234 on the valve sleeve 165 seats on the internal annular upwardly facing shoulder 145 within the landing nipple around the bore 134. Since the locking fingers 191 on the locking assembly 170 of the completion valve are being held by the collet of the running tool in an upward position and are free to move inwardly the collet fingers on the locking assembly of the valve are cammed inwardly and slide along the wall of the bore 134 until the heads or bosses 190a of the collet fingers 190 are in alignment with the locking recess 150. The lower ends of the collet fingers then move outwardly and the bosses 190a move into the landing nipple locking recess. The running tool is then jarred downwardly causing its collet fingers 505 to push the locking ring 192 downwardly and therefore its locking fingers 191a downwardly within the collet fingers 190 so that the valve collet fingers are then locked by the locking fingers 191a against inward movement locking the valve within the nipple. During the downward jarring the collet fingers 505 are prevented from being cammed inwardly by the prong 530 which is held downwardly by engagement of the downwardly facing shoulder 521 within the collet head 504 with the upper surfaces 540 on the upper end of the prong so that the recess 543 on the prong is below the running tool collet fingers heads. The downwardly sloping surfaces 512 on the collet fingers 505 engage the upwardly facing shoulder 192a of the ring 192. When the completion valve is locked within the landing nipple the running tool is jarred further downwardly causing the surface 521 to act on the surfaces 540 on the upper ends of the prong fingers camming the fingers inwardly so that they enter the bore 520 to allow the collet to move downwardly over the prong aligning the recess 543 on the prong within the heads of the collet fingers 505. The prong is held in the upward position by the frictional engagement of the wall of the bore 520 with the upper end sections of the prong fingers while the running tool is being lifted so that the camming engagement of the lower shoulder 192c of the flange 192b with the shoulders 513 of the collet fingers cams the lower ends of the collet fingers inwardly and moves their internal bosses 524 into the recess 543 of the prong releasing the collet fingers on the running tool from the upper end of the completion valve so that the latch assembly of the running tool can then be lifted as shown in FIGURE 19 from the valve. The running tool is then withdrawn from the tubular member 154 and the upper tubing string to the surface. With the completion valve locked within the bore 134 of the landing nipple and the valve held by the shear pin 203 in the closed position, fluid can not flow upwardly from the bore 93 through the completion valve and the side window 135 and thus upward flow from below the landing nipple through the side window into the annulus 62 within the casing around the tubing string 54 is prevented.

The next step in the procedure of installing the subsurface flow control system is to release the packer slips 52a on the packer 52 so that the packer may be set within the casing. The jarring tool 560 is secured to a wireline and lowered through the upper tubing string, the head member 160, and the tubular member 154 into the bore 133 of the landing nipple until the reduced lower end section 572 on the setting tool enters the upper end of the flow tube 71. The annular shoulder 573 of the setting tool engages the downwardly and inwardly sloping upper end surface 94a of the flow tube. The setting tool is then jarred longitudinally to move the flow tube downwardly through the packer until the lower end of the flow tube within the adapter 101 seats against and is held against further downward movement by the internal upwardly facing annular shoulder 112 within the adapter. The flow tube had been held in the upper position frictionally by the inner end of the set screw 113. As the tube is driven downwardly the set screw inner end simply drags along the surface of the tube. As the flow tube moves downwardly, the ring 124 engages the inner end section 121a of the shear plug 121 causing the shear plug to be severed and thus opening the bore of the shear plug into the annulus 103 within the packer around the flow tube. With the inner end of the shear plug 121 severed, the grease within the annular chamber 125 can be displaced into the annulus 103. The setting tool 560 is withdrawn through the upper tubing string.

Fluid pressure is applied at the wellhead into the upper tubing string with the pressure being transmitted downwardly through the tubing string, the head member 160, the tubular housing 154, and through the bore 133 of the landing nipple into the upper end of the flow tube 71. The pressure is prevented from entering the upper end of the bore 134 by the completion valve 61 which is locked in place within the bore. The pressure is applied downwardly through the packer through the flow tube 71 and outwardly from the lower end of the lower tubing string 65 upwardly into the annular space around the tubing string and the adapter 101 to exert a force against the lower cup type sealing element on the packer. The annular space 62 between the casing and the upper tubing string is vented at the surface to the atmosphere so that a pressure differential is exerted across the lower seal element. The pressure is, of course, also applied through the ports 104 into the annular space 103 through the packer but since the completion valve 61a is pinned in closed position the pressure following this flow path is not applied upwardly through the landing nipple beyond the O-ring 245 on the valve element of the annulus valve. It will be recognized that if the annulus valve were not held in the closed position it would not be possible to build up the needed pressure below the lower seal element of the packer as the pressure being applied through the tubing string would be simply bleeding down upwardly through the bore 134 and the side window 135 of the landing nipple which communicate directly with the annulus above the landing nipple. The pressure differential across the lower sealing element 52c lifts the seal element along with the sliding sleeve 127 which actuates the slips 52a to move them into locking engagement with the wall of the bore through the casing. The sleeve is released to move upwardly by virtue of the opening of the bore 122 into the annulus 103 by the shearing of the shear plug 121 releasing the grease in the annular chamber 125 so that upward movement of the sleeve may displace the grease from the annular chamber into the annulus 103 to allow the sleeve to move upwardly. The packer is fully engaged with the casing wall by following this procedure, as described at p. 3712 of the Composite Catalogue of Oil Field Equipment and Services, supra.

With the packer fully set, the necessary surface connections including the connection of the control fluid pressure source 64 may be made with the wellhead. If the well has formation fluid presure within it it will be necessary to plug the tubing string so that the blowout preventers may be removed from the wellhead prior to making the final connections. The bore 134 through the landing nipple is already plugged by the completion valve 61a which is in closed position. The plug valve 163 of FIGURE 12 is introduced through the upper tubing string into the bore 133 of the landing nipple to plug the tubing for holding the well presure while removal of the blowout preventers is carried out. The plug plug valve 163 may be installed in the landing nipple with the running tool 580 shown in FIGURE 42.

The plug valve is connected with the running tool 580 which is secured on the lower end of the wireline being employed. In connecting the running tool to the valve the mandrel 594 of the tool is inserted into the mandrel 402 of the valve with the lower end of the mandrel 594 on the tool engaging the upper end of the valve mandrel. The dog expander 403a of the valve is lifted until the shear pin hole 403b is aligned with the shear pin hole 600 in the running tool mandrel, a shear pin, not shown, is inserted through the holes to secure the dog expander with the running tool mandrel thus holding the valve on the running tool and holding the dog expander at an upper position permitting the locking dogs 403 to remain retracted until the valve is properly seated in the bore of the landing nipple. The prong extends into the valve with the surface 604a engaging the member 431 holding the prong against downward movement in the valve. The prong is secured to the valve mandrel by a shear pin, not shown, extending through the holes 604 and 403d. The prong end 604 engages the top ball 441 depressing the ball so that fluid may flow upwardly around the lower ball 443 to bypass the tool and valve as it is lowered. The valve is lowered on the running tool 580 through the upper tubing string 54, the tubular member 154, and into the bore 133 until the external annular downwardly facing shoulder 411a on the valve is seated on the shoulder 142 within the landing nipple holding the valve against further downward movement within the nipple. The running tool may be jarred in a conventional manner if necessary to insure that the plug valve has been driven downwardly to the seated position with the jarring force being applied by the lower end of the body 584 to the upper end of the dog expander with the force being transmitted from the dog expander by the shear pin to the mandrel 594 which is seated in the upper end of the valve mandrel. The jarring force thus applied to the valve mandrel drives the valve downwardly to the desired seated position. The running tool body 584 telescopes over the mandrel 594 until the lower end of the body engages the upper end of the dog expander. With the plug valve properly seated further jarring force is applied through the running tool with the lower end of the body 584 striking the upper end of the dob expander resulting in the fracturing of the shear pin since the body is telescoping downwardly over the mandrel 594 and the mandrel 594 is held against downward movement by engagement of the shoulder 601 on the mandrel with the upper end of the valve mandrel. When the pin is sheared the running tool body telescopes further downwardly over the running tool mandrel forcing the dog expander downwardly causing expansion of the locking dogs on the valve into the locking recess 143 and thus locking the valve within the bore of the landing nipple so that the valve will not be moved upwardly from the nipple by pressure within the well below the valve. With the shear pin severed, the running tool is released from the valve by upward jarring to shear the pin between the prong and the mandrel of the valve and is lifted from the valve and withdrawn from the well bore through the upper tubing string. With the ball plug valve seated in the nipple the upper ball of the valve prevents flow in an upward direction while the lower ball prevents flow in a downward direction. Thus, with the completion valve 61a shear pinned in closed position and the ball plug valve locked in the bore 133 of the landing nipple, the well presure both within the tubing and casing is retained below the valves while the necessary surface connections are installed after the blowout preventers have been removed from the wellhead.

The surface connections made subsequent to the removal of the blowout preventers include the connecting of the flow lines 75 and 80 into the casing annulus 62 and the upper tubing string 54 at the wellhead to permit the fluids flowing in both the tubing string and the casing annulus to flow from the wellhead to the desired storage and treating facilities, not shown. Also, the surface controller 64 is connected with the control line 63 to provide control fluid pressure to the annulus and tubing valves within the landing nipple. The control line may be connected at the wellhead through an Otis Exit Assembly Adapter as illustrated and described at p. 3710 of the Composite Catalog of Oil Field Equipment and Services, 1964–65 edition, published by World Oil, Houston, Texas. The surface controller is any suitable form of controllable fluid pressure source which will provide the necessary fluid pressure to retain the annulus and tubing valves in the open position and which will react responsive to any desired monitored condition to reduce the pressure within the control line to permit the annulus and tubing valves to close when the monitored condition reaches a predetermined state at which it is desired to terminate flow through both the annulus and tubing string in the well bore. A suitable source of control fluid pressure is an Otis Surface Control Manifold as shown at p. 3710 of the Composite Catalogue of Oil Field Equipment and Serivces, 1964–65 edition, published by World Oil, Houston, Texas. The pressure source is interconnected with one or more condition monitoring systems which detect flow dependent and/or non-flow dependent variables to control the source of control fluid pressure for the valves. For numerous obvious reasons it may be desirable to suddenly terminate flow form the well. For example, at an off-shore located well the pressure source may be interconnected with a detector system which would actuate the pressure source to shut-in the well in response to an impact received by the structure surrounding the well from a ship or barge striking the structure with sufficient force to possibly damage the wellhead and allow the well to run freely and perhaps catch fire. Other forms of detector systems which may be interconnected with the surface controller may react responsive to wind velocity to shut-in the well in the event that high velocity winds develop which might result in severe damage to the platform and the wellhead. Other systems which might be installed on a platform include temperature detecting systems which would react to shut-in all of the wells connected with the platform if one of the wells caught fire and threatened to endanger the other wells.

When the surface connections are completed the plug valve is removed form the landing nipple. To avoid having the plug valve blown upwardly by the well pressure when the valve is released from the land nipple it is preferred that the valve be opened to allow the tubing string to be subjected to well pressure and thus eliminate the pressure differential being exerted across the plug valve. Fluid pressure is applied in the upper tubing string above the plug valve until the pressure is raised to a sufficiently high lever to fracture the rear washer 423 allowing the double ball valve assembly 422 to drop downwardly to open the valve allowing flow through the ports 412 to equalize the pressure across the plug valve. The ball valve assembly 422 may also be displaced downwardly by a suitable prong on a wire line tool string as shown at p. 3745 of the Composite Catalogue of Oil Field Equipment and Services, supra. The lower end of the prong engages the valve seat 431 to sever the shear washer 423 releasing the valve assembly to drop downwardly. The prong 602 may be used witht he running tool 580. The prong first depresses the upper ball 435 so that the lower ball is lifted by the liquid below the ball to allow the liquid to bypass the double ball assembly so the assembly can move down. The prong then forces the assembly down to shear the washer 423. The plug valve is now moved from the landing nipple through the tubing string 54 by utilizing any suitable wire line operated pulling tool which will engage the fishing neck 403c on the upper end of the plug valve to lift the dog expander permitting the dogs to be cammed inwardly releasing the plug valve to be lifted from the landing nipple and removed from the well bore through the tubing string. For example, a pulling tool which may be employed is an Otis Type S as shown on p. 3746 of the Composite Catalogue of Oil Field Equipment and Services, supra.

After removal of the double ball plug valve, the tubing flow control valve 60 is installed in the bore 133 of the landing nipple by utilizing the running tool 580 illustrated in FIGURE 42 connecting the tool to the valve and operating the tool on a wire line in precisely the same manner as described above in connection with the installation of the plug valve. An equalizing prong, not shown, is threaded into the running tool in place of the prong 602. The prong extends through the bore of the ball 353 to hold the ball open to allow fluid to bypass the valve as it is lowered. A suitable equalizing prong is shown on p. 3745 of the Composite Catalogue of Oil Field Equipment and Services, supra. The tubing valve is lowered into the bore 133 of the landing nipple until the downwardly facing annular shoulder 384 on the valve seats on the internal annular shoulder 142 within the landing nipple to limit the downward movement of and support the tubing valve.

With the completion valve 61a positioned within the landing nipple bore 134 and the tubing valve 60 positioned in the bore 133 and both valves in the closed position, the valves may now be opened by application of fluid pressure through the control lines 63 and 63a from the surface controller 64. The fluid pressure is applied from the control line into the vertical bore 151 of the landing nipple through the flow passages 152 and 153, see FIGURE 7, into the annular space 180 around the completion valve and the annulus 314 around the tubing valve. To open the completion valve the fluid flows from the annular space 180, see FIGURE 14, through the lateral flow passage 181 in the mandrel 164 into the bore 200 around the neck member 201. The control fluid then flows upwardly through the longitudinal groove 211 in the neck member to the upper end of the neck member and then downwardly through the neck member in the vertical flow passage 210 extending into the upper end of the valve element 202 and outwardly through the lateral port 213 near the lower end of the bore 210 into the annulus 212 around the valve element within the lower end section of the mandrel. The fluid then flows downwardly through the lower end of the mandrel around the valve element into the annular cylinder 223 above the annular piston 224. The control fluid pressure exerted within the annular cylinder above the annular piston forces the piston downwardly with the lower end of the piston engaging the flange 232 around the valve element to force the valve element in a downward direction resulting in the shearing of the pin 203 and opening the valve to permit fluid flow therethrough. The downward movement of the valve element pulls the neck member 201 downwardly due to its threaded engagement with the upper end of the valve element. The shear pin 203 is engaged between the mandrel 164 and the neck member so that the downward movement of the neck member causes the shear pin to be sheared freeing the neck member and valve element for downward movement to an open position. The annular piston 224 is displaced downwardly until the lower end of the piston engages the annular shoulder 231 within the sleeve 222 holding the annular piston against further downward movement. The valve element, however, is free to move farther downwardly than the distance moved by the annular piston, the annular piston being utilized to initiate the opening of the valve and to sever the shear pin. After the valve element is opened partially by the downward action of the annular piston with the upwardly facing shoulder 244 on the lower end section of the valve element moving downwardly away from the lower end of the sleeve 222 and the ring seal 245 moving out of engagement with the wall of the bore 251, fluid may enter the lower end of the valve to pass upwardly around the reduced central section of the valve and outwardly through the valve sleeve by way of the lateral ports 242. The fluids then pass through the side window 74 in the landing nipple into the annular space 62 through which they flow to the surface within the casing. The fluid pressure differential across the upper end section of the valve element acting on an area defined by the inside diameter of the inner ring seal 225 causes the valve element to move to a full open position at which it is held against further downward movement by engagement of the lower end of the neck member 201 within the annulus 212 with the upper face of the inwardly extending flange 220 within the adapter 215. The upper face of the external flange 232 around the valve element will of course move downwardly somewhat out of engagement with the lower end of the annular piston 224. The control fluid will thus hold the valve element 202 in the open position until such time as the pressure within the control fluid is reduced to a level which will permit the well fluids within the bore 93 below the completion valve to move the valve back upwardly to a closed position.

The control fluid also flows from the vertical flow passage 151 within the landing nipple through the passage 152 into the annulus 314 around the mandrel 301 of the tubing valve 60 between the upper and lower packing 303 and 312. The control fluid pressure is applied through the mandrel in the radial flow passages 315, around the split ring 323 downwardly through the annular space 332 around the upper ball valve seat within the housing 310 into the annular cylinder 334. The control fluid pressure within the annular cylinder acts against the upper end of the annular piston 342 moving the piston in a downward direction against the force of the spring 363 which biases the ring 362 upwardly against the lower end of the sleeve 360 formed on and extending downwardly from the annular piston. The control fluid pressure displaces the annular piston downwardly forcing the operator members 365 and 370 positioned within the window 364 of the sleeve in a downward direction along with the sleeve. The operator knobs 371 and 373 acting within the operator holes in the ball valve 353 rotate the ball valve through substantially 90 degrees from the closed position of FIGURE 37 to the open position illustrated in FIGURES 4B and 36. As the sleeve moves the operator members downwardly, the operator members move circumferentially or laterally within the window of the sleeve while the operator knobs move into and out of the operator holes to rotate the ball valve from the closed to the open position. During the downward movement of the annular piston to open the ball valve, the upper seat 321 and the lower valve seat 354 remain in a fixed position longitudinally with the valve rotating within and supported by the valve seat surfaces 352 and 355 on the upper and lower valve seats, respectively. The upper valve seat is held in the upper position by the split ring 323 while the lower valve seat is biased upwardly against the ball valve element by the spring 393 pushing the tubular member 395 upwardly against the lower end of the lower valve seat. So long as the control fluid pressure within the annular cylinder 334 is maintained at a sufficient value to hold the annular piston 342 in a downward position against the upward force of the spring 363 the ball valve 353 will be held in the open position to permit fluid flow through the valve into the tubular member 154 and upwardly through the head member 160 and the upper tubing string 54 to the surface.

With both the annulus and tubing valves being held in the open position by the force applied by the pressure of the control fluid, a portion of the formation fluids entering the casing through the perforations 70 flow upwardly through the lower tubing string 65 into the lower end of the adapter 101 entering the lower end of the flow tube 71 trough which the fluids flow into the bore 92 and then into the lower end of the tubing valve 60 from which the fluids flow upwardly through the tubular member 154, the head member 160, and to the surface through the upper tubing string 54. The other portion of the formation fluids entering the perforations 70 flow upwardly within the casing 53 in the annulus 62a around the lower tubing string entering the packer 52 through the ports 72 within the adapter 101 to flow through the packer within the annulus 103 which extends through the packer around the flow tube 71. The annulus fluids exit from the packer entering the tubular housing 73 to flow upwardly around the flow tube 71 passing from the housing into the bore 93 of the tubular member 90 around the lower end of the open completion valve 61a and outwardly from the valve through the lateral ports 242 and from the landing nipple bore 134 through the lateral window 135 into the annular space 140 around the landing nipple to flow upwardly into the annulus 62 above the head member and from there within the casing around the upper tubing string 54 within the annulus to the wellhead. When the control fluid pressure from the surface controller 64 is reduced sufficiently by manually bleeding the pressure down through the controller or by reaction of the controller to the various conditions being monitored by the detector system interconnected with the controller the completion valve and the tubing valve both close to completely shut-in all the flow from the formation. The pressure of the formation fluids within the bore 134 of the landing nipple below the valve 61a acting on an area of the valve element 202 defined by the line of sealing engagement between the valve element and the inner ring seal 225 lifts the valve element upwardly to the closed position at which the external annular shoulder 244 around the lower end section of the valve elements seats against the lower end of the valve sleeve 222 closing off the valve against further upward flow. The ring seal 245 moves into sealing engagement with the wall of the bore 251 further enhancing the seal between the valve element and the valve sleeve. The pressure of the well fluids acting on the lower end of the valve element will hold the valve in the closed position until again reopened by an increase in the control fluid pressure.

The tubing valve is similarly closed to prevent the upward flow through the bore 133 of the landing nipple by the spring 363 which lifts the ring 362 to raise the sleeve 360 moving the operator members 365 and 370 upwardly causing the operator knobs moving within the operator holes to rotate the ball valve 353 from the position illustrated in FIGURE 4B to the closed position of FIGURE 37.

Both the valves 61a and 60 may be reopened when desired by increasing the control fluid pressure. The control fluid pressure is applied within the valves in the manner identical to that previously described in connection with the procedure of initially opening the valves to start flow from the well.

In the event of emergency conditions such as when the control fluid pressure system is inoperative and it is necessary to pump fluid down the tubing string to "kill the well," for example, the tubing valve 60 may be opened at least partially by pumping fluid down the tubing string. The fluid pressure above the ball valve displaces the ball valve and its lower valve seat 354 downwardly against the spring 393. Since the upper valve seat cannot move downwardly, the ball valve is spaced apart from the upper valve seat allowing the fluid to flow around the ball valve along the space around the operator members and within the window 364 of the sleeve 360. The fluid then flows through the lateral ports 356 in the lower seat and downwardly through the bore of the lower seat.

Both the tubing string and annulus valves are readily removable from the well for inspection, repair or replacement as needed or desired. The wellhead is equipped with conventional wireline equipment including a lubricator and related apparatus of the type shown at p. 3741 of the Composite Catalogue of Oil Field Equipment and Services, supra. A conventional pulling tool is run in on a wireline tool string and the fishing neck 300a of the tubing valve 60 is engaged by the pulling tool to lift the dog expander permitting the locking dogs 302 to be retracted as the tool lifts the valve from the landing nipple. An equalizing prong may be used on the pulling tool to hold the valve open when pulling it. The valve is lifted upwardly through the upper tubing string 54 and removed from the wellhead in a conventional manner. The valve 61a is removed from the landing nipple with the running and pulling tool 460 equipped with the collet 462a and the prong 530a as illustrated in FIGURES 20–22. The prong 530a is positioned relative to the collet 462a as illustrated in FIGURE 20 with the recess 552 on the prong aligned with the heads of the collet fingers 505a. The pulling tool is lowered on the wireline through the upper tubing string 54 through the head member 162 into the tubular member 154 where the "kick over" mechanism of the running tool displaces the shank 463 laterally to the maximum extent permitted within the tubular member. Since the bore 134 of the landing nipple is displaced laterally from the longitudinal axis of the tubular member, the misaligning of the shank will position the collet and prong of the running tool above the bore 134 of the landing nipple. The running tool is lowered to insert the lower end sections of the collet fingers 505a and prong 530a into the locking ring 192 so that the shoulder 192a on the locking finger ring engages the annular surfaces 514a on the collet fingers camming the collet fingers inwardly into the recess 552 to permit the collet fingers to pass downwardly within the flange 192b and snap outwardly below the flange to the position illustrated in FIGURE 20. The pulling tool is then jarred downwardly causing the shoulder 521 within the collet head to press against the surfaces 540a at the upper end of the prong fingers camming the prong fingers inwardly so that the collet telescopes downwardly over the upper end sections 550 of the prong fingers with the surfaces 551 on the prong fingers engaging the shoulder 521 within the collet to limit the downward telescoping action of the collet over the prong fingers so that the external annular flange 554 on the lower end section of the prong is aligned within the internal bosses 524 of the collet fingers and thus prevents their inward movement. The running tool is lifted with the upwardly facing surfaces 513 engaging the lower shoulder 192c of the flange 192b to lift the locking fingers 191 from within the collet heads 190a so that further lifting of the pulling tool 61a will cause the downwardly facing shoulder 150a at the upper end of the locking recess 150 to cam the collet fingers 190 inwardly so that the valve may be lifted from the bore 134

FIGURE 21 illustrates the locking finger member lifted to the position for unlocking the collet fingers with the lower ends of the collet fingers of the running tool being held outwardly beneath the flange of the locking finger member by the flange 554 on the prong. The completion valve is then lifted and raised to the surface by the running tool with the collet 503a and prong being positioned as illustrated in FIGURE 21 within the upwardly positioned ring 192 of the valve.

If, after engaging the running tool with the completion valve, it is determined that the valve is stuck within the landing nipple and cannot be safely jarred loose by the running tool without the probability of damage to the tool or valve, the running tool is disengageable by jarring the tool downwardly to align the collet fingers 505a and the prong of the running tool in the relative positions shown in FIGURE 22. The downward jarring of the running tool will return the locking ring 192 to its downward locked position if it had been previously lifted by the running tool. The lower end of the prong will then engage the upper end of the mandrel 164 of the completion valve holding the prong against further downward movement while the collet of the running tool is jarred downwardly telescoping over the upper end section of the prong with the upwardly facing surfaces 551 on the prong fingers being engaged and cammed inwardly by the shoulder 521 within the collet finger head so that the prong fingers are retracted inwardly toward each other with the collet moving downwardly over the prong fingers to the position illustrated in FIGURE 22. With the running tool collet fully telescoped over the prong the collet fingers bosses 524 are aligned with the lower recess 553 on the prong so that the running tool is lifted causing the lower face of the flange 192b to cam the collet fingers inwardly releasing the running tool from the valve 61a so that the running tool is withdrawn from the well bore into the upper tubing string 54. Under such conditions where it is found that the valve 61a cannot be removed from the landing nipple it will be necessary to disengage the packer 52 from the wall of the casing and withdraw the entire subsurface system so that valve or valves may be removed from the landing nipple at the surface. The packer is disengaged from the casing in accordance with the procedure explained at p. 3172 of the Composite Catalogue of Oil Field Equipment and Services, supra. The tubing strings and packer are then withdrawn from the well in a conventional manner.

The completion valve 61a is normally used throughout the well completion procedure including initially flowing the well to clean it up for the removal of any sand or other abrasive materials which may be in the formation fluids during the very first stages of production. These procedures most often result in erosion and other damage to the completion valve with the valve seat 244, the valve element 202 along the surface where it seats on the seat 244, and probably the ring seal 245 being sufficiently eroded to impair effective sealing of the valve when in closed position. It is therefore preferred that when the well is flowing clean fluid the completion valve be removed and the production valve 61 be installed in the bore 134 of the landing nipple to control the production fluid flow through the annulus. In accordance with the previous description of the completion and production valves, the production valve has a more complex and effective sealing structure than the completion valve and it is not required that the production valve be shear pinned in the closed position since it is installed subsequent to the setting of the packer 52. Since the completion valve is normally used only through the termination of the well completion procedures, its seat and sealing elements are less complex and thus of more economical construction since it is expected that they will be damaged and necessitate replacement. The production valve, however, is expected to serve for a long period and justifies more expensive, complicated sealing structure.

The completion valve is removed with the running and pulling tool 460 fitted with the latching assembly 462a in accordance with the above described procedure and the valve converted to the production valve 61 by replacement of the valve element 202, the sleeve 222, the neck member 201, and the adapter 214. These elements of the valve are replaced with the adapter 251, the neck member 251, the valve element 253, and the sleeve 254 to provide the production valve illustrated in FIGURE 4B. The production valve is then lowered through the tubing string on the running tool 460 fitted with the latching assembly 462 and inserted into and locked in place within the bore 134 of the landing nipple in accordance with previously described procedure. The control fluid pressure is applied from the surface controller through the control line into the landing nipple through the vertical bore 151. The control fluid flows through the passage 152 into the bore 200 around the upper reduced end section 252a of the neck member and downwardly through the bore 262 and lateral port 263 into the annular cylinder above the annular piston 224. Downward movement of the annular piston moves the valve element and neck member downwardly to a partially open position and the pressure differential across the area within the inner ring seal 225 moves the valve element and neck member farther downwardly to the fully open position illustrated in FIGURE 4B at which the lower end of the neck member engages the upper face of the flange 251a on the adapter 251. The formation fluids flow upwardly through the flow passage 93 around the lower end section 282 of the valve element into the lateral window 275 and upwardly and outwardly through the lateral windows 280 in the sleeve 254. The fluid flows outwardly from the landing nipple through the lateral window 135 into the annulus 139 around the landing nipple and upwardly through the annulus 62 between the upper tubing string and the casing to the surface. In the event of reduction of the control fluid pressure the pressure in the bore 93 acting across the area defined by the inside diameter of the inner ring seal 225 lifts the valve element and related structure upwardly until the upper end of the sleeve 285 engages the seat surface 295 on the lower end of the sleeve and depresses the sleeve 285 against the spring 284 allowing the valve element to continue upward movement with the ring seal 290 being uncovered by the sleeve and moving into sealing relationship with the bore of the sleeve 254 effecting closing of the production valve to prevent further upward flow of fluids through the valve. The upward movement of the valve element is limited by the engagement of the seat surface 294 on the valve element with the seat surface 295 on the lower end of the sleeve 254. During upward and downward movement of the valve element the guide pin 260 which is received in the longitudinal slot 255 in the neck portion of the valve element maintains proper orientation of the valve element so that the window 275 in the valve element is aligned with the lateral windows 280 of the valve sleeve. When the valve is reopened by increasing the control fluid pressure to move the valve elements downwardly the spring 284 lifts the sleeve 285 upwardly telescoping the sleeve upwardly over the ring seal 290 to provide protection for the ring seal from the erosive effects of the well fluids and maintain the shape of the seal during the period that the valve element is in the downward open position.

It will be seen that a new and improved system for subsurface control of fluid flow through a well bore has been described and illustrated.

It will be further seen that the subsurface control system includes apparatus for flowing fluids from a single producing zone into a tubing string and through an annular flow channel between the tubing string and the well casing.

It will also be seen that the flow control valves employed in the system are actuatable by fluid pressure controllable from the surface end of the well bore.

It will also be seen that the fluid flow through the tubing string is controllable by one remotely actuatable valve while the fluid flow through the annulus is controllable by another remotely actuatable valve.

It will be further seen that the tubing string and the annulus valves are detachably engaged in a single landing nipple in side-by-side relationship.

It will additionally be seen that each of the flow control valves is independently insertable and removable from the landing nipple by the use of wireline tools.

It will be further seen that the tubing string valve is positioned substantially in axial alignment with the upper tubing string while the annulus valve is positioned on a longitudinal axis laterally spaced apart from the axis of the upper tubing string.

It will also be seen that a running and pulling tool has been described and illustrated for installing and removing the annulus valve into and from a bore which is displaced laterally from the longitudinal axis of the landing nipple.

It will be further seen than the system of invention permits maximum fluid flow from a well bore by utilizing substantially the total flow area provided by the casing while permitting a tubing string to be positioned within the well bore to provide a facility for "killing the well" by pumping in drilling fluid in the event an emergency condition arises requiring such action.

It will additionally be seen that both the tubing valve and the annulus valves are insertable into and removable from the landing nipple through the upper tubing string.

It will also be seen that the completion valve may be removed and converted to a production valve which is installed in the landing nipple to control the annulus produced fluids.

It will be seen that a new and improved poppet type fluid actuated completion valve has been described and illustrated.

It will be seen that there has been described and illustrated a new and improved fluid actuated poppet type production valve.

It will be also seen that both the completion and the production valves include a fluid actuated annular piston for opening the valve against well pressure.

It will be seen that the production valve includes a retractable sleeve over an O-ring for protecting the O-ring from the erosive effect of well fluids and maintaining the shape of the O-ring when the valve is in open position.

It will also be seen that there has been described and illustrated a new and improved fluid actuated ball-type production valve.

It will be seen that the ball-type production valve includes a fluid driven annular piston which actuated a sleeve to move operator members for rotating the ball element between open and closed positions.

It will additionally be seen that there has been described and illustrated a new and improved system for detachably connecting a fluid control line through a wellhead into a subsurface flow control assembly whereby the control line may be removed and installed without disturbing the tubing string in the well.

It will be further seen that there has been described and illustrated a new and improved system for providing an annular flow path downwardly through a well bore to direct control fluid between a wellhead and a subsurface flow control system.

The arrangement of the subsurface flow control system illustrated in FIGURE 2 is identical to that shown in FIGURE 1 with modifications in the lower tubing string below the packer 52 to adapt the system to at least two production zones at different depths. A lower packer 610 is set within the casing 53 above the lower perforations 611 so that the fluids flowing into the casing through the lower perforations will enter the lower tubing string 65 below the lower packer. The lower packer may be a type WA or TB Otis Packer as described and illustrated in detail at pp. 3638–3641 of the Composite Catalogue of Oil Field Equipment and Services, supra. A short tail pipe 612 is secured on the lower end of the packer and the packer is run into the well and set in accordance with procedures explained in the reference. In order to permit the removable connection of the lower end of the lower tubing string 65 in sealing engagement with the packer a seal assembly 613, as described at p. 3642 of the reference is secured on the lower packer. Since the annular space 614 between the upper packer 52 and the lower packer into which fluids flow through the perforations 615 is isolated between the packers, the lower tubing string is provided with a device 620 permitting fluid communication through the tubing string into the annular space. The device 620 may be an Otis Type A sliding slide door assembly illustrated and described at p. 3669 of the Composite Catalogue of Oil Field Equipment and Services, supra. Also, installed in the lower tubing string aligned with the upper perforations 615 is a blast joint 621 to resist the abrasive effect of the fluids on the tubing strings as the fluids enter the annulus around the tubing string from the perforations. Such blast joints are described in detail at p. 3632 of the Composite Catalogue of Oil Field Equipment and Services, supra. After setting the lower packer the lower tubing string 65 equipped as described with the side door assembly and blast joint is run into the well on the upper packer 52 and the upper packer is set in the manner previously described with the lower end of the tubing string being seated in sealing relationship with the lower packer. The side door assembly provides the fluid communication needed into the annulus 614 to apply the fluid pressure below the packer 52 to set it. The fluids from the lower formation pass through the lower casing perforations 611, into the tail pipe 612, through the lower tubing string 65 into the flow tube 71 through the packer 52 and upwardly through the tubing control valve 60 to the surface through the upper tubing string 54. The fluids from the upper formation flow through the perforations 615 into the annular space 614 between the upper and lower packers and through the port 72 in the adapter below the upper packer into the annulus 103 of the packer and upwardly through the bore 93 passing through the annulus control valve 61 and to the surface in the manner previously described. With the exception of the fact that the system of FIGURE 2 is arranged to produce from different zones separately into the tubing and annulus the system functions in precisely the same manner and with the previously described apparatus of the system illustrated in FIGURE 1.

It will now be seen that there has also been described and illustrated a subsurface fluid flow control system for controlling fluid flow from upper and lower producing formations separately into a tubing string extending to the surface and an annular flow channel within a string of casing around the tubing string.

Figure 3:
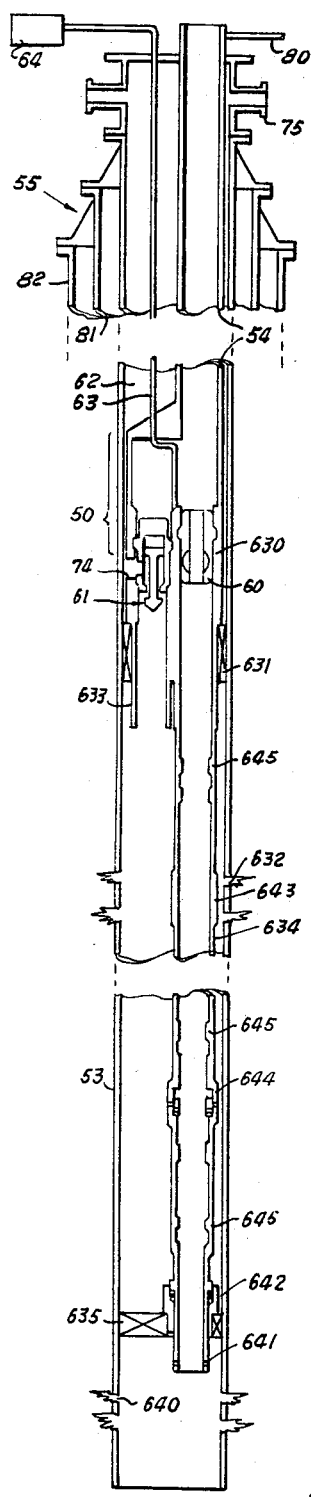
FIGURE 3 is a schematic view in section of an alternative arrangement of the flow control system employed for producing an upper formation into the annulus and a lower formation into the tubing string.

It will be further seen that in the modified embodiment surface actuated subsurface flow control means are provided for simultaneously controlling separate flow control valves through which fluid from each of the formations flows to the surface A further embodiment of a subsurface flow control system for the production of fluids from two vertically spaced apart formations is illustrated in FIGURE 3. A landing nipple 630 is supported on a dual packer 631 set at an elevation in the well bore above the perforations 632. The landing nipple supports the annulus control valve 61 and the tubing control valve 60 as in the previously described systems. A relatively short tail pipe 633 is supported from the upper packer to direct the fluids from the upper perforations into the landing nipple to the annulus valve 61. The other bore of the upper packer is connected with the lower tubing string 634 which extends downwardly to the lower packer 635 set above the lower casing perforations 640 so that the fluids from the lower perforations will flow into the tail pipe 641 extending downwardly from the lower packer to direct the fluid into the lower tubing string. The lower packer 635 may be either the Otis type WA or TD packer as illustrated and described on pp. 3638–3641 of the Composite Catalog of Oil Field Equipment and Services, supra. The lower tubing string is connected into the lower packer through a seal unit 642 of the type described at 3642 of the Composite Catalog of Oil Field Equipment and Services, supra. The lower tubing string is equipped with the blast joint 643 and the sliding side door assembly 644, both of which are standard oil field production items previously discussed in connection with the assembly of FIGURE 2 herein. The lower tubing string is also equipped with the plurality of landing nipples 645 as described at p. 3663 of the Composite Catalog of Oil Field Equipment and Services, supra. The landing nipples provide facilities for landing and locking various tools within the tubing string such as a plug which might be required, for example, in the lowest of the landing nipples when the ports of the side door assembly are open for purposes of building up the pressure in the annular space around the tubing string between the packers. The landing nipple 630 employed with the packer 631 is illustrated in FIGURE 3A and is substantially identical to the landing nipple 91 of FIGURES 4C and 12 with the adaptor 650 formed on the lower end thereof. The same referenec numerals have therefore been employed to identify the various features of the landing nipple 630 as were used in connection with the landing nipple 91. As also shown in FIGURES 4A through 4F the landing nipple 630 is connected with the control line 63 and the tubular member 154 which in turn is connected with the head member 160. The adaptor 650 on the lower end of the landing nipple in FIGURE 3A is provided with the longitudinal internally threaded bores 651 and 652 which are respectively provided with the ring seal grooves 653 and 654. The dual packer 631 is preferably of the Otis type RDH illustrated at p. 3656 of the Composite Catalog of Oil Field Equipment and Services, supra. Referring to p. 3656 of the reference, the packer as illustrated is modified to minor extent for use in the system of FIGURE 3 by removal of the head assembly threadedly connected on the dual mandrels extending upwardly from the hold-down button assembly. The threaded upper ends of the two mandrels above the hold-down button assembly are then engaged in the internally threaded bores 651 and 652 with a ring seal, not shown, positioned in each of the recesses 653 and 654 to seal between the adaptor 650 and the mandrels of the packer. The tail pipe 633 is connected on the particular mandrel extending from the lower end of the packer which at its upper end is connected into the bore 651 of the adaptor while the lower tubing string 634 is connected into the lower end of the other mandrel of the packer which at its upper end is connected into the bore 652 of the adaptor. As the system of FIGURE 3, the lower packer 635 is first set by standard procedures with the lower tubing string being run into the casing and engaged at its lower end with the lower packer as the upper packer is installed at the desired depth within the casing. The previously described procedures are employed in setting the lower packer and the lower tubing string while the procedure of setting the upper packer 631 is discussed in detail at p. 3657 of the Composite Catalog of Oil Field Equipment and Services, supra. Subsequent to the installation of the landing nipple 630 along with the related apparatus connected thereto and the upper tubing string 54 the remaining elements of the system are identical and installed in the same manner as above described in the systems of FIGURES 1 and 2.

Fluids flowing through the lower perforations 640 below the lower packer flow into the tail pipe 641 to move to the surface through the lower tubing string 634, the tubing valve 60, and the upper tubing string 54. The fluids flowing into the upper perforations 632 flow upwardly through the tail pipe 633, the annulus valve 61, and to the surface through the annulus 62 within the casing around the tubing string above the landing nipple. The tubing and casing valves in the system of FIGURE 3 are open and closed and removed and installed using identical steps as those discussed above in connection with the other embodiments of the system of the invention.

It will thus be seen that the system illustrated in FIGURE 3 includes a single lower packer and a dual upper packer which supports the lower tubing string and the landing nipple in which the tubing and annulus valves are positioned.

FIGURES 24 through 30 illustrate apparatus for installing the control line 63 in a manner which will permit it to be readily removed and reconnected without the necessity of pulling the upper tubing string 54 from the well bore. The connection of the lower end of the control line within the well bore is illustrated in FIGURE 24. The head member 660, in place of the head member 160 shown in FIGURE 4A, is secured on the upper end of the tubular section 154. The head member is reduced along the lower end section 661 so that it telescopes into the upper end of the tubular member to strengthen the connection between the two members which are welded together along the line 662. The head member is internally threaded along the upper end section 662 for the connection of the lower end of the upper tubing string 54. As best seen in FIGURE 25 the bore 663 through the head member is eccentrically positioned. A small longitudinal bore 664 extends downwardly into and terminates within the head member. An internal annular locking recess 665 is formed in the head member around the bore 664. A stab-in form of mandrel-packing assembly 670 is threaded on the lower end of the control line 63 and detachably engaged in the bore 664 of the head member. The stab-in assembly 670 includes an adapter 671 threaded at the upper and the lower end of the control line 63 and at the lower end on the mandrel-collect 672. A packing assembly 673 is positioned in the recess 674 around the upper end section 672a of the mandrel-collet and held against upward movement by the lower end of the adapter 671. A lower packing assembly 675 is positioned in the recess 680 around the lower end section 672b of the mandrel-collet and held against downward movement by the retainer cap 681 threaded on the lower end of the section 672b. The central section of the mandrel-collet is an integral, closed collet having the longitudinal collet fingers 682 separated by the longitudinal slots 683 with an outwardly extending central boss 684 formed on each of the collet fingers to fit within the locking recess 665 to hold the stab-in assembly within the bore 664. A longitudinal bore 685 extends through the adapter 671 and the mandrel-collet terminating in the lower end section below the collet section. As illustrated in FIGURE 25 a laterally extending flow passage 690 connects between the bore 665 and a longitudinally extending flow passage 691 which connects with the upper end of the control line 63a extending from the head member into the landing nipple 91 as illustrated in FIGURE 4B. The flow passage 690 is formed by laterally boring into the head member to intersect both the vertical bores 665 and 691. The bore forming the flow passage 690 is then closed at its outward end by a plug 691a welded into the body. The upper end of the head member 660 is contoured forming the surface 692 which slopes downwardly toward the bore 665 so that when the stab-in assembly is lowered on the control line 63 the lower tapered end 693 on the cap member 681 will be guided downwardly into the bore. The stab-in assembly is pushed downwardly by the control line into the bore with the collet bosses 684 being cammed inwardly by the wall forming the bore until the bosses snap outwardly into the locking recess 665 to lock the stab-in assembly within the head member. Control fluid flowing downwardly through the control line 63 enters the bore 685 and passes outwardly through the slots 683 within the collet section of the mandrel. The fluid flows through the lateral flow passage 690 to the longitudinal flow passage 691 at the bottom of which it enters the control line 63a to flow further downwardly to the landing nipple and to the annulus and tubing control valves. The stab-in assembly is readily removed from the head member by pulling upwardly on the control line 63 to cause the collet bosses 684 to be cammed inwardly releasing the stab-in assembly to be pulled upwardly and withdrawn from the bore. The upper and lower seal assemblies 674 and 675 seal around the mandrel within the bore above and below the fluid conducting collet. A small bore 694 opens through the head member 660 into the lower end of the bore 665 to facilitate insertion of the stab-in assembly into the bore and to balance the pressure on the opposite ends of the stab assembly above and below the upper and lower packing assemblies. The pressure within the annulus 62 around the tubing string 54 acts on the stab assembly above the upper packing 674 and against the lower end of the cap 681 through the flow passage 694. The control fluid pressure acting within the collet area of the mandrel-collet acts on both the upwardly and downwardly facing surfaces of the mandrel at the upper and lower ends of the collet thus substantially balancing pressures and minimizing any tendency of pressure to displace the stab-in assembly from the bore 664.

The preferred connection of the upper end of the control line 63 at the wellhead is shown in FIGURES 27 and 28 which show an exit spool 700 into which the upper end of the control line is removably secured. The lower flange 701 on the spool is provided with a plurality of bolt holes 702 for connecting the spool to the wellhead. An annular recess 703 in the lower face of the spool receives a ring seal, not shown, for sealing between the flange 701 and the wellhead. The stud bolts 704 are threaded into the upper end of the spool for the connection of a Christmas tree, not shown. An annular recess 705 is concentrically formed in the spool about the bore 706 to receive a ring seal, not shown, for sealing between the Christmas tree and the upper end of the spool. The upper end of the upper tubing string 54 extends into the bore 706 which is enlarged along the upper end section 707 forming an upwardly opening recess 710 for the seal assembly 711 to seal between the upper end section of the tubing string and the wall forming the bore of the spool. The seal assembly 711 is retained within the bore around the tubing string by the ring 712 threaded into the upper end section of the bore.

A small eccentrically positioned downwardly opening bore 713 is formed in the exit spool substantially parallel to the bore 706 to receive the packing mandrel stab-in assembly 714 threaded on the upper end of the control line 63. The stab-in assembly includes the mandrel 715 having upper and lower packing recesses 720 and 721, respectively, to receive the upper and lower packing assemblies 722 and 723. The upper packing assembly is held on the mandrel by the cap 724 threaded on the upper end of the mandrel and also closing the upper end of the bore 715a of the mandrel. The lower packing is held on the mandrel by the adapter 725 threaded on the lower end of the mandrel and the upper end of the control line 63. The mandrel is reduced in diameter along the central section 730 which is provided with a plurality of radial ports 731 to permit control fluid flow from the lateral bore 732 of the exit spool into the bore of the mandrel from where the fluid may flow downwardly into the upper end of the control line 63. A port 733 connects the bore 706 of the exit spool with the upper end of the bore 713 above the stab-in assembly so that the upper end of the stab-in assembly is exposed to the annular space fluid pressure within the exit spool around the tubing string 54 below the packing 711 to substantially balance the pressure from the annular space 62 around the tubing string below the packing assembly 721 on the mandrel stab-in assembly. The pressures are thus substantially balanced across the stab-in assembly to minimize any tendency of the assembly to be displaced by fluid pressure from the bore 713. The stud bolts 734 are threaded into the side face 700a of the exit spool assembly around the lateral bore 732 for the connection of a flange, not shown, for connecting the surface controller 64 into the lateral flow passage 732. The annular groove 735 is formed to receive a seal ring, not shown, around the lateral flow passage to seal between the exit spool body and the flange, not shown, holding the conduit leading to the surface control.

It will now be seen that there has been described and illustrated apparatus which permits the control fluid line to be installed in and removed from the well bore without pulling the tubing string 54 from within the casing.

It will be seen that the lower end of the control line 63 includes a stab-in assembly which permits remote connection of the control line into the head member secured on the upper end of the landing nipple.

It will also be seen that the upper end of the control line 63 is removably connected with an exit spool assembly at the wellhead.

The upper end of the control line 63 is also connectable with the wellhead through the exit assembly 740 illustrated in FIGURES 29 and 30. The exit spool 741 includes a lower external annular flange 742 having a plurality of bolt holes 743 for connecting the spool to the wellhead. An annular recess 744 around the bore 745 through the spool receives a ring seal, not shown, for sealing between the wellhead and the lower face of the exit spool. The bore 745 through the exit spool includes a lower enlarged section 746 and an upper reduced section 750 having an internal annular recess 751 for receiving the packing assembly 752 to seal around the upper end section of the upper tubing section 54. The packing assembly is held in the recess by the annular retainer 753 threaded into the upper end section of the bore through the spool. The packing seals around the upper end section of the upper end of the tubing string 754. An annular packing recess 754 is formed at the upper end of the spool around the bore to receive a seal ring, not shown, to seal between the spool and the Christmas tree, not shown, mounted on the spool. A bore 755 extends downwardly and inwardly through the spool body into the bore section 746 to accommodate the upper end of the control line 63 extending through the spool body from the surface controller into the annular space 62 within the well casing. A packing recess 760 is formed in the spool body around the bore 755 to receive the packing assembly 761 which is held within the recess by the gland nut 762 threaded into the upper end section of the bore around the control line.

It will be seen that the exit spool assembly of FIGURES 29 and 30 provides means for connecting the control line through the well-head which is simple and may be used where a quickly detachable connection is not required.

The subsurface flow control systems illustrated in FIGURES 1-3 may each be modified by providing an annular control fluid flow channel between the surface and the subsurface flow control assembly 50 as illustrated in FIGURES 31 and 32 in place of the tubular control line 63. FIGURE 31 shows a modified head member 770, used in place of the head member 160, secured on the upper end of the tubular member 154 for landing and sealing the lower end of the upper tubing string 54 with the upper end of the subsurface flow control assembly. The head member 770 also is provided with means for interconnecting the lower end of the annular control fluid flow passage 771 into the lower section 63a of the control line for conducting the control fluid to hold the tubing and annulus control valves in open position as previously discussed. The reduced lower end section 772 of the head member fits within the upper end section of the housing member 154 and is secured thereto by any suitable means such as welding at 773. The bore 774 of the head member is enlarged along an intermediate section 775 providing an upwardly facing internal annular shoulder 780 to support the lower end surface 781 of the retainer ring 782 which is threaded on the lower end of the seal sub 783 threaded on the lower end of the tubing string 54. The retainer ring holds the packing assembly 784 within the downwardly opening recess 785 to seal between the seal sub and the wall forming the bore section 775. The upper end section 790 of the seal sub is threaded on the lower end section 791 of the upper tubing string 54 so that the seal sub with the packing assembly 784 is lowered on the lower end of the tubing string to permit the tubing string to be landed in sealing engagement within the head member 770. The head member 770 is further enlarged in internal diameter along a section 792 providing an annular space 793 around the seal sub which is connected by a lateral port 794 in the head member communicating with a longitudinal flow passage 795 extending downwardly through the head member into the control line section 63a which is connected into the lower end of the flow passage 795 within the head member. The upper end section 799 of the head member 770 is internally threaded for the connection of the lower threaded end section 800 of the outer tubing string 801 which is provided with a downwardly facing shoulder 802 which seats against the upper end of the head member to limit the downward movement of the outer tubing string into the head member. The inside wall of the outer tubing string is spaced apart from the outside walls of the inner tubing string 54 and the seal sub on the inner tubing string to provide the annular flow passage 771 which conducts control fluid between the head member 770 and the wellhead at the surface. The control fluid flows downwardly through the annular flow passage into the annulus 793 from which it flows through the lateral port 794 and the vertical flow passage 795 into the control line 63a.

The wellhead end of the annular control line flow passage arrangement is illustrated in FIGURE 32. The upper end section of the outer tubing string 801 fits within the flange within the bore 810 of the flange 811 supported on the wellhead 812. The seal ring 813 seals between the flange and the wellhead around the bore of the flange and the bore 814 of the wellhead. A ring seal 815 is held in an annular recess 820 within the flange around the bore 810 to seal around the outer surface of the upper end section of the outer tubing string 801. A plurality of radially extending bores 821 are formed in the flange 811 and closable by the screws 822 to permit plastic packing to be injected through the bores 821 into the recess 820 behind the packing 815 to force the packing into tighter engagement with the outside wall of the tubing string. The plastic packing can then be sealed in the bores behind the recess by the screws 822. The exit flange 823 is secured on the flange 811 by the stud bolts 824 extending through the well head 812 and flange 811 securing the wellhead, the flange 811 and the exit flange all together. A ring seal 825 seals between the exit flange and the flange 811 around the bores of the flanges. The exit flange 823 has an enlarged lower bore section 830 communicating with the bore 810 of the flange 811 and an upper reduced bore section 831 fitting in sliding relationship around the upper end section of the upper inner tubing string 54. The packing 832 fitted in the internal annular recess 833 of the exit flange seals between the flange and the outside wall of the inner tubing string. A radially extending bore 835 through the exit flange permits plastic sealant to be injected into the recess 833 behind the seal assembly 832 to force the seal assembly into tighter engagement with the tubing string. The bore 835 is closable by the screw 840 which is threaded into the bore after injection of the sealant. The flow passage 841 extends downwardly and inwardly through the exit flange into the bore 830 to conduct control fluid through the exit flange into the bore to the annular flow passage 771 between the inner and outer tubing strings through which the control fluid flows downwardly to the subsurface flow control assembly to control the valves in the landing nipple. The control line 842 extending from the surface controller 64 is connected into the flow passage 841 by the threaded adapter 843. The surface connection member 844 having a bore 845 is secured on the exit flange by the stud bolts 850 with a seal being formed between the surface connector and the upper face of the exit flange by the ring seal 851 positioned between the members around their bores. Well fluids, flowing through the upper inner tubing string 54 exit from the wellhead through the bore 845 of the surface connector 844.

In installing the system of the invention in a well bore wherein the annular flow passage is to be used for the control fluid, the packer 52, the nipple and related apparatus comprising the subsurface flow control assembly are all lowered into and locked within the well bore on the outer tubing string and thus the annulus 62 through which a portion of the well fluids flow is defined by the outer wall of the outer tubing string and the inner wall of the casing 53.

It will now be seen that a system has been described and illustrated for conducting control fluid to a down hole flow control assembly through an annular flow passage formed by concentrically positioned inner and outer tubing strings extending from a wellhead to the flow control assembly.

It will be further seen that the inner tubing string is insertable into and removable from the flow control assembly through the use of a seal sub which is insertable into sealing relationship with the head member of the flow control assembly.

It will also be seen that the inner tubing string may be removed from and installed in the well in communication with the subsurface flow control assembly without removing either the outer tubing string or the flow control assembly.

It will be seen that in the systems of FIGURES 1–3 with the tubing string flow control valve 60 removed from its bore within the landing nipple many different forms of well tools including such measuring devices as bottom hole pressure gauges may be lowered to and retrieved from the bottom of the well through the bore 133 of the landing nipple.

It will be further seen that with the control valve 60 in the landing nipple and the valve in open position well tools which have a smaller outside diameter than the bore through the ball element may be introduced into and removed from the well through the open valve.

While it is preferred that both the tubing string and annulus control valves be of a type which are actuatable by a control fluid from the surface it is to be understood that other forms of subsurface valves which may be landed and locked within the landing nipple may be employed for the purpose of controlling fluid flow through the landing nipple from both the tubing string and the annulus. Among the other forms of valves which may be utilized are velocity type valves which will automatically close when the volume of fluid flow through the valve exceeds a predetermined rate. Such valves may be generally of the type illustrated at page 3703 of the Composite Catalog of Oil Field Equipment and Services, supra.

The procedure of setting the packer 52 supporting the subsurface flow control assembly has been described solely in terms of the employment of a fluid pressure below the lower sealing element of the packer to lift the element and the sliding sleeve for engagement of the slips which anchor the packer within the casing. The lower sealing element on the packer has an interference fit with the wall of the casing bore which means that it fits very tightly with such wall and thus does not freely move downwardly within the casing. Therefore, after the flow tube 71 has been jarred downwardly to free the grease trapped within the annular chamber 125 at the proper depth for setting the packer, the tubing string may be lowered permitting the packer mandrel and connected apparatus to be lowered through the sliding sleeve and lower sealing element since the sealing element is being held by its tight fit within the casing. Such downward movement of the remainder of the packer relative to the lower sealing element and the sliding sleeve effects relative motion between the slips and the expander mandrel on the packer to cause the slips to be displaced outwardly into engagement with the casing wall to lock the packer at the desired location within the well bore.

A still further form of a subsurface fluid flow control system in accordance with the invention is illustrated in FIGURES 38 and 39 wherein identical reference numerals are employed to designate those elements of the system which are the same as the elements of the systems illustrated in FIGURES 1–3. The system illustrated in FIGURES 38 and 39 differ from those previously shown and described in the use of an annulus control valve 61 positioned in the landing nipple and a tubing control valve 60 positioned within the upper tubing string 54 above the landing nipple or between the landing nipple and the lower end of the tubing string in alignment with the tubing bore through the landing nipple. Referring to the drawings, the subsurface flow control assembly 899 includes the packer 52 which supports the assembly at the desired elevation within the casing 53 so that one portion of the well fluids flows into the lower tubing string 65, through the flow tube 71, the tubing control valve 60, and the upper tubing string 54 to the surface. The other portion of the well fluids flows through the inlet ports 72 into the tubing housing 901, through the landing nipple bore 902 and the annulus control valve 61, out through the lateral window 903 in the landing nipple into the annular space 62 within the casing 53 around the tubular housing, and through the upper tubing string to the surface. Below the packer 52 the well may be equipped as shown in either FIGURES 1 or 2 so that all of the well fluids within the casing flow to the surface through both the tubing and annulus, or, where two formations are producing into the casing, an additional packer is connected with the lower tubing string so that fluids from one formation flow through the tubing strings while fluids from the other formation flow through the ports 72 to flow to the surface through the annulus. Control fluid flows from the surface to the valve 61 and the valve 60 through the line 63 so that the valves may be held open in the manner and for the reasons previously described and illustrated. The control line 63 is connected into the upper tubing string 54 by the lateral conduit 904 which conducts the control fluid to the landing nipple 905 in the upper tubing string around the tubing valve 60.

The landing nipple 900 may be identical to the previously described landing nipple 91. The bore 902a in the landing nipple through which the fluids flow from the lower tubing string is formed so that a tubing control valve 60 may be landed and locked in it, if so desired. In one form the system shown in FIGURE 38 utilizes the annulus valve 61 in the landing nipple 900 and the tubing control valve 60 within the upper tubing string. In another form, not shown, the head member may be elongated to provide for landing and locking the tubing valve in the bore of the head member. This flow control system is installed and operated by procedural steps substantially identical to those previously described. It will be evident, however, that the annulus valve 61 can be inserted into and withdrawn from the landing nipple only while the tubing control valve 60 is out of the upper tubing string. It is therefore necessary that the annulus valve be inserted into the landing nipple prior to the landing and locking of the tubing valve and that the tubing valve be removed when it is necessary to retrieve the annulus valve. As in the previously described systems the valves 60 and 61 may be either the fluid pressure type controlled from the surface or the velocity type which closes responsive to a predetermined fluid velocity through the valves.

It will thus be seen that a new and improved fluid flow control system has been described and illustrated wherein an annulus control valve is located in a landing nipple to control fluid flow in an annular flow passage while a tubing flow control valve is positioned above the landing nipple for controlling fluid flow through the tubing string.

It will be further seen that the annulus control valve and the tubing valve may be inserted into and withdrawn from the well through the upper tubing string.

It will be further seen that each of the annulus control valve and the tubing valve may be controlled by a fluid pressure conducted through a control line extending from the well head at the surface.

A still further arrangement of the system shown in FIGURE 38 employs the upper and lower tubing string 54 and 65 respectively, as a "kill string" while the well fluids are allowed to flow from the well through the annular flow passages being controlled by the annulus valve 61. With such an arrangement of the system a plug valve or a check valve, not shown, may be positioned within the bore 902, such valve being arranged to permit fluid to be pumped downwardly through the upper and lower tubing srtings into the well bore while not permitting any of the well fluids to flow upwardly through the tubing strings. Such arrangement thereby makes available the tubing strings for the introduction of fluid into the well bore to shut-in the well in the event that such action becomes necessary. For example, drilling fluid of a weight sufficient to shut-in the well may be pumped in through the tubing string where the strings are being held on a stand-by basis as a "kill string" with the total production being flowed from the well being allowed to pass through the annular flow passages.

It will then be further apparent that there has been described and illustrated a subsurface flow control system wherein fluids flow from the well bore through an annulus control valve and an annular flow passage to the surface while a tubing string is retained in the well to function as a "kill string" in the event needed.

In each of the subsurface flow control systems illustrated and described the landing nipples 91 and 900 and the tubular housing section 154 have been illustrated as having a circular cross sectional shape. It will be apparent that these members may be constructed having a cross section in the form of an oval rather than the circle shown. The oval shape will distribute the available area for fluid flow along the sides of the oval members thus providing substantially two flow passages within the casing upwardly along the sides of the nipple and housing rather than a uniform concentric narrow flow passage completely around the members within the casing. The restriction to flow of two such flow paths is not so great as with a circular annular flow path. The fluids are not exposed to as much surface area of the members defining the flow paths and any tendency of solids in the fluids to clog and perhaps plug the passage is minimized.

It will thus be seen that the landing nipple and tubular housing on the nipple may be constructed with an oval cross section in the previously described subsurface fluid flow control system.

The tubing production valve 60 may be modified as illustrated in FIGURES 40 and 41 to minimize the force required in opening and closing the valve to adapt it to use at greater depths in a well bore. The tubing valve represented in the FIGURES 40 and 41 differs from the valve illustrated in FIGURE 4B in the substitution an alternative form of annular piston assembly 342a for the piston 342 illustrated in FIGURE 4B. The piston assembly 342a, including the inner and outer concentric piston members 342b and 342c, is substituted for the single unitary annular piston 342 shown in FIGURE 4B.

The inner annular piston member 342b is slidably positioned around the upper valve seat member 321 and within the outer annular piston member 342c which is formed on the upper end of and integral with the sleeve 360 extending downwardly around the ball valve as previously explained. The inner piston member and the outer piston member are longitudinally movable relative to each other and movable together as a unit. The ring seal 342d disposed in an internal annular recess within the inner piston member seals between the upper valve seat member and the inner piston member. The ring seal 342e disposed within an external annular recess in the inner piston member seals between the inner and outer piston members. The ring seal 342f disposed in an external annular recess in the upper end section of the sleeve 360 provides a seal between the sleeve and the housing 310. The lower end of the inner piston member is engageable with the external annular upwardly facing shoulder 340 around the upper valve seat member and with the upwardly facing internal annular shoulder 342g at the upper end of the sleeve 360 at the junction between the sleeve and the lower end of the outer piston member 342c. Thus, the shoulder 340 holds the inner piston member against downward movement relative to the upper valve seat member while the outer piston member and the sleeve 360 upon upward movement engages the lower end of the inner piston member with the shoulder 342g to lift the piston member to a spaced apart position above the shoulder 340.

FIGURE 40 shows the ball valve rotated to a position slightly passed the position at which the valve is effectively closed. The lower end of the inner piston member is spaced apart above the shoulder 340. The procedure of opening the ball valve is initiated by increasing the control fluid pressure within the annular cylinder 334 above the inner and outer piston member resulting in applying a force to the piston assembly over an effective annular area enclosed between the line of sealing engagement of the ring seal 342d with the outer surface of the upper valve seat and the line of sealing engagement of the ring seal 342f with the inner surface of the housing 310. The force resulting from the pressure of the control fluid on this effective annular area displaces the piston assembly downwardly rotating the ball valve toward open position. When the lower end of the inner piston member engages the shoulder 340, the ball valve will be partially open to substantially decrease the pressure differential exerted across the ball valve by the well fluids within the well bore below the ball valve. With the pressure differential across the valve reduced, the force required to move the valve to the full open position is less than that required to crack or slightly open the ball valve from the fully closed position. With the lower end of the inner piston segment being held against farther downward movement by the shoulder 340, the control fluid pressure now acts on the outer piston member over an effective annular area between the line of sealing engagement of the ring seal 342e with the inner surface of the outer piston segment and the line of sealing engagement of the ring seal 342f with the inside surface of the housing 310. The control fluid pressure displaces the outer piston member downwardly completing the opening of the valve as shown in FIGURE 41.

Thus, the complete piston assembly, including the inner and outer piston member is available for the initial opening of the ball valve at the time when the pressure differential across the valve is at its highest and the valve is then subsequentially moved to the full open position by a smaller force resulting from the control fluid acting only against the outer piston member.

When closure of the tubing valve is desired, the control fluid pressure is reduced permitting the spring 363 to lift the sleeve 360 and the outer piston member 342c to initiate closing the ball valve. The upward movement of the sleeve and outer piston member rotates the ball valve toward the closed position until the shoulder 342g segment engages the lower end of the inner piston member at which time the ball valve will have been rotated almost to the closed position to substantially increase the pressure drop across the ball valve. When the shoulder 342g engages the inner piston member, the sleeve and both the inner and outer piston members move to the position shown in FIGURE 40 to rotate the ball valve to the closed position. The pressure drop created by the partially closed position of the ball valve at the time the shoulder 342g engages the lower end of the inner piston member assists in effecting the full closure of the valve due to the increased upward force applied across the valve by the higher pressure differential across it. During their upward movement the inner and outer piston members are opposed by the pressure of the control fluid within the annular cylinder 334. The deeper in a well bore that the valve is positioned the greater is the length of the column of control fluid and thus the greater is the force exerted by the column of fluid on the piston members. Most of the upward force during the initial phase of opening of the ball valve is exerted by the spring 363 and thus the depth at which the valve is positioned presents a practical problem as to the strength of the spring which can be positioned in the valve to overcome the control fluid pressure. Since the force against the upper end of the piston assembly 342a is determined by the pressure of the control fluid which in turn depends upon the depth at which the valve is located, a reduction in the effective area of the piston assembly over which the control fluid acts results in a reduction in the amount of force necessary to push the piston assembly upwardly against the control fluid pressure. During the initial phases of closing the ball valve only the outer piston member 342c is being moved upwardly against the control fluid pressure by the spring and thus a smaller force than required for the whole piston assembly will move the outer member only upwardly until the ball valve is only slightly open at which time the pressure drop across the ball valve is available to provide additional force in overcoming the increased force against the upper end of the piston assembly caused by the required lifting of the inner piston member 342b which is lifted a short distance upwardly from the shoulder 340 during the final stage of closing the valve. Thus, a large piston area is available for closing the valve while a small piston area opposes the closing of the valve.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A system for the subsurface control of fluid flow through a well bore comprising: means within said well bore forming first and second flow channels therein through which said fluids flow to the surface; valve means supported by said means for separately controlling flow of fluid through each of said first and said second flow channels; means providing for insertion and removal of said valve means through a single flow channel independently of each other without disturbing said flow channels; and conductor means independent of said flow channels for conducting control pressure fluid from the well surface to at least one of said valve means for controlling actuation of said valve means.

2. A system for the subsurface control of flow of fluid through a well bore of the character set forth in claim 1, wherein: said valve means are each removable from said flow channels independently of the other; said conductor for said control fluid pressure is removable independently of the means forming the separate flow channels; and said valve means are closable to shut off flow of fluid through the flow channels when the control fluid conduit is removed.

3. A system of the character set forth in claim 1 wherein at least one of said valve means comprises landing means in one of said flow channels having a bore and a lateral opening and said valve means includes: a mandrel provided with a downwardly opening central bore and flow passage means communicating through said mandrel into said bore; releasable locking means on an upper end section of said mandrel for releasably locking said valve in said bore of said landing nipple; packing means around said mandrel below said locking means for sealing around said mandrel with the wall forming said bore of said landing nipple; a tubular sleeve connected on said mandrel extending downwardly therefrom, said sleeve having lateral port means and a lower end annular seat surface; an elongate valve element having an upper end section slidably disposed within said bore of said mandrel, a central section within and spaced apart from said sleeve and defining an annular chamber around said valve element within said sleeve, and a lower end seat section having an annular seat surface engageable with said seat surface at the lower end of said sleeve for closing said valve when said valve element is in an upper position and opening said valve when said valve element moves downwardly to position said seat surfaces in spaced apart relationship; an annular piston slidably disposed within said annular chamber between said central section of said valve element and said sleeve, said piston being engageable with said valve element to move said valve element downwardly responsive to control fluid pressure applied to the upper end of said piston; said valve element and said mandrel having fluid flow passage means for conducting control fluid through said mandrel and said valve element into said annular space within said sleeve around said valve element to displace said piston for moving said valve element downwardly toward open position; and means for releasably locking said valve element in an upper position until a predetermined control fluid pressure is applied through said mandrel and valve element to said annular piston for releasing said locking means and moving said valve element to an open position.

4. A system of the character set forth in claim 1 wherein at least one of said valve means for controlling flow through said flow channels comprises a plug valve adapted to be releasably locked within a bore forming one of said flow channels to prevent fluid flow in either direction through said bore comprising: a mandrel having a longitudinal bore therethrough; a locking assembly secured on the upper end of said mandrel for releasably locking said valve within said valve within said bore; an external annular packing secured around said mandrel below said locking assembly; a cage member secured on said mandrel, said cage member having a longitudinal bore and longitudinal slots communicating with said bore; and a double ball valve assembly releasably secured within the lower end of said mandrel, said assembly including upper and lower balls each adapted to engage a seat surface to prevent flow in either direction through said valve, said assembly being releasable in a direction toward said cage member responsive to a force of predetermined magnitude applied to said assembly toward said cage member whereby said ball assembly is released from said mandrel to be displaced into and retained by said cage assembly permitting fluid flow through said longitudinal slots in said cage member around said ball assembly into said bore through said mandrel.

5. A system of the character set forth in claim 1 wherein at least one of said valve means for controlling flow through said flow channels comprises a plug valve adapted to be releasably locked within a bore forming one of said flow channels to prevent fluid flow in either direction through said bore comprising: a mandrel having a longitudinal bore; a locking assembly secured on one end of said mandrel to releasably lock said mandrel within said bore; external annular packing means around the central section of said mandrel adapted to seal around said mandrel with a surface forming the bore which said valve is positioned; a cage member secured to and extending from the other end of said mendrel, said cage member having a central bore extending therethrough and provided with longitudinal slots communicating into said bore and an internal annular shoulder around said bore forming a seat surface; a double ball assembly releasably secured within the end of said mandrel connected with said cage member, said double ball assembly preventing fluid flow in either direction through said valve and being displacable into said cage member against said seat surface of said cage member to open said valve allowing fluid to flow through said valve through said longitudinal slots in said cage member; said double ball assembly being connected with said mandrel by shearable means adapted to be severed responsive to a force of predetermined magnitude applied to said double ball assembly toward said cage member; said double ball assembly including first and second balls confined between seat surfaces, each of said balls being adapted to engage a seat surface responsive to fluid flow around said ball toward said seat surface to prevent fluid flow in either direction through said valve prior to release of said double ball assembly from said mandrel.

6. A system of the character set forth in claim 1 wherein at least one of said valve means for controlling flow through said flow channels comprises a plug valve adapted to be releasably locked within a bore forming one of said flow channels to prevent fluid flow in either direction through said bore, said valve comprising: a mandrel having a longitudinally extending bore; a locking assembly secured on the upper end of said mandrel for releasably locking said valve within said bore; an annular packing assembly secured around the central portion of said mandrel to seal around said mandrel with the wall forming said bore providing said flow channel; a cage member secured on the lower end of said mandrel, said cage member having longitudinally extending bore and longitudinal slots opening downwardly and outwardly communicating with said bore; said cage member being further provided with an internal annular shoulder and internal annular flange having a bore therethrough at the lower end thereof; a double ball assembly releasably engaged within the lower end of said mandrel, said ball assembly being adapted to be disengaged from said mandrel and displaced into said cage member against said internal annular shoulder in said cage member in response to a force of predetermined magnitude applied to said ball assembly toward said cage member to open said valve permitting fluid flow through said longitudinal slots into said bore through said mandrel; said ball assembly including seat and cage means providing an upper ball seat and a lower ball seat, an upper ball and a lower ball confined between said seat and cage means and biased toward said seats by resilient means.

7. A system of the character set forth in claim 1 wherein at least one of said valve means for controlling flow through said flow channels comprises a plug valve adapted to be deatachably secured within a bore forming one of said flow channels to prevent fluid flow in either direction through said bore comprising: a mandrel having a longitudinal flow passage extending therethrough; a locking assembly secured on the upper end of said mandrel for detachably locking said valve within said flow channel bore; external annular packing around said mandrel below said locking assembly; a cage member secured on said mandrel below said packing, said cage member having a longitudinal bore extending therethrough communicating with said longitudinal bore through said mandrel and elongated downwardly and outwardly opening longitudinal slots communicating member into said bore of said cage member; said cage member being further provided with a lower end forming an internally extending flange having a bore therethrough substantially smaller than and communicating with the bore through said cage member and an internal annular shoulder forming an annular seat surface around said bore through said cage member above said end flange; said mandrel having a downwardly and inwardly opening recess at the lower end and around said longitudinal bore through said manrel; an annular upper ball seat member having longitudinal bore therethrough and a downwardly facing seat surface around said bore releasably engaged in said downwardly opening recess of said mandrel whereby said seat member is held against upward movement into said mandrel; a downwardly extending tubular ball cage secured on said upper seat member; a shear washer confined between the lower end of said mandrel and the lower face of an external flange on said upper ball seat member on one side and the upper end of said ball cage and said cage member on the other side releasably holding said ball cage and upper ball seat member to said mandrel, said shear washer being adapted to be sheared responsive to a predetermined force applied to said upper ball seat member directed downwardly toward said cage member; said ball cage member having a lower port and an upwardly facing annular seat surface around said lower port; an upper ball within said ball cage engageable with said seat surface on said upper ball seat member; a lower ball within said ball cage engageable with said seat surface around said bore through said ball cage and spring means confined between said upper and lower balls biasing said balls away from each other against said seat surface on said upper ball seat member and said seat surface around said port of said ball cage.

8. A system for the subsurface control of flow through a well bore of the character set forth in claim 1 wherein one of said valve means comprises a well production valve adapted to be releasably locked within one of said flow channels to control fluid flow through said channel and permit well tools to be introduced and withdrawn through said channel when said valve is in open position comprising: a mandrel having a longitudinal bore extending therethrough; means for releasably supporting said valve within said flow channel; packing means on said mandrel for sealing between said mandrel and a wall forming said flow channel; an upper valve seat body having a longitudinal bore and an annular valve seat formed on the lower end thereof around said bore positioned within said mandrel and locked against longitudinal movement relative thereto; a ball valve having a bore therethrough rotatably positioned below said upper valve seat body and engageable with said valve seat; a lower valve seat body having a longitudinal bore and an annular upwardly facing valve seat surface around said bore slidably positioned within said mandrel below said ball valve; resilient means operatively enaged between said lower valve seat body and said mandrel biasing said lower valve seat body upwardly against said ball valve confining said ball valve between said seat on said upper valve seat body and said seat on said lower valve seat body whereby said ball valve element is rotatable between said upper and lower seat bodies and resiliently held against longitudinal movement within said mandrel; said mandrel being spaced apart along a central section from and over a lower end section of said upper valve seat body, said ball valve, and an upper end section of said lower valve seat body providing an annular chamber therearound; an annular piston disposed in said annular chamber; operator means operatively engaged between said annular piston and said ball valve for rotating said ball valve element between open and closed positions responsive to longitudinal movement of said annular piston; said mandrel being provided with flow passage means communicating with said annular cylinder to permit control fluid to be applied into said annular cylinder to displace said annular piston for rotating said ball valve between a first and a second position;

and spring means for biasing said annular piston toward said first position.

9. A well production valve as defined in claim 8 wherein said annular piston comprises inner and outer concentric portions moveable relative to each other.

10. A system for the subsurface control of flow through a well bore of the character set forth in claim 1 wherein one of said valve means comprises a well production valve adapted to be releasably locked within a flow passage comprising one of said first and second flow channels for controlling fluid flow through said flow passage, said valve comprising: a mandrel having an upper section a central section and a lower section and provided with a central longitudinal flow passage extending therethrough; locking means engaged on said upper section of said mandrel for releasably locking said valve within said flow passage; upper and lower external annular packing secured around said mandrel spaced apart from each other, the outside diameter of said packing being greater than the outside diameter of said mandrel between said packing thereby providing an annular space around said mandrel when said mandrel is locked within said flow passage; means providing a fluid flow passage through said mandrel between said upper and lower packing; an upper tubular valve seat member having a longitudinal bore extending therethrough coincident with the bore through said mandrel and having a lower end annular seat surface around said bore; means securing said upper valve seat member within said bore of said mandrel to hold said valve seat member against longitudinal movement within said mandrel; a lower tubular valve seat body having a longitudinal bore extending therethrough coincident with the bore of said mandrel slidably positioned within said mandrel below said upper valve seat body and having an upper valve seat surface around said bore; a ball valve having a bore therethrough confined between said seats on said upper and lower valve seat members whereby said ball valve may rotate between open and closed positions between said valve seat members; a spring operatively engaged between said mandrel and said lower valve seat body biasing said valve seat body upwardly to confine said ball valve element between said valve seats on said valve seat members thereby resiliently holding said ball valve element against longitudinal movement within said mandrel while permitting said ball valve element to rotate between open and closed positions; said central section of said mandrel being spaced apart around and concentric with a lower end portion of said upper valve seat member and an upper portion of said lower valve seat member thereby providing an annular cylinder around said valve seat members and said ball valve element; an annular piston slidably disposed within said annular cylinder; operator means operatively connecting said annular piston with said ball valve for rotating said ball valve element between open and closed positions relative to longitudinal movement of said annular piston; said mandrel providing flow passage means for conducting control fluid from between said packing on said mandrel into said annular cylinder; and spring means biasing said annular piston upwardly to rotate said ball valve toward a closed position when the pressure of said control fluid is below a predetermined valve.

11. A well production valve as defined in claim 10 wherein said annular piston comprises inner and outer concentric portions moveable longitudinally relative to each other.

12. A system for the subsurface control of flow through a well bore of the character set forth in claim 1 wherein one of said valve means comprises a well production valve adapted to be releasably locked within a flow passage comprising one of said first and second flow channels for controlling fluid flow through said well bore comprising: a mandrel having an upper section, a central section, and a lower section and a longitudinal bore extending therethrough; locking means secured on the upper end of said upper section for releasably locking said valve within said flow passage; upper and lower external annular packing secured around said upper mandrel section spaced apart from each other, the outside diameter of said packing being greater than the outside diameter of said upper mandrel section between said packing thereby providing an annular space around said mandrel between said packing when said valve is positioned within said flow passage; an upper tubular valve seat member positioned within said mandrel and having a central bore coincident with the bore of said mandrel and a lower annular valve seat surface around said bore; lock ring means engaged between said upper section of said mandrel and said upper valve seat member to hold said valve seat member against longitudinal movement within said mandrel; a lower tubular valve seat member slidably positioned within said mandrel below said upper valve seat member, said lower valve seat member haing a bore therethrough coincident with said bore through said mandrel and having an upwardly facing annular valve seat around said bore; a ball valve having a bore therethrough rotatable into and out of alignment with said bores through said valve seat member and confined between said seats on said valve seat members whereby said ball valve may rotate between said seat and is held against longitudinal movement relative to said mandrel by said seats; a spring operatively engaged between said mandrel and the lower end of said lower valve seat member biasing said valve seat member upwardly to resiliently hold said ball valve between said valve seats permitting said ball valve to rotate while being held against longitudinal movement; said central section of said mandrel being spaced apart from said upper and lower ball valve seat members providing an annular chamber around said valve seat members and said ball valve; an annular piston slidably positioned within said annular cylinder around said upper valve seat member and engageable with an upwardly facing external annular shoulder on said upper valve seat member limiting the downward movement of said annular piston; a downwardly extending sleeve connected with said annular piston and extending around said ball valve and lower and upper portions, respectively, of said upper and lower valve seat members; said annular piston and said annular sleeve being displacable downwardly by control fluid pressure within said annular cylinder above said annular piston; said mandrel being provided with flow passage means to permit control fluid to be applied through said mandrel between said upper and lower external annular packing into said annular cylinder against said annular piston; said annular piston having a window opening therethrough extending partially around said ball valve; said ball valve being provided with spaced apart operator holes; operator members disposed around said ball valve within said window of said sleeve whereby longitudinal movement of said piston and sleeve effects corresponding movement of said operator members; each of said operator members having a an operator knob received in one of said operator holes of said ball valve whereby longitudinal movement of said operator members effects rotation of said ball valve; said annular piston being moveable by control fluid pressure from a first position to a second position thereby rotating said ball valve from a first position to a second position; and a spring operatively engaged between said mandrel and the lower end of said sleeve biasing said sleeve and said piston toward said first position to return said ball valve to said first position in the absence of control fluid pressure of a predetermined magnitude within said annular cylinder.

13. A well production valve as defined in claim 12 including means providing lateral port means through said lower tubular valve seat member below and near said upwardly facing annular valve seat.

14. A well production valve as defined in claim 12 wherein said annular piston comprises: an inner piston member engageable at the lower end thereof with said external annular shoulder around said upper valve seat member; an outer piston member slidably positioned concentrically around said inner piston member, an internal upwardly facing annular shoulder being formed at the upper end of said sleeve around said valve seat and ball valve at the juncture of said sleeve with the lower end of said outer piston member, said shoulder being engageable with the lower end of said inner piston member; inner and outer ring seals to seal between said inner piston member and the outer surface of said upper valve seat member and the inner surface of said outer piston member respectively; and a ring seal to seal between said sleeve around said valve seat members and said ball valve and said housing around said sleeve.

15. A well production valve as defined in claim 12 wherein the annular piston includes: an inner piston member slidably positioned around said upper valve seat member and engageable at the lower end thereof with said external upwardly facing annular shoulder on said upper valve seat member when said ball valve has been rotated to a partially open position; an outer piston member slidably positioned concentrically around said inner piston member and connected with said sleeve around said upper and lower valve seat members and said ball valve, an internal upwardly facing annular shoulder being formed at the juncture of said outer piston segment and said sleeve engageable with the lower end of said inner piston member when said sleeve and outer piston member are moving upwardly and said ball valve is rotated to a partially closed position, said shoulder being spaced apart below the lower end of said inner piston segment when said ball valve is rotated to a fully open position responsive to downward movement of said sleeve and outer piston member; inner and outer ring seals carried by said inner piston member to seal respectively with the outer surface of said upper valve seat member and the inner surface of said outer piston member; and a ring seal carried by said sleeve around said upper and lower valve seat members and said ball valve to seal between said sleeve and said inner surface of said housing around said sleeve.

16. A subsurface fluid flow control system to control fluid flow through a well bore comprising: a tubing string supported within said well bore from a wellhead forming a first flow channel through said tubing string and a second flow channel within the annular space around said tubing string within said well bore; a well packer connected with said tubing string above a fluid producing formation forming a seal around said tubing string within said well bore; a flow control assembly connected in said tubing string above said packer to direct fluid flow from below said packer into said first and second flow channels; said flow control assembly being provided with a first longitudinal bore substantially in alignment with said tubing string and a second longitudinal bore extending in side-by-side non-communicating relationship with said first bore and a lateral port communicating with said second bore, said first and second bores opening into a common chamber above the upper end of said bores; and flow control means detachably secured in said second bore to receive fluids from below said packer and direct said fluids through said lateral port to flow to the surface through said second flow passage.

17. A system for controlling fluid flow in a well bore according to claim 16 including a lower tubing string connected at the upper end thereof with said well packer and a second well packer connected with said lower tubing string below said producing formation and above a second lower producing formation to pack off around said lower tubing string between said formations, fluids flowing into said lower tubing string from below said second packer flowing into said first bore of said landing nipple and fluids flowing into said well bore between said packers flowing into said second bore of said landing nipple.

18. System for the subsurface control of fluid flow in a well bore comprising: a tubing string supported from a wellhead forming a first flow channel through said tubing string and a second annular flow channel around said tubing string; a packer connected to said tubing string packing off around said tubing string within said well bore above a producing formation; a fluid flow control assembly connected in said tubing string above said packer; said flow control assembly including a landing nipple having at least two longitudinally extending non-communicating side-by-side bores connecting into a common chamber above the upper ends of said bores, the first of said bores being in alignment with said tubing string and the second of said bores being eccentrically positioned to one side of a line coincident with the longitudinal axis of said tubing string; said landing nipple being provided with a lateral port communicating with said second bore; valve means positioned in said second bore of said landing nipple for directing fluid flowing from below said landing nipple through said lateral port; and means for controlling said valve means from the surface.

19. A system for the subsurface control of fluid flow in a well bore according to claim 18 including a lower tubing string connected to and extending downwardly from said packer and a second well packer connected with said lower tubing string below said producing formation above a second lower producing formation to pack off around said lower tubing string between said formations, fluids from said lower formation being directed through said lower tubing string upwardly into said first bore of said landing nipple and fluids from between said packers being directed into said second bore of said landing nipple.

20. A system for controlling fluid flow through a well bore comprising: a tubing string extending from a wellhead defining a first central flow channel and a second annular flow channel around said tubing string within said well bore; a packer connected with said tubing string packing off around said string within said well bore above a producing formation; a fluid flow control assembly connected in said tubing string above said packer; said flow control assembly including a landing nipple having a first longitudinal bore extending substantially in alignment with the axis of said tubing string and a second longitudinal bore extending in side-by-side non-communicating relationship with said first bore; said first and second bores in said landing nipple communicating with a common chamber in said flow control assembly above said bores opening into said tubing string whereby well tools may be introduced into and withdrawn from both of said bores through said tubing string; said landing nipple being operatively connected with said packer to provide a first fluid flow passage from below said packer into said first bore and a second flow passage from below said packer into said second bore; said landing nipple having a lateral port communicating with said second bore; a flow control valve detachably engaged in said second bore; and means connected between said flow control assembly and the surface for controlling said flow control valve from the surface.

21. A system for the subsurface control of fluid flow through a well bore comprising: a tubing string extending from a wellhead defining a first flow channel through said string and a second annular flow channel around said string; a packer secured within said well bore to said tubing string above a producing formation; a flow control assembly connected in said tubing string above said packer; said flow control assembly including an upper tubular member having an upper tubular section having a head member connected to said tubing string, a landing nipple secured to said upper tubular section, and a lower tubular section connected between said landing nipple and said packer; said landing nipple having a first longitudinal bore aligned with said tubing string and a second longitudinal bore extending in side-by-side non-communicating relationship with said first bore, said first and second bores opening into a chamber above said landing nipple within said upper tubular section communicating with said tubing string and providing space whereby well tools may be installed in and removed from said first and second bores of said landing nipple through said tubing string; said landing nipple having a lateral port communicating with said second bore; said lower tubular section and said packer being provided with means defining a first flow passage extending through said packer and said tubular section into said first bore of said landing nipple and a second flow passage extending through said packer and said tubular section into said second bore of said landing nipple; a fluid flow control valve in said second bore of said landing nipple to prevent fluid flow upwardly from the upper end of said bore and direct fluid flow entering the lower end of said bore outwardly laterally from said bore through said lateral port; and control fluid flow passage means connected between said wellhead and said flow control assembly to provide fluid pressure control of said valve in said second bore of said landing nipple.

22. A system of the character set forth in claim 21 wherein said wellhead and said control fluid flow passage means comprises: a control line adapted to be installed and removed independently of said well tubing string; an exit spool adapted to be secured in a wellhead and having a longitudinally extending first bore to receive the upper end section of said tubing string; packing means carried by said exit spool for sealing around said tubing string within said spool; said exit spool having a second longitudinally extending bore substantailly parallel with said first bore, said second bore being closed at the upper end thereof within said exit spool and opening downwardly through the lower end of said spool; said exit spool having a lateral flow passage communicating with said second bore intermediate the ends thereof; a mandrel removably held in said second bore of said spool, said mandrel having a longitudinal bore therethrough closed at the upper end thereof and opening downwardly through the lower end thereof, said mandrel having lateral ports intermediate the ends thereof communicating with said second bore of said spool; external annular packing on said mandrel above and below said lateral ports to seal around said mandrel within said second bore of said spool; a control fluid line connected into the lower end of said mandrel and extending downwardly along said tubing string to said flow control assembly; said head member on said flow control assembly having a first longitudinal bore communicating with said tubing string and a second longitudinal bore terminating within said head member and opening upwardly; said head member having flow passages communicating with said second bore between the ends of said bore and a control fluid conduit extending from said head member downwardly a landing nipple of said flow control asembly; a mandrel connected on the lower end of said control line and removably engaged in said second bore of said head member, said mandrel having a longitudinally extending bore terminating within said mandrel and communicating lateral flow passage means permitting fluid flow from said control fluid line through said mandrel and laterally outwardly into said control fluid flow passages in said head member; external annular packing on said mandrel above and below said lateral flow passage means of said mandrel to seal between said mandrel and said head member within said second bore of said member; and means provided on said mandrel releasably locking said mandrel within said head member.

23. A system of the character set forth in claim 21 wherein said wellhead and said control fluid flow passage means comprises: a control line adapted to be installed and removed independently of said well tubing string; an exit spool adapted to be secured in said wellhead at the surface of said well bore, said exit spool having a first longitudinal bore therethrough to receive an upper end section of said tubing string, said exit spool being provided with an internal annular recess around said first longitudinal bore along an upper end section thereof; an annular packing assembly within said recess of said exit spool adapted to seal between said exit spool and said tubing string along an upper end section thereof; an annular retainer ring threaded in said exit spool around the upper end of said tubing string to hold said annular packing assembly against upward movement within said exit spool; said exit spool being provided with a second longitudinal bore extending substantially parallel to said first longitudinal bore, said second bore being closed at the upper end thereof and open downwardly; said exit spool being provided with a lateral port communicating said first longitudinal bore with the upper end of said second longitudinal bore; said exit spool being provided with a lateral flow passage communicating through the wall of said spool into said second longitudinal bore intermediate the ends of said bore to permit introduction of control fluid into said second bore; a removable mandrel having a longitudinal bore extending therethrough positioned within said second bore of said exit spool and having lateral ports communicating said second bore of said exit spool with said bore through said mandrel; a cap secured on the upper end of said mandrel closing said bore through said mandrel at the upper end thereof; annular packing secured around said mandrel above and below said lateral ports through said mandrel to seal within said second bore of said exit spool around said mandrel; a fluid control line secured at the upper end thereof into the lower end of said mandrel; said control line extending downwardly along said tubing string to said flow control assembly within said well bore; said flow control assembly including a head member having a first longitudinal bore communicating with the lower end of said tubing string and a second longitudinal bore open at the upper end thereof and terminating within said head member; said head member having a port communicating through the wall thereof into the lower end of said second longitudinal bore and having an internal annular recess formed around said second longitudinal bore intermediate the ends thereof to receive bosses on collet fingers of a removable stab-in assembly secured on the lower end of said control line; an adapter secured on the lower end of said control line, said adapter having a longitudinal bore therethrough communicating with said control line; a mandrel secured at the upper end thereof to the lower end of said adapter, said mandrel being provided along a central portion having a plurality of longitudinal slots forming fluid flow passages through said mandrel and forming longitudinally extending collet fingers, said collet fingers having outwardly extending bosses for engaging said internal annular recess around said second bore of said head member for releasably holding said stab-in assembly within said head member; an external annular packing secured around said mandrel above and below said longitudinal slots for sealing within said second bore of said head member around said mandrel; and said head member having fluid flow passage means communicating with said second bore of said head member between said packing on said mandrel, the lower end of said flow passage means being in communication with a control fluid line extending from said head member to a landing nipple of said flow control assembly whereby control fluid may be communicated from said control line connected with said stab-in assembly through said stab-in assembly and said head member downwardly to said landing nipple.

24. A system for the subsurface control of fluid flow in a well bore comprising: a tubing string extending from a wellhead downwardly through said well bore and defining a first fluid flow passage through said tubing string and a second fluid flow passage within said well bore around said tubing string; a flow control assembly connected with said tubing string at the lower end thereof; a well packer connected with said flow control assembly above a producing formation to pack off around said assembly within said well bore; said flow control assembly including a first longitudinal bore extending substantially in alignment with said tubing string and a second longitudinal bore extending in side-by-side non-communicating relationship with said first bore, the upper ends of said first and second bores communicating with a common chamer opening into said tubing string whereby well tools may be inserted into and withdrawn from both of said bores through said tubing string; said flow control assembly having a lateral port communicating with said second bore; a longitudinally slidable flow tube extending in movable relationship from said first bore through said packer for directing well fluids defining a central flow passage through said packer within said flow tube and an annular flow passage through said packer around said flow tube, said central flow passage communicating with said first bore and said annular flow passage communicating with said second bore; said flow tube being movable downwardly to actuate release means in said packer for releasing said packer to be set within said well bore; a flow control valve detachably positioned within said first bore for controlling fluid flow into said tubing string; and a flow control valve detachably engaged in said second bore to prevent fluid flow upwardly from the upper end of said second bore and to direct fluid flow laterally from said flow control assembly through said lateral port.

25. A system for the subsurface control of fluid flow through a well bore comprising: a tubing string extending from a wellhead on said well bore downwardly; a flow control assembly connected at the upper end thereof on the lower end of said tubing string; a well packer connected on the lower end of said flow control assembly to pack off around said flow control assembly within said well bore; said flow control assembly including an upper tubular section having a head member connected with said tubing string, a landing nipple secured with said upper tubular section, and a lower tubular section connected between said landing nipple and said packer; said landing nipple having a first longitudinal bore extending therethrough in alignment with said tubing string and a second bore extending in side-by-side non-communicating relationship with said first bore, said first and second bores opening into a chamber above said landing nipple formed by said upper tubular section whereby well tools may be introduced into and withdrawn from said first and second bores of said nipple through said tubing string; said landing nipple having a lateral port communicating with said second bore; a flow tube slidably positioned from said first bore of said landing nipple through said packer defining a central flow passage through said packer into said first bore and an annular flow passage through said packer communicating through said lower tubular section to said second bore of said landing nipple; said flow tube being operatively engageable with releasing means in said packer whereby said flow tube is displaced downwardly to release said packer to be set within said well bore; a flow control valve detachably positioned within said first bore of said landing nipple for controlling fluid flow into said tubing string; and a flow control valve detachably positioned within said second bore of said landing nipple for preventing fluid flow from the upper end of said bore into said upper tubular section and directing fluid flow from said second bore laterally through said lateral port from said landing nipple.

26. A system for the subsurface control of fluid flow in a well bore as defined in claim 25 including means connected between said wellhead and said flow control assembly for controlling said flow control valves in said first and second bores of said landing nipple from the surface.

27. A system for the subsurface control of fluid flow through a well bore according to claim 26 wherein said flow control valve in said first bore is a ball type pressure actuatable valve adapted to be held in open position by control fluid pressure and said flow control valve in said second bore of said landing nipple is a poppet type valve adapted to be held in open position by control fluid pressure.

28. A system for the subsurface control of fluid flow in a well bore comprising: a tubing string extending downwardly from a wellhead at the surface end of said well bore; a flow control assembly connected at the upper end thereof with the lower end of said tubing string; said tubing string defining a first fluid flow passage to the surface through said well bore and a second fluid flow passage around said tubing string within said well bore; an upper well packer connected on the lower end of said flow control assembly to seal within said well bore around said control assembly above an upper producing formation; a lower tubing string extending downwardly from said upper packer below said upper producing formation; a lower packer connected on the said lower tubing string below said upper formation and above a lower producing formation to pack off said lower tubing string within said well bore; said flow control assembly including a landing nipple having a first longitudinal bore aligned with said upper tubing string and a second longitudinal bore extending in side-by-side non-communicating relationship with said first bore and a lateral port opening into said second bore; said flow control assembly and said upper packer having means defining a first flow passage into said first bore of said landing nipple and a second flow passage into said second bore of said landing nipple; said first flow passage being in communication with said lower producing formation through said lower tubing string and said second flow passage being in communication with said well bore between said packers; a flow control valve detachably positioned in said first bore through said landing nipple; for controlling fluid flow into said upper tubing string; a flow control valve detachably positioned within said second bore through said landing nipple for preventing fluid flow from said bore upwardly and directing fluid flow laterally from said bore through said lateral port outwardly from said flow control assembly.

29. A subsurface fluid flow control system to control fluid flow through a well bore comprising: a tubing string supported within the well bore from a wellhead forming a first fluid flow channel through said tubing string and a second fluid flow channel within the annular space around said tubing string; a first upper well packer connected with said tubing string above an upper producing formation to pack off within said well bore around said tubing string; a lower tubing string connected to and extending downwardly from said upper well packer; a lower well packer connected with said tubing string below said upper formation and above a lower formation to pack off within said well bore around said lower tubing string; a flow control assembly connected in said upper tubing string above said upper packer; said flow control assembly including a head member connected to and having a bore communicating with said upper tubing string, an upper tubular housing section connected with said head member, a nipple section connected with said tubular housing section, and a lower tubular section connected between said nipple section and said upper packer; said nipple section having a first longitudinal bore substantially aligned with said upper tubing string and a second longitudinal bore extending in side-by-side non-communicating relationship with said first bore, said first and second bores opening into said upper tubular housing section whereby well tools may be introduced into and removed from both of said bores of said landing nipple section through said upper tubing and said upper housing section; said landing nipple section having a lateral port communicating with said second bore; a longitudinally slidable flow tube extending from said first bore of said landing nipple section through said upper packer and defining a tubing flow passage through said packer and said lower housing section communicating said lower tubing string with said first bore through said landing nipple and an annular flow passage through said packer and said lower housing section communicating with said second bore through said landing nipple; means supported by said upper packer below said packer providing a port communicating with said annular flow passage through said packer and the annular space within said well bore around said lower tubing string between said packers; said flow tube and said upper packer having cooperating means for releasing said upper packer to be set in said well bore responsive to downward movement of said flow tube within said packer; a flow control valve releasably secured within said first bore of said landing nipple to control fluid into said upper tubing string; and a flow control valve releasably secured within said second bore of said landing nipple to prevent fluid flow from said bore into said upper tubing section and to direct fluid flow in said bore laterally outwardly from said flow control assembly through said lateral port.

30. A fluid flow control system according to claim 29 wherein said fluid actuatable valves in each of said first and second bores through said landing nipple are remotely actuatable fluid pressure responsive, and flow control fluid means is connected between the surface and said flow control assembly for remote fluid pressure control of each of said flow control valves from the surface.

31. A fluid flow control system according to claim 30 wherein said valve in said first bore of said landing nipple is a ball type remotely actuatable valve and said valve in said second bore of said landing nipple is a poppet type remotely actuatable type valve.

32. A subsurface fluid flow control system to control fluid flow through a well bore comprising: a tubing string supported within said well bore from a wellhead providing a first flow channel through said tubing string and a second flow channel within the annular space around said tubing string; a fluid flow control assembly connected with said upper tubing string; said flow control assembly having a first longitudinal bore extending in alignment with said upper tubing string and a second longitudinal bore extending in side-by-side non-communicating relationship with said first bore, said bores communicating with a chamber above the upper ends of said bores opening into said tubing string whereby well tools may be installed in and removed from each of said bores through said tubing string; said flow control assembly having a lateral port communicating with said second bore; a first flow control valve releasably engaged in said first bore of said flow control assembly; a second flow control valve releasably secured in said second bore of said flow control assembly to prevent fluid flow upwardly from the upper end of said bore and to direct fluid flow in said second bore laterally outwardly through said lateral port in said flow control assembly; an upper well packer connected on the lower end of said flow control assembly, said well packer having a first bore communicating with said first bore of said flow control assembly and a second separate bore communicating with said second bore of said flow control assembly, the lower end of said second bore being in communication with said well bore below said upper packer; a lower tubing string connected with said upper packer into said first bore of said packer; a lower packer connected on said lower tubing string below said upper producing formation and above a lower producing formation to pack off within said well bore around said lower tubing string, said lower tubing string being open below said lower packer to conduct fluids from said lower producing formation through said lower tubing string into said first bore through said packer and said flow control assembly.

33. A fluid flow control system according to claim 32 wherein said first flow control valve is a ball type fluid responsive valve adapted to be remotely controlled by fluid pressure and said second flow control valve is a poppet type fluid responsive valve adapted to be remotely controlled by fluid pressure.

34. A system for the subsurface control of fluid flow in a well bore comprising: a tubing string supported within the well bore from a wellhead forming a first flow channel through said tubing string and a second flow channel within the annular space around said tubing string; a flow control assembly connected with said upper tubing string to control fluid flow into said upper tubing string and said second flow channel; said flow control assembly including a head member secured to said tubing string, an upper tubular housing section connected with said head member, a landing nipple section connected with said upper housing section, said landing nipple section having a first longitudinal bore aligned with said upper tubing string and a second longitudinal bore extending in side-by-side and non-communicating relationship with said first bore, said upper housing section providing space permitting installation and withdrawal of well tools into and from each of said bores of said landing nipple section through said upper tubing string, said landing nipple section having a lateral port opening into said second bore; a first flow control valve detachably engaged within said first bore of said landing nipple section to control fluid flow into said upper tubing string; a second fluid flow control valve detachably secured in said second bore of said landing nipple section to prevent fluid flow into said upper housing section from said second bore and to direct fluid flow from said bore laterally through said lateral port; an upper well packer connected with the lower end of said flow control assembly, said packer having a first longitudinal flow passage communicating with said first bore through said landing nipple section and a second longitudinal flow passage communicating with said second bore of said landing nipple section, said second flow passage through said well packer being open into said well bore below said packer, said packer being set in well bore above an upper producing formation whereby fluids from said formation flow into said second flow passage through said packer; a lower tubing string connected with said well packer communicating with said first flow passage through said packer; a second lower well packer connected with said lower tubing string below said upper producing formation and above a second lower producing formation to pack off within said well bore around said lower tubing string; said lower tubing string being open below said lower packer to permit entry of fluids from said lower producing formation.

35. A subsurface fluid flow control system to control fluid flow through a well bore comprising: a tubing string supported within the well bore from a wellhead forming a first flow channel through said tubing string and a second flow channel within the annular space around said tubing string; a well packer connected with said tubing string forming a seal around said tubing string above a fluid producing formation; a flow control assembly connected in said tubing string above said packer to direct fluid flow below said packer into said first and second flow channels; said flow control assembly being provided with a first longitudinal bore substantially in alignment with said tubing string and a second longitudinal bore extending in side-by-side non-communicating relationship with said first bore; said bores opening into a tubular housing section above the upper ends of said bores within said flow control assembly permitting installation and withdrawal of well tools into and from each of said bores through said tubing string; said flow control assembly being provided with lateral port means communicating with said second bore; flow control means detachably secured in said second bore for preventing fluid flow from said bores into said tubular chamber above said bores and directing fluid flow laterally outwardly from said assembly through said lateral ports; and plug means detachably secured in said first bore for preventing fluid flow through said first bore.

36. A subsurface fluid flow control system to control flow through a well bore comprising: a tubing string supported within the well bore from a wellhead forming a first flow channel through said tubing string and a second flow channel within the annular space around said tubing string; a well packer connected with said tubing string forming a seal within said well bore above a fluid producing formation; a flow control assembly connected in said tubing string above said packer to direct fluid flow from below said packer into said first and second flow channels; said flow control assembly having a first longitudinal bore aligned with said tubing string and a second longitudinal bore extending in side-by-side non-communicating relationship with said first bore, said first and second bores opening into a chamber above said bores to permit well tools to be introduced in and removed from said bores through said tubing string; said flow control assembly having lateral port means communicating with said second bore; first flow control valve means positioned in said second bore for preventing fluid flow into said chamber above said bores and to direct fluid flow from said becond bore laterally outwardly through said lateral port means from said flow control assembly; means aligned with said tubing string and said first bore and longitudinally above said first bore for releasably locking a well tool; and second flow control valve means releasably engaged within said last mentioned means for controlling fluid flow through said tubing string.

37. A subsurface fluid flow control system in accordance with Claim 36 wherein said first and second flow control valve means are remotely actuatable and means are connected between said wellhead and said fluid flow control valve means for remotely controlling said valves from the surface.

38. A subsurface fluid flow control system for controlling fluid flow through a well bore comprising: a tubing string supported within the well bore from a well head forming a first flow channel through said tubing string and a second flow channel within the annular space around said tubing string; a well packer connected with said tubing string within said well bore above a producing formation to seal within said well bore around said tubing string; a flow control assembly connected in said tubing string above said packer; said flow control assembly comprising a head member connected with said tubing string and having a bore communicating with said tubing string, an upper housing section connected with said head member, a landing nipple second connected with said upper housing section, and a lower housing section connected with said landing nipple section between said landing nipple section and said well packer; said landing nipple section having a first bore aligned with said tubing string and a second bore extending in side-by-side non-communicating relationship with said first bore, said first and second bores opening into said upper tubular housing section whereby well tools may be inserted into and removed from each of said bores through said well tubing string; a flow tube slidably positioned through said well packer and said lower tubular housing section extending into said first bore through said landing nipple section defining a central flow passage through said well packer and said lower housing section into said first bore of said landing nipple section and an annular flow passage through said packer and said lower housing section communicating with said second bore in said landing nipple section; said flow tube in said well packer having cooperating means for releasing said well packer to be set in said well bore responsive to downward movement of said flow tube relative to said well packer; a fluid flow control valve releasably secured in said second bore of said landing nipple section for preventing flow from the upper end of said bore into said upper tubular housing section and directing flow from said second bore laterally through lateral port means communicating with said second bore; landing nipple means connected with said tubing string above said first bore of said last nipple section; and a flow control valve detachably secured in said last mentioned landing nipple means for controlling fluid flow through said tubing string.

39. A fluid flow control system according to claim 38 wherein said flow control valves are each remotely actuatable type valves and means are connected between said wellhead and said flow control valves for remotely controlling said valves from said wellhead.

40. A fluid flow control system according to claim 39 including in addition thereto a lower tubing string extending downwardly from said well packer communicating with said flow tube through said well packer and another well packer connected with said lower tubing string below said producing formation and above a lower producing formation to seal around said lower tubing string within said well bore, the fluids from said lower producing formation being directed through said lower tubing string and said flow tube through the uppermost of said packers and said lower tubular housing section into said first bore of said landing nipple and the fluids from the upper of said producing formations flowing into said annular flow passage below the upper of said packer into said annular flow passage through said lower tubular housing section into said section bore of said landing nipple section.

41. A subsurface fluid flow control assembly adapted to be connected with a tubing string supported within a well bore from a wellhead forming a first flow channel through said tubing string and a second annular flow channel around said tubing string, said flow control assembly directing fluid flow from below said assembly into each of said flow channels, said assembly comprising: a head member having an eccentrically positioned bore to communicate with said tubing string when said head member is engaged on said tubing string; an upper tubular housing section connected with said head member; a landing nipple section connected with said tubular housing section, said landing nipple section having a first longitudinal bore extending substantially in alignment with said bore through said head member and at least a second bore extending in side-by-side non-communicating relationship with said first bore, each of said bores through said landing nipple section opening at the upper end thereof into said upper tubular housing section whereby well tools may be introduced into and removed from each of said bores through said bore through said head member; said landing nipple section being provided with lateral port means communicating with said second bore of said landing nipple section for directing fluid into said annular flow passage around said tubing; a lower housing section connected on the lower end of said landing nipple section and secured to the upper end of a well packer; a longitudinally slidable flow tube extending from said first bore through said landing nipple section through said lower tubular housing section and said well packer defining a first central flow passage extending from below said packer into said first bore through said landing nipple section and a second annular flow passage extending around said flow tube through said well packer and said lower tubular housing section communicating with said second bore through said landing nipple section; and cooperating means connected with said flow tube and said well packer for releasing said well packer to be set within a well bore responsive to longitudinal movement of said flow tube relative to said well packer.

42. A fluid flow control assembly according to claim 41 including a flow control valve releasably lockable in each of said bores through said landing nipple section.

43. A fluid flow control assembly as defined in claim 42 wherein said flow control valves in said first bore through said landing nipple comprises a remotely actuatable pressure responsive ball type valve and said flow control valve in said second bore through said landing nipple comprises a remotely actuatable pressure responsive poppet type valve.

44. A fluid flow control assembly adapted to be secured to the lower end of a tubing string defining a first flow passage through a well bore within said tubing string and a second flow passage through said well bore in the annular space around said tubing string, said flow control assembly directing fluid flow into said first and second flow passages from below said assembly, said flow control assembly comprising: a head member having a longitudinally extending eccentrically positioned bore therethrough for connection to said tubing string with said bore; means supported by said head member for connecting a control fluid line into said flow control assembly and conducting control fluid through said head member; an upper tubular housing section connected with said head member defining an enclosed chamber below said head member communicating with said bore through said head member; a landing nipple section secured to said upper tubular housing section, said landing nipple section being provided with a first longitudinal bore communicating at the upper end with said chamber in said upper housing section and aligned with said bore through said head member, said landing nipple section being further provided with a second longitudinal bore extending in side-by-side non-communicating relationship with said first bore and opening at the upper end into said chamber within said upper housing section, said landing nipple section being additionally provided with a lateral port communicating with said second bore; said landing nipple section being provided with means forming a locking recess around each of said first and second bores and having contoured upper end surfaces for guiding well tools into each of said bores; said landing nipple section being additionally provided with fluid flow passages for directing control fluid into flow control valves in each of said bores; means providing a conduit from said head member through said upper housing section into said landing nipple section for conducting control fluid from said control fluid flow means in said housing member into said control fluid flow passages in said landing nipple section; a lower tubular housing section connected with said landing nipple section at the upper end thereof; a well packer secured on the lower end of said lower housing section; a connecting member on the lower end of said well packer for securing a lower tubing string to said well packer; a longitudinally slidable flow tube extending through said lower connecting member, said packer, and said lower housing section into said first bore of said landing nipple section defining a central fluid flow passage from below said packer into said first bore and an annular flow passage through said lower connecting member, said well packer, and said lower tubular housing section into said second bore of said landing nipple; said lower connecting member being provided with port means communicating into said annular flow passage through said member; means provided on said flow tube and in said well packer whereby longitudinal movement of said flow tube relative to said well packer releases said packer to be set in a well bore.

45. A fluid flow control assembly in accordance with claim 44 including a flow control valve detachably securable within said first bore of said landing nipple section and a detachably securable flow control valve for said second bore of said landing nipple.

46. A fluid flow control assembly as defined in claim 45 wherein said flow control valve for said first bore is a ball type fluid responsive remotely actuatable valve adapted to be held in open position by fluid pressure communicated from the surface and said flow control valve in said second bore of said landing nipple is a poppet type fluid responsive remotely actuatable valve adapted to be held in open position by fluid pressure communicated from the surface.

47. A fluid flow control system in accordance with claim 46 wherein said head member, said upper housing section, and said landing nipple section above said lateral port communicating with said second bore have an oval cross sectional shape.

48. A subsurface flow control assembly in accordance with claim 47 wherein said means on said head member for connecting a control fluid line to said flow control assembly comprises a landing nipple for receiving a remotely connectable stab-in type unit for removably connecting the lower end of a control fluid line extending from the surface providing communication through said head member into said control line from said head member to said landing nipple section.

49. A subsurface fluid flow control assembly adapted to be connected to a tubing string defining a first flow passage through said tubing string and a second annular flow passage around said tubing string, said flow control assembly directing fluid flow from below said assembly into said first and second flow passages, said flow control assembly comprising: a head member having an eccentrically positioned bore communicating with said tubing string when connected with said string; said head member being provided with means for connecting a control fluid line from the surface into said member and for conducting control fluid from said line through said member; an upper tubular housing section connected with said head member providing a chamber within said housing section below said head member communicating with said bore through said head member; a landing nipple section connected on said upper tubular housing section, said landing nipple section having a first longitudinal bore opening into said upper housing section and aligned with said tubing string and a second longitudinal bore extending in side-by-side non-communicating relationship with said first bore opening at the upper end thereof into said upper housing section; said landing nipple section being further provided with a lateral port communicating with said second bore; a lower housing section connected on said landing nipple section provided with a first bore communicating with said first bore through said landing nipple section and a second bore communicating with said second bore through said landing nipple section; a well packer secured on the lower end of said lower housing section, said well packer having a first bore communicating with said first bore in said lower housing section and a second bore communicating with said second bore of said lower housing section.

50. A fluid flow control assembly as defined in claim 49 including a flow control valve detachably lockable in said first bore of said landing nipple section to control fluid flow into said upper tubular housing section and a flow control valve detachably lockable in said second bore of said landing nipple section to prevent fluid flow from the upper end of said second bore into said upper tubular housing section and direct fluid flow laterally from said second bore through said lateral port communicating with said second bore.

51. A fluid flow control assembly as defined in claim 50 wherein said flow control valve in said first bore is a ball type fluid responsive remotely actuatable valve adapted to be controlled from the surface and said flow control valve in said second bore is a poppet type fluid responsive remotely actuatable valve controllable from the surface.

52. A fluid flow control assembly in accordance with claim 51 wherein said means in said head member for connecting said flow control line comprises landing nipple means for receiving in sealed fluid-conducting relationship a stab-in unit on the lower end of a flow control line extendable from the surface to said flow control assembly whereby said flow control line may be remotely connected with and removed from said flow control assembly from the surface independent of the tubing string extending to said flow control assembly.

53. A fluid flow control assembly for connection with a tubing string defining a first flow passage through said tubing string in a well bore and a second annular flow passage around said tubing string within said well bore, said flow control assembly directing fluid from below said assembly into said first and second flow channels, said flow control assembly comprising: a head member having an eccentrically positioned bore connectable with said tubing string and provided with means for conducting therethrough control fluid from a control line extendable to the surface; an upper housing section connected with said head member providing a chamber; a landing nipple section connected with said upper housing section and provided with a first longitudinal bore aligned with said bore through said head member and a second longitudinal bore extending in side-by-side non-communicating relationship with said first bore, each of said bores opening into said chamber within said upper housing section whereby well tools may be inserted into an removed from each of said bores through said head member; said landing nipple being provided with lateral port means communicating with said second bore; a lower tubular housing section connected on said landing nipple section; a well packer connected on said lower tubular housing section; a flow tube slidably positioned through said well packer in said lower housing section into said first bore of said landing nipple defining a first central flow passage through said well packer and said lower housing section into said first bore and a second annular flow passage through said well packer and said lower housing section communicating with said second bore and means for landing and locking a well tool in alignment with said first bore of said landing nipple and above said second bore of said nipple.

54. A fluid flow control assembly in accordance with claim 53 including in addition a flow control valve in said second bore of said landing nipple section to prevent fluid flow from the upper end of said bores into said chamber in said upper housing section and to direct fluid flow laterally from said bore through said lateral port means.

55. A fluid flow control assembly as defined in claim 54 including a fluid flow control valve detachably secured within said means for landing and locking a well tool aligned with said first bore to control fluid flow through said tubing string to the surface.

56. A subsurface fluid flow control system to control fluid flow through a well bore comprising: a wellhead; a tubing string supported through said wellhead within said well bore defining a first central flow passage through said tubing string and a second annular flow passage within said well bore around said tubing string; a fluid flow control assembly connected with said tubing string for directing fluid flow from below said assembly into said first and second flow passages, said flow control assembly including a head member having an eccentrically positioned bore communicating with said tubing string, an upper tubular housing section connected with said head member and defining a chamber, a landing nipple section connected with said upper housing section, said landing nipple section having a first longitudinal bore aligned with said bore through said head member opening into said chamber and a second longitudinal bore extending in side-by-side non-communicating relationship with said first bore opening into said chamber, and a lateral port communicating through a side wall of said landing nipple section into said second bore, and a lower tubular housing section connected on said landing nipple section; a well packer connected on said lower housing section to seal around said flow control assembly within said well bore; a longitudinally slidable flow tube positioned through said lower housing section and said well packer defining a central flow passage through said well packer and said lower housing section into said first bore of said landing nipple section and an annular flow passage through said well packer and said lower housing section communicating with said second bore through said landing nipple; operably connectable means on said well packer and said flow tube for releasing said well packer to be set within said well bore responsive to longitudinal movement of said flow tube; a ball type remotely controlled fluid actuatable valve detachably secured in said first bore of said landing nipple section for controlling fluid flow through said bore into said chamber from said flow tube; a fluid actuated remotely controllable poppet type valve detachably secured in said second bore of said landing nipple to prevent fluid flow from the upper end of said bore into said chamber and direct fluid flow from said bore through said lateral port communicating with said bore; said landing nipple section being provided with flow passage means for conducting control fluid to each of said valves to control said valves; a control fluid conduit extending from said head member to said landing nipple section communicating with said control fluid flow passages of said section; said head member having control fluid flow passages communicating with said control fluid line between said landing nipple and said head member; a landing nipple secured with said head member having flow passage means communicating with said control fluid flow passage through said head member and adapted to receive a control fluid line stab-in assembly remotely installable and removable from said head member from the surface; said landing nipple in said head member including a bore having a communicating port connecting with said control fluid flow passage leading through said head member; a lower stab-in type control fluid coupling detachably positioned within said landing nipple of said head member, said stab-in coupling having a mandrel provided with spaced apart packing assemblies and a central flow passage with port means communicating through said mandrel between said packing assemblies, said packing assemblies being positioned on opposite sides of said port means through said landing nipple of said head member when said stab-in coupling is engaged in said landing nipple; a control line connected with said stab-in coupling and extending to the surface exterior of said tubing string; an exit spool connected in said wellhead, said exit spool being provided with a first central bore receiving the upper end section of said tubing string and a second smaller bore extending parallel and spaced apart from said central bore to receive an upper stab-in type control fluid coupling, said exit spool having a lateral flow passage communicating with said second bore for supplying control fluid into said bore; an upper stab-in type control fluid coupling secured on the upper end of said control line detachably positioned within said second bore of said exit spool, said upper coupling having a mandrel supporting spaced apart packing assemblies on opposite sides of said lateral flow passage connecting with said smaller bore, said mandrel of said coupling having a central bore communicating with said control fluid line and lateral ports communicating with said second bore of said exit spool when said coupling is engaged within said smaller bore; means adapted to supply control fluid under pressure; and conduit means connecting said last mentioned means with said lateral port into said second bore of said exit spool for supplying control fluid under pressure to said valves in said first and second bores of said landing nipple for controlling said valves from the surface.

57. A system for controlling fluid flow in a well bore comprising: a wellhead; a seal assembly engaged with said wellhead for sealing around both the upper end of an inner tubing string and an outer tubing string positioned concentrically around and spaced apart from said inner tubing string; said seal assembly being provided with flow passage means communicating with the annular space between said inner and outer tubing string; an inner tubing string connected into said seal assembly; an outer tubing string connected into said seal assembly; said inner and outer tubing strings being concentrically disposed and spaced apart from each other to provide an annular control fluid flow passage between said tubing strings; said inner tubing string defining a first central flow passage for well fluids through said well bore and said outer tubing string and the wall of said well bore defining a second annular flow passage for well fluids through said well bore; said inner and outer tubing strings extending downwardly through said well bore to a fluid flow control assembly for directing fluid flow into said first and second fluid passages; a fluid flow control assembly connected with the lower ends of said inner and outer tubing strings; said flow control assembly comprising a head member providing means for connection with both said inner and said outer tubing strings and with means providing a fluid flow passage communicating through said head member with said annular control fluid flow passage between said tubing strings, an upper tubular housing section connected with said head member, a lading nipple section connected with said upper tubular housing section, said landing nipple section having a first longitudinal bore opening into said upper housing section aligned substantially with said inner tubing strong and a second longitudinal bore opening into said upper housing section, extending in side-by-side non-communicating relationship with said first bore, said landing nipple section being further provided with a lateral port communicating with said second bore; conduit means connected between said head member and said landing nipple section communicating with said means providing a control fluid flow passage through said head member and with said first and second bores through said landing nipple section to conduct control fluid to fluid control valves in said landing nipple section; and a lower tubular housing section connected on the lower end of said landing nipple section communicating with said first and second bores through said section; a well packer connected on said lower housing section.

58. A subsurface flow control assembly according to claim 42 including a fluid flow control valve detachably secured in said first bore of said landing nipple section and a fluid flow control valve detachably secured in said second bore of said landing nipple section.

59. A subsurface fluid flow control assembly in accordance with claim 58 wherein said seal assembly engaged with said wellhead for sealing around both the upper end of an inner tubing string and an outer tubing string includes a first flange supported on said wellhead around and in sealed engagement with an upper end section of said outer tubing string, an exit flange having a bore supported on said first flange above the upper end of the outer tubing string around and in sealed relationship with the upper end section of the said inne rtubing string, the bore through said exit flange being enlarged along a lower end section communicating with said annular control fluid flow passage between said inner and outer tubing strings, said exit flange being provided with a radially extending flow passage communicating with said enlarged section of said bore through said flange to permit supply of control fluid through said exit flange into said annular flow passage; said head member of said flow control assembly being internally threaded along an upper end section thereof and having an internal upwardly facing annular shoulder around the bore therethrough below said internally threaded upper end section; the lower end of said outer tubing string being threaded into said upper end section of said head member; an adapter engaged on the lower end of said inner tubing string; an external annular packing assembly around said adapter to seal between said adapter and the wall of said bore through said head member above said internal annular shoulder in said head member; a retainer ring engaged on said adapter below said annular packing to hold said annular packing against downward movement on said adapter, the lower end surface of said retainer ring beging engageable with said internal annular shoulder within said head member for supporting said adapter against downward movement relative to said head member; the lower section of said inner tubing string and said adapter above said annular packing being spaced apart within said head member and the lower end section of said outer tubing string providing an annular flow passage communicating with said annular flow passage extending to the surface between said inner and outer tubing strings; said head member being provided with a lateral flow passage communicating between said head member and said adapter and with a longitudinal flow passage communicating with said lateral flow passage, said longitudinal flow passage being connectable at the lower end thereof into said control fluid conduit extending between said head member and said landing nipple to permit control fluid flow from said annular space between said tubing strings through said head member to said landing nipple; and said adapter, said annular packing on said adapter, and said retainer ring on said adapter being sized to permit said inner tubing string to be inserted into and removed from said head member independent of said outer tubing string.

60. A subsurface fluid flow control system comprising: a wellhead; a tubing string supported through said wellhead extending through a well bore defining a first central fluid flow passage through said tubing string and a second annular fluid flow passage around said tubing string within said well bore; a flow control assembly secured on said tubing string to direct fluid flow in said well bore below said assembly into said first and second flow passages; said flow control assembly including a head member having an eccentrically positioned longitudinal bore communicating with said tubing string and means providing a control fluid flow passage through said head member; an upper tubular housing section secured on said head member and providing an upper-chamber; a landing nipple connected with said upper housing section, said landing nipple being provided with a first longitudinal bore substantially aligned with said bore through said head member and a second longitudinal bore extending in side-by-side non-communicating relationship with said first bore, said first and second bores opening into said chamber in said upper housing section whereby well tools may be installed in and removed from each of said bores of said landing nipple through said bore through said head member and said chamber in said upper housing section; said landing nipple section being further provided with lateral port means communicating with said second bore for directing fluid outwardly into said second annular fluid flow passage to the surface; a lower housing section connected on said landing nipple, said lower housing section having means associated therewith defining a first fluid flow passage communicating with said first bore through said landing nipple and a second fluid flow passage communicating with said second bore through said landing nipple; a well packer connected with said lower housing section and having means defining first and second fluid flow passages communicating respectively with said first and second fluid flow passages in said lower housing section; means connected through said wellhead into said well bore to said flow control assembly provided a control fluid flow passage to conduct control fluid for remote control of flow control valves in said landing nipple; means provided in said flow control assembly forming a control fluid flow passage between said head member and communicating with said first and second bores through said landing nipple; a running and pulling tool adapted to be inserted through said tubing string and said head member into said chamber within said upper housing section for installing and removing well tools from said second bore of said landing nipple, said tool being adapted to misalign within said upper housing section to insert tools into and remove tools from said second bore through said landing nipple; a fluid actuatable remotely controllable well completion valve adapted to be removably locked in said second bore of said landing nipple to prevent fluid flow from said bore into said upper housing section and direct fluid flow laterally from said bore through said lateral port communicating with said bore; a fluid actuated remotely controllable well production valve adapted to be removably secured within said second bore of said landing nipple for preventing fluid flow from said second bore into said chamber of said upper housing section and directing fluid flow from said second bore laterally through said lateral port communicating with said second bore; a running tool adapted to be inserted through said tubing string into said upper housing section and said first bore of said landing nipple for installing well tools in said first bore of said landing nipple, said running tool having a prong connectable therewith for holding a flow control valve in open position to allow fluids to bypass said well tools inserted through said well tubing into said first bore by said running tool; a double ball plug valve adapted to be releasably locked within said first bore of said landing nipple to prevent fluid flow through said first bore during installation of said flow control system in a well bore; and a fluid responsive remotely controllable fluid flow control valve adapted to be releasably locked in said first bore of said landing nipple for controlling fluid flow through said first bore into said chamber of said upper housing section of said flow control assembly.

61. A subsurface fluid flow control system as defined in claim 60 wherein said completion and production valves engageable in said second bore of said landing nipple are poppet type valves and said production valve engageable in said first bore of said landing nipple is a ball type valve adapted to permit well tools to be introduced into and removed from said well bore below said valve through the central bore of said valve when said valve is in open position.

References Cited
UNITED STATES PATENTS

| | | | |
|---|---|---|---|
| 2,780,291 | 2/1957 | Westling | 166—73 |
| 2,785,755 | 3/1957 | En Dean | 166—72 |
| 2,963,089 | 12/1960 | Sizer | 166—72 |
| 2,978,031 | 4/1961 | Grimmer | 166—114 |
| 3,216,501 | 11/1965 | Page | 166—72 |
| 3,292,706 | 12/1966 | Grimmer et al. | 166—224 |

DAVID H. BROWN, *Primary Examiner.*

PO-1050
(5/69)

UNITED STATES PATENT OFFICE
CERTIFICATE OF CORRECTION

Patent No. 3,412,806          Dated November 26, 1968

Inventor(s) John V. Fredd, Turner G. Garwood and Phillip S. Sizer

It is certified that error appears in the above-identified patent and that said Letters Patent are hereby corrected as shown below:

```
col. 10, line 33, for "224" read --244--
col. 10, line 62, for "conrtol" read --control--
col. 12, line 17, for "throught" read --through--
col. 13, line 56, after "upwardly" insert --and inwardly--
col. 13, line 70, for "balve" read --valve--
col. 24, line 30, cancel "plug"  (second occurrence)
col. 25, line 56, for "form" read --from--
col. 26, line 7, for "lever" read --level--
col. 26, line 7, for "rear" read --shear--
col. 35, line 41, for "mandrel-collect" read --mandrel-collet--
col. 45, line 6, for "mendrel" read --mandrel--
col. 63, line 19, for "strong" read --string--
col. 63, line 48, for "inne rtubing" read --inner tubing--
```

SIGNED AND
SEALED
APR 7 1970

(SEAL)
Attest:

Edward M. Fletcher, Jr.
Attesting Officer

WILLIAM E. SCHUYLER, JR.
Commissioner of Patents